United States Patent
Holland

(10) Patent No.: US 10,252,925 B2
(45) Date of Patent: Apr. 9, 2019

(54) METHOD AND APPARATUS FOR CONDITIONING FLUIDS

(71) Applicant: Wilsa Holdings, LLC, Houston, TX (US)

(72) Inventor: Herbert W. Holland, Houston, TX (US)

(73) Assignee: Wilsa, Inc., Houston, TX (US)

( * ) Notice: Subject to any disclaimer, the term of this patent is extended or adjusted under 35 U.S.C. 154(b) by 581 days.

(21) Appl. No.: 14/772,331

(22) PCT Filed: Mar. 4, 2014

(86) PCT No.: PCT/US2014/020198
§ 371 (c)(1),
(2) Date: Sep. 2, 2015

(87) PCT Pub. No.: WO2014/138011
PCT Pub. Date: Sep. 12, 2014

(65) Prior Publication Data
US 2016/0031731 A1    Feb. 4, 2016

Related U.S. Application Data

(60) Provisional application No. 61/773,624, filed on Mar. 6, 2013.

(51) Int. Cl.
| | |
|---|---|
| B03C 1/02 | (2006.01) |
| B03C 1/28 | (2006.01) |
| B03C 1/30 | (2006.01) |
| B03C 1/32 | (2006.01) |
| C02F 1/48 | (2006.01) |
| B03C 1/033 | (2006.01) |

(Continued)

(52) U.S. Cl.
CPC ............ C02F 1/48 (2013.01); B03C 1/02 (2013.01); B03C 1/0335 (2013.01); B03C 1/288 (2013.01);

(Continued)

(58) Field of Classification Search
CPC .... C02F 1/48; C02F 2103/10; C02F 2101/32; C02F 1/484; C02F 1/485; B03C 1/32;
(Continued)

(56) References Cited

U.S. PATENT DOCUMENTS 5,244,580 A * 9/1993 Li ..................... B01D 17/0202
                                                       210/666
5,868,939 A    2/1999 Oder et al.
(Continued)

FOREIGN PATENT DOCUMENTS

| | | |
|---|---|---|
| EP | 0374942 | 6/1990 |
| WO | 2009/035973 | 3/2009 |

OTHER PUBLICATIONS

PCT/US2014/020198 International Search Report and Written Opinion, dated Jul. 9, 2014, 18 pgs.

*Primary Examiner* — David C Mellon
(74) *Attorney, Agent, or Firm* — Dunlap Codding, P.C.

(57) ABSTRACT

Methods are disclosed including increasing the rate by which a dissimilar material separates in an aqueous-based mixture, comprising passing a first aqueous-based mixture through a magnetically conductive conduit having magnetic energy directed along the longitudinal axis of the magnetically conductive conduit and extending through at least a portion of the first aqueous-based mixture thereby providing a conditioned aqueous-based medium; and separating the conditioned aqueous-based medium into at least two distinct phases in at least one separation apparatus downstream of the magnetically conductive conduit, wherein the at least one dissimilar material separates from water in the conditioned aqueous-based medium at an increased rate as compared to a rate of separation of the at least one dissimilar material from water in the first aqueous-based mixture.

19 Claims, 11 Drawing Sheets

(51) Int. Cl.
*C02F 101/32* (2006.01)
*C02F 103/10* (2006.01)

(52) U.S. Cl.
CPC .................. *B03C 1/30* (2013.01); *B03C 1/32* (2013.01); *C02F 1/485* (2013.01); *B03C 2201/18* (2013.01); *C02F 2101/32* (2013.01); *C02F 2103/10* (2013.01)

(58) Field of Classification Search
CPC ......... B03C 1/02; B03C 1/288; B03C 1/0335; B03C 1/30; B03C 2201/18; B01D 17/02; B01D 17/04; B01D 17/045; B01D 17/048
See application file for complete search history.

(56) References Cited

U.S. PATENT DOCUMENTS

| | | | |
|---|---|---|---|
| 6,203,710 B1* | 3/2001 | Woodbridge | A61L 2/02 204/155 |
| 2001/0013491 A1 | 8/2001 | Kaske | |
| 2008/0221226 A1* | 9/2008 | Coutinho | B01D 17/04 516/194 |
| 2010/0102004 A1* | 4/2010 | Holland | C02F 1/48 210/695 |
| 2012/0168363 A1* | 7/2012 | Casalini | C02F 1/78 210/192 |
| 2012/0273428 A1 | 11/2012 | Holland | |

* cited by examiner

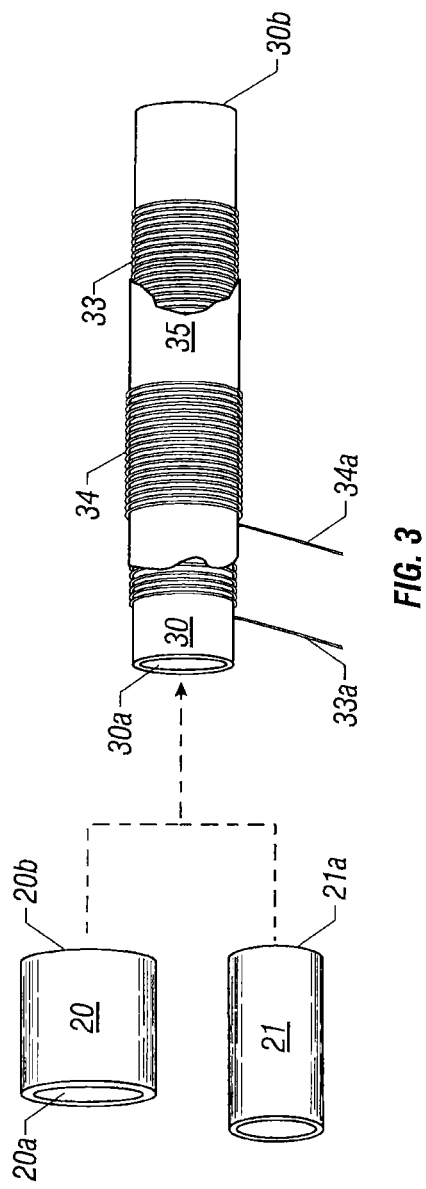
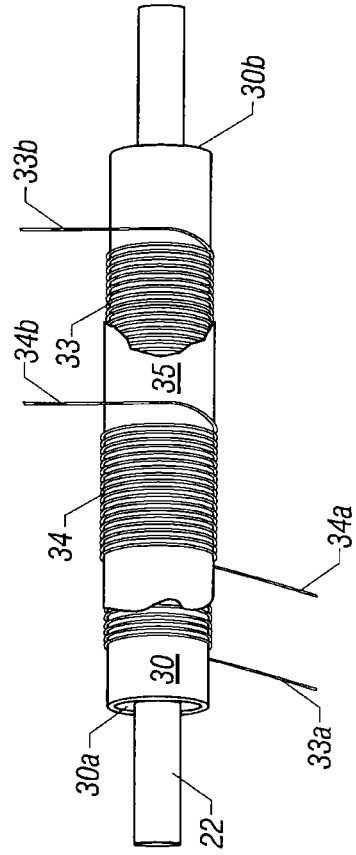
FIG. 3
FIG. 3A

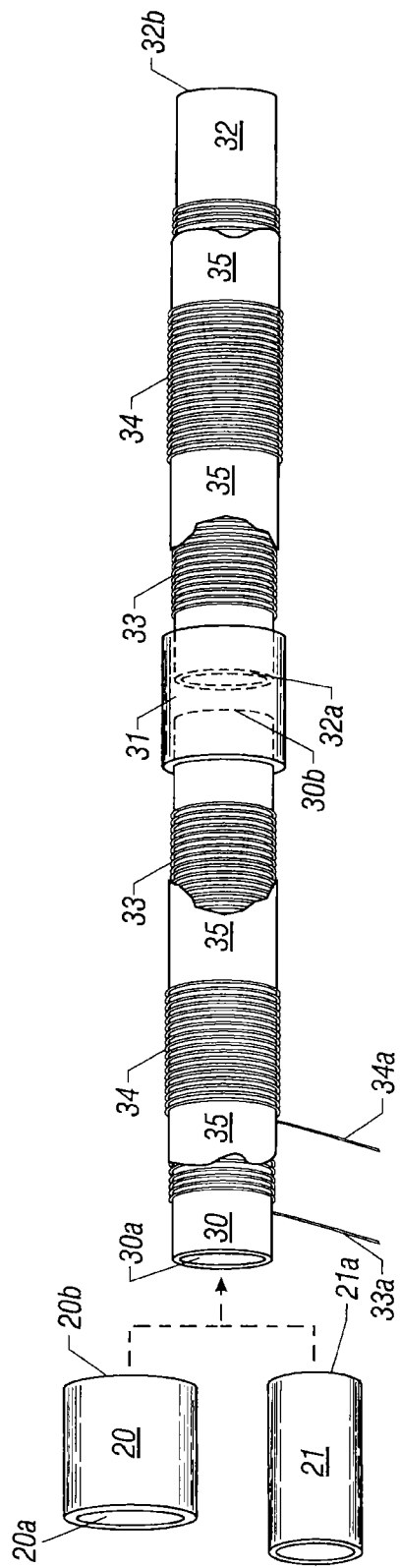
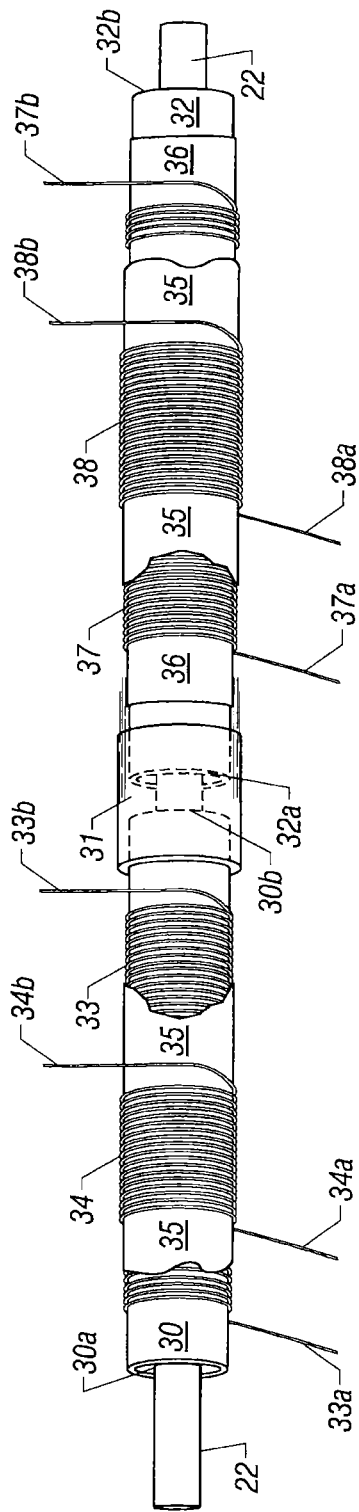
FIG. 4
FIG. 4A

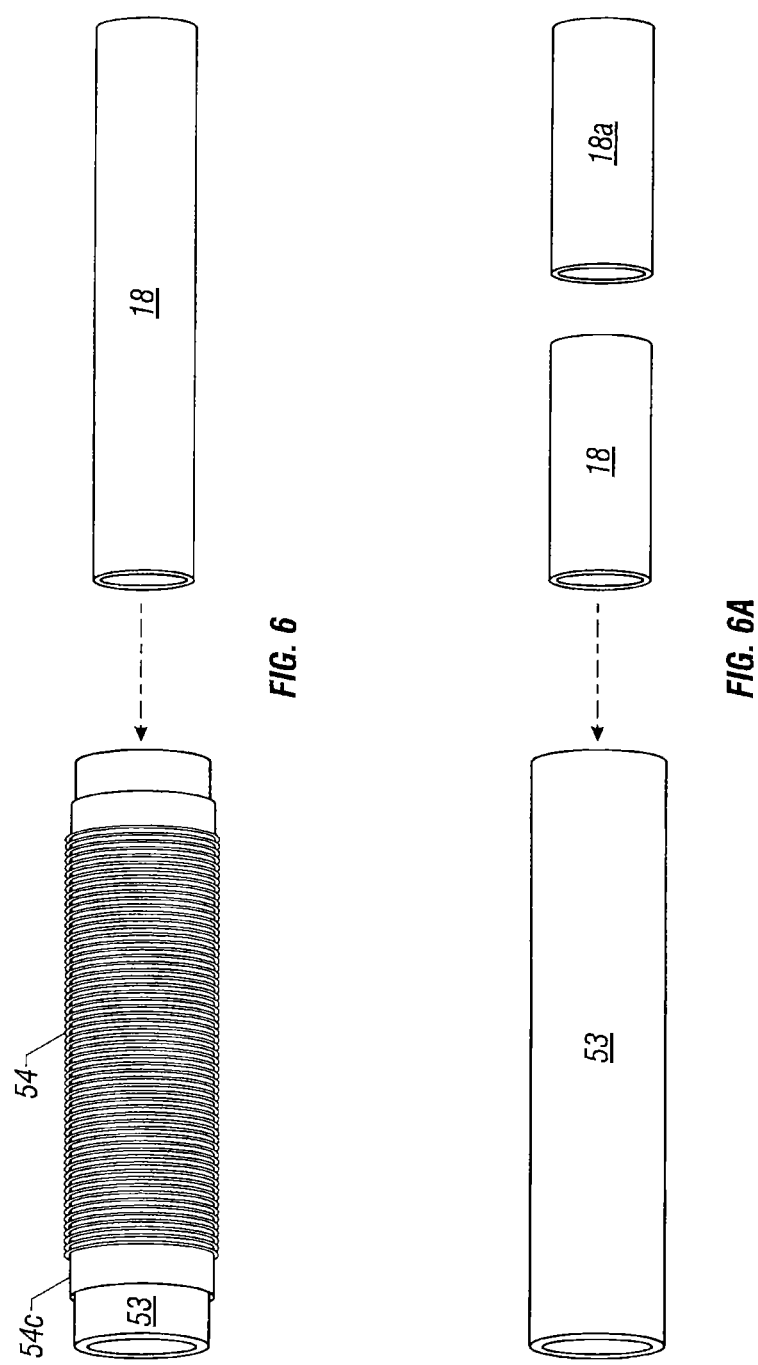

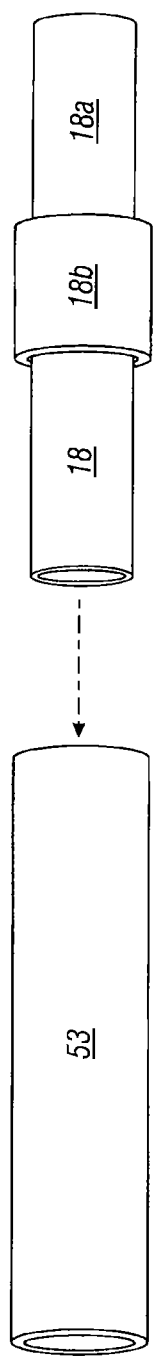
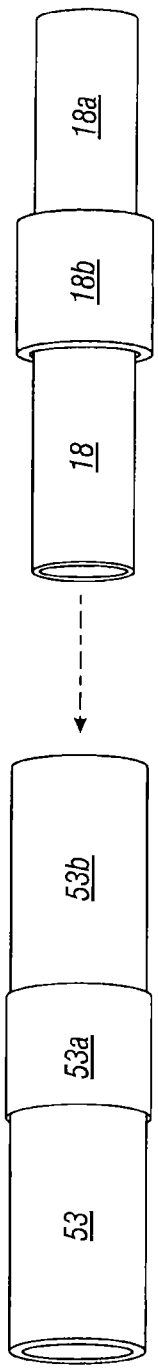

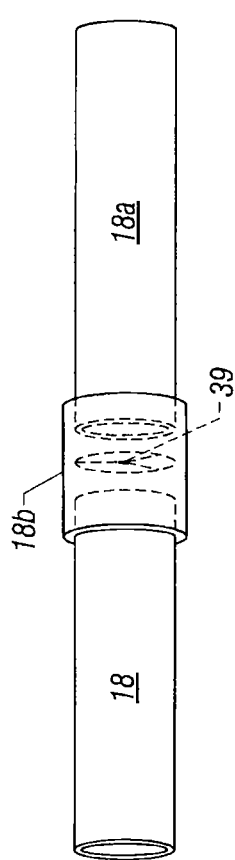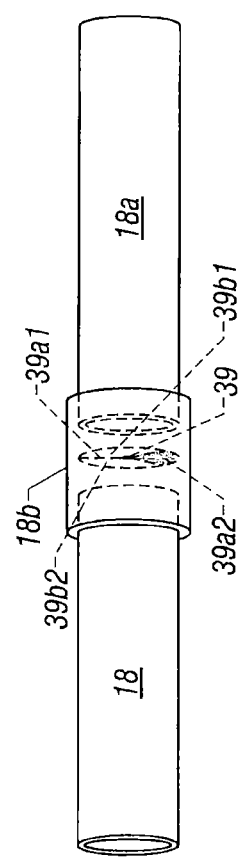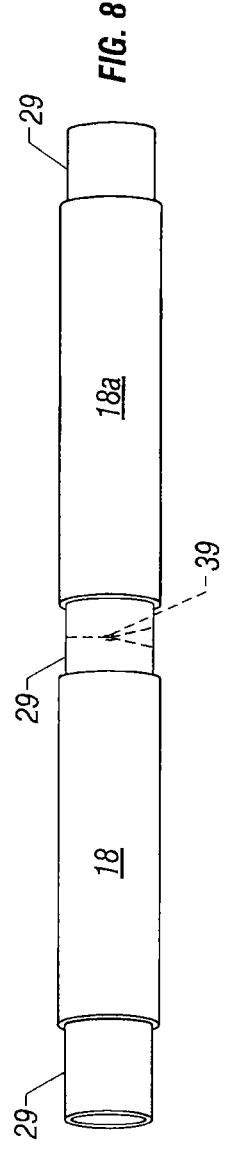

METHOD AND APPARATUS FOR CONDITIONING FLUIDS

INCORPORATION BY REFERENCE

The present patent application hereby incorporates by reference the entire provisional patent application identified by U.S. Ser. No. 61/773,624, and which was filed on Mar. 6, 2013.

BACKGROUND

There are many practical advantages to altering at least one physical property of water, aqueous solutions, aqueous-based mixtures, and oilfield exploration and production fluids. One application of altering a physical property of such fluids is improved phase separation.

A phase is defined as a region of material in a thermodynamic system that is physically distinct, chemically uniform, and typically mechanically separable. The three common states of matter are historically known as solid, liquid and gas; with their distinction commonly based on qualitative differences in the bulk properties of the phase in which each exists. A solid phase maintains a fixed volume and shape. A liquid phase has a volume that varies only slightly but adapts to the shape of its container. A gas phase expands to occupy the volume and shape of its container.

Physical properties of a phase do not change the chemical nature of matter and are traditionally defined by classic mechanics that include, but are not limited to, area, capacitance, concentration, density, dielectric, distribution, efficacy, elasticity, electric charge, electrical conductivity, electrical impedance, electric field, electric potential, electromagnetic absorption, electromagnetic permittivity, emission, flexibility, flow rate, fluidity, frequency, hardness, inductance, intrinsic impedance, intensity, irradiation, magnetic field, magnetic flux, magnetic moment, mass, opacity, permeability, physical absorption, pressure, radiance, resistivity, reflectivity, solubility, specific heat, temperature, tension, thermal conductivity, velocity, viscosity, volume, and wave impedance. Phases may also be differentiated by solubility, the maximum amount of a solute that can dissolve in a solvent before the solute ceases to dissolve and remains in a separate phase. Water (a fluid mixture containing at least one polar substance) and oil (a non-polar liquid) can be separated into two distinct liquid phases because water has very low solubility in oil, and oil has a low solubility in water. In addition to the separation of one liquid phase from a separate and distinct liquid phase, the concept of phase separation also extends to the separation of solids from liquids, solids from vapors, and liquids from vapors.

Efficient mechanical separation and physical separation have a number of practical applications. In oilfield applications, for example, oil and natural gas (commonly referred to as "gas") reservoirs, which also contain saltwater, are typically found in porous rock. Crude oil, petroleum liquors, gas, water, solids and other materials extracted from hydrocarbon producing formations are directed through bulk separation apparatus in order to recover marketable hydrocarbons. Oil, petroleum liquors, and/or gas containing residual amounts of water, solids and other materials are transported to processing facilities for additional processing and marketing while water, solids and other materials flowing out of a hydrocarbon producing formation are typically collected proximate a wellhead (on the surface of the Earth, on an off-shore platform, and/or on an ocean floor) for processing and/or disposal.

Hydraulic fracturing fluid, or "frac fluid", is pumped into shale formations under high pressure to create fissures and release gas and/or oil trapped in hydrocarbon producing formations. Frac fluid is a mixture of water, chemicals, and proppants (rigid particles of substantially uniform size used to hold fractures in a hydrocarbon producing reservoir open after a hydraulic fracturing treatment). In addition to naturally occurring sand grains; man-made or specially engineered proppants, such as resin-coated sand or high-strength ceramic materials, are carefully sorted for size and sphericity to provide efficient flow channels to allow fluids to flow from a reservoir to a wellbore. Flowback water (a portion of the water, chemicals and proppants in frac fluid; plus water, solids phase materials, liquid phase hydrocarbons and gas phase hydrocarbons from the wellbore and producing formation) may be returned to the wellhead over a period of three to four weeks after fracturing a shale formation. At a certain point in the early life of a well, there is a transition from primarily recovering flowback water containing frac fluid to that of recovering produced water from the hydrocarbon producing formation.

Produced water is an aqueous-based mixture trapped in underground formations brought to the surface along with oil and/or gas. Produced water can also be called "brine", "saltwater", or "formation water." Because this water has resided within hydrocarbon bearing formations for centuries, it typically possesses some of the chemical characteristics of the formation and the hydrocarbons produced by a formation. Produced water may include water from a hydrocarbon producing reservoir, water injected into the formation, solids phase materials from the wellbore and producing formation, and any chemicals added during drilling, production, and treatment processes. The major constituents of interest in produced water are salt content, oil and grease, organic and inorganic chemicals and naturally occurring radioactive material (NORM).

Salt content can be expressed as salinity, total dissolved solids, or electrical conductivity. The salt content in produced water varies widely, from nearly freshwater to salt levels up to ten times higher than seawater. Oil and grease refers to many types of organic chemicals that collectively lend an "organic tint" and/or "oily" property to the water. Inorganic and organic chemicals found naturally in the formation are transferred to the water through long-term contact with hydrocarbons, or are chemical additives used during drilling and operation of the well. The presence of specific chemicals and their concentration levels can vary widely. Some oil and gas formations contain small concentrations of naturally occurring radioactive material (NORM) that can be transferred into produced water. Generally, radiation levels in produced water are very low and pose no risk; however, scale from pipes and sludge from tanks holding produced water can concentrate NORM.

Produced water is the largest waste stream generated in the oil and gas exploration and production process. Over the life of a hydrocarbon producing formation, it is estimated 7-10 times more produced water than hydrocarbons can flow out of a formation. Given the volume of water and magnitude of this waste stream, the handling and disposal of produced water is a key factor in exploration and production costs; and one that must adequately protect the environment at the lowest cost to the operator.

The volume of produced water generated by oil and gas wells does not remain constant over time, and over the life of a conventional oil or gas well the water-to-oil/gas ratio increases. Water typically makes up a small percentage of produced fluids when a well initially comes on line, but over time the amount of water produced by a well tends to steadily increase and the amount of oil/gas that is recovered tends to decrease.

As used herein, water-based streams generated in oil and gas production comprising water containing at least one dissimilar material flowing from a hydrocarbon producing formation, reservoir and/or wellbore to a wellhead are referred to herein as "aqueous-based mixtures." The term "aqueous-based mixture" refers to "oilfield production fluid containing water and at least one of crude oil, petroleum liquors, gas, solids and/or other materials extracted from hydrocarbon producing formations", "flowback water", "produced water", "brine", "formation water", "saltwater", as well as drilling fluids, muds, and completion fluids, and combinations thereof or equivalent water-based streams generated in oil and gas production known to those of ordinary skill in the art.

Changing the physical properties of aqueous-based mixtures is useful in separating marketable oil from water, reducing chemical usage when processing such mixtures and eliminating emulsions at oil/water interfaces in oilfield separation vessels. After the bulk separation of oil and/or gas from water, solids and other materials extracted from hydrocarbon producing formations, aqueous-based mixtures may be managed in one of several ways. Flowback water and produced water typically have high salinity along with high percentages of total suspended solids and total dissolved solids. Conventional management of these recovered fluids involves trucking aqueous-based mixtures to a wastewater disposal facility for injection into an underground formation void of viable oil and gas production. Flowback water and produced water received by disposal wells can contain 0.01%-4% free-floating and readily recoverable oil, depending on the efficiency of the bulk separation apparatus used in the field to segregate marketable oil from produced water. The cost of managing aqueous-based mixtures is a significant factor in the profitability of oil and gas production, and operators are constantly searching for cost effective means of managing water for recycling, reuse, or release into the environment.

Some aqueous-based mixtures extracted in the bulk recovery process may be injected into an oil producing formation in a secondary oil recovery technique known as "waterflooding" that may be used when an oil producing reservoir's pressure has been depleted and marketable oil production falls off due to reduced operating pressure. Waterflooding a formation, by injecting produced water back into the reservoir where it originated, typically reestablishes sufficient pressure within a hydrocarbon producing formation to allow for the recovery of additional amounts of oil.

In many instances, it may be advantageous to alter at least one physical property of an aqueous-based mixture to improve separation of water from at least one solid material and/or at least one hydrocarbon material and provide cleaner water for injection into producing formations. Further, altering at least one physical property of drilling fluids, muds, and completion fluids may be utilized to improve the separation of drill cuttings, liquid phase materials, and solid phase materials from such aqueous-based mixture. The ability to alter at least one physical property of an exploration and production fluid flowing under pressure (e.g., increasing the flow rate of water propelled at a constant pressure, or reducing the pressure required to propel a volume of water at a constant flow rate) may also increase exploration and production productivity and/or reduce costs in waterflood operations.

Altering at least one physical property of an aqueous solution may be utilized to improve blending of two or more distinct phases into a homogenous exploration and production fluid. As used herein, aqueous fluids utilized in blending two or more distinct phases into a homogenous mixture and defined by the term "aqueous solutions" refer to "water", "aqueous-based mixtures", "water containing at least one dissimilar material", and combinations thereof or equivalent water-based fluids utilized in blending of two or more distinct phases into a homogenous mixture for oil and gas exploration and production known to those of ordinary skill in the art. For example, it is often desirable to blend a solid phase (e.g., bentonite) and a liquid phase (e.g., water) along with other additives to form drilling fluids used in oil and gas exploration and production that will not readily separate into distinct phases over time and/or during transportation, storage and/or use. Such "drilling mud" provides hydrostatic pressure that prevents formation fluids from entering a wellbore, keeps drill bits cool during drilling while also extracting drill cuttings from the wellbore, and/or suspends drill cuttings whenever the drilling assembly is brought in and out of the hole. Homogenous mixtures of drilling mud improve the drilling process, as well as enhance the efficiency of pumps that circulate such fluids and increase the efficiency of screens, shakers, and other apparatus downstream of the wellbore that extract drill cuttings and other contaminants from the drilling mud.

The presently claimed and/or disclosed inventive concepts have also been demonstrated to alter at least one physical property of an exploration and production fluid and affect its viscosity. As used herein, water and at least one dissimilar material propelled under pressure into a wellbore, hydrocarbon producing formation and/or reservoir may be defined by the term "exploration and production fluid" and refer to "drilling fluids", "frac fluid", "mud", "drilling mud", "completion fluid", "acid", "cement", "injection well water", "waterflood formation stimulant", and combinations thereof or equivalent fluids utilized in oil and gas exploration and production known to those of ordinary skill in the art. An at least one dissimilar substance that may be blended with a conditioned aqueous medium to form a homogenous mixture may be selected from a group consisting of, but not limited to, at least one chemical compound and/or at least one component of an exploration and production fluid, such as "drilling fluid", "frac fluid", "mud", "completion fluid", "acid", "cement", "injection well water", "waterflood formation stimulant" and combinations thereof or equivalent substances utilized in oil and gas exploration and production known to those of ordinary skill in the art.

SUMMARY

The total surface tension of a fluid is the sum of the dispersive surface tension component and the polar surface tension component of that fluid. The utilization of magnetic conditioning according to the presently claimed and/or disclosed inventive concepts has been shown to alter a dispersive surface tension component and/or a polar surface tension component of water, aqueous solutions, aqueous-based mixtures, and oilfield exploration and production fluids. One application of altering a dispersive surface tension and/or a polar surface tension of water-based fluids is improved phase separation, such as accelerating the rate by which oil and solids separate from water The presently claimed and/or disclosed inventive concepts for conditioning fluids include the step of directing an aqueous-based mixture through a magnetically energized conduit in order to provide a magnetically conditioned aqueous-based medium. The conditioned aqueous-based medium may then be directed to pass through at least one separation apparatus. Magnetically conditioning has been found to improve the efficiency of oil/water separation, water/solids separation, and oil/water/solids separation; as well as increase the rate by which an aqueous-based mixture separates into at least two distinct phases. Conventional chemical treatment and separation methods may be utilized in phase separation, as well as non-conventional water treatment methods and combinations thereof or equivalent types of separation methods known to those of ordinary skill in the art.

The presently claimed and/or disclosed inventive concepts may also be utilized to alter a dispersive surface tension and/or a polar surface tension of an aqueous solution to improve blending of exploration and production fluids and/or alter at least one physical property of an exploration and production fluid flowing under pressure and/or affect its viscosity; and require little monitoring or adjustment for effective fluid conditioning.

BRIEF DESCRIPTION OF THE DRAWINGS

FIG. 3 and FIG. 3A schematically depict magnetically conductive conduits and embodiments of fluid flow conduits.

FIG. 4 and FIG. 4A schematically depict serial couplings of conduit segments and embodiments of fluid flow conduits.

FIG. 6 is an exploded view of a first magnetically conductive conduit adapted to sleeve a second magnetically conductive conduit.

FIG. 6A is an exploded view of a first magnetically conductive conduit adapted to sleeve a non-contiguous array of magnetically conductive conduits.

FIG. 6B is an exploded view of a first magnetically conductive conduit adapted to sleeve a serial coupling of conduit segments.

FIG. 6C is an exploded view of a first serial coupling of conduit segments adapted to sleeve a second serial coupling of conduit segments.

FIG. 7 schematically depicts a magnetically conductive nucleus disposed within a non-magnetically conductive conduit segment.

FIG. 7A schematically depicts a magnetically conductive nucleus supported by a non-magnetically conductive material within a conduit segment to form a static mixing device within the fluid flow path extending through the conduit segment.

FIG. 8 schematically depicts a magnetically conductive nucleus disposed within a non-magnetically conductive fluid flow conduit.

DETAILED DESCRIPTION

Figure 1:
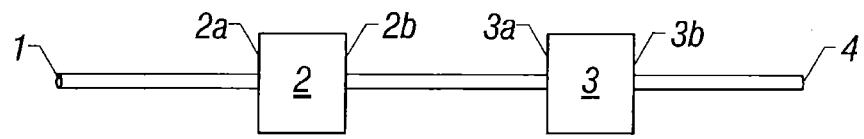
FIG. 1 is a schematic diagram of a magnetically conductive conduit and a separation apparatus.

Stokes's Law describes the physical relationship that governs the settling of solid particles in a liquid; and similarly governs the rising of light liquid droplets within a different, heavier liquid. Stokes's Law relates to the terminal settling, or rising, velocity of a smooth, rigid sphere having a known diameter through a viscous liquid of known density and viscosity when subjected to a known force (gravity). A modified version of Stokes's Law that accounts for a constant flow of an aqueous-based mixture through a separator is: $V=(2\ gr^2)(d1-d2)/9\mu$, where V=velocity of rise (cm/sec), g=acceleration of gravity (cm/sec$^2$), r="equivalent" radius of a particle (cm), d1=density of a particle (g/cm$^3$), d2=density of the fluid medium (g/cm$^3$), and $\mu$=viscosity of the fluid medium (dyne/sec/cm$^2$).

Specific gravity is the ratio of the density (mass of a unit volume) of a first substance to the density (mass of the same unit volume) of a reference substance, which is nearly always water for liquids or air for gases. Specific gravity is commonly used in industrial settings as a simple means of obtaining information regarding the concentration of solutions of various materials. Temperature and pressure must be specified for both the substance and the reference when quantifying the specific gravity of a substance; with pressure typically being 1.0 atmosphere and the specific gravity of water commonly set at 1.0. Substances with a specific gravity of 1.0 are neutrally buoyant in water, those with a specific gravity greater than 1.0 are more dense and typically sink in water, while those with a specific gravity of less than 1.0 are less dense and typically float on water.

When the respective specific gravities of the liquids, particle size and the viscosity of the continuous phase (typically water) are known, Stokes's Law outcome for the rise of an oil droplet is equivalent to the outcome for the settling of solid particles, with a negative velocity referencing the rising velocity of a droplet. Stokes's Law assumes all particles are spherical and the same size; and flow is laminar, both horizontally and vertically, and that droplets will rise as long as laminar flow conditions prevail. Variables include the viscosity of the continuous liquid, the size of the particles and the difference in specific gravity between the continuous liquid and the particle.

Surface tension and viscosity are not directly related; viscosity depends on intermolecular forces within the bulk of a liquid, whereas surface tension focuses more on the surface, rather than the bulk, of the liquid. Surface tension is an attribute of a liquid in contact with a gas; and any liquid molecules in contact with any other phase experience a different balance of forces than those liquid molecules located within the bulk of the liquid. Surface tension is a quantitative thermodynamic measure of the "unhappiness" experienced by a molecule of a liquid that is forced to be at the surface of a bulk of that same liquid and giving up the interactions that it would rather have with neighboring liquid molecules in the bulk of the liquid, and getting nothing in return from the gas. Thus, surface tension is a special example of interfacial tension; which is defined by the work associated with moving a molecule from within the bulk of a liquid to its interface with any other phase.

Stokes's Law predicts how fast an oil droplet will rise through water based on the density and size of the oil droplet and the distance the oil must travel. The difference in the specific gravities of oil and water are significant elements in the gravity separation of oil/water mixtures. As oil droplets coalesce they do not form flocs, like solid particles, but form larger droplets. Interfacial tension works to keep the drop spherical since a sphere has the lowest surface to volume ratio of any shape, and interfacial tension is, by definition, the amount of work necessary to create a unit area of interface. As oil droplets coalesce into larger droplets, the buoyancy of the droplets increases as they rise toward the surface of the water.

Increased interfacial tension improves coalescing of oil droplets into larger drops and also causes the droplets to assume spherical shapes. While all the variables of Stokes's Law have a decided impact on separation, the greatest impact is found in the size of the particle since its relationship in the Stokes's Law equation is not one-to-one, but the square of the size. That is, as the droplet size doubles, its separation velocity increases by four times, as the droplet size triples, separation is nine times faster; and so forth. Similarly, coalescing of solids accelerates their fall.

Many gravity separation apparatus are designed using Stokes's Law to define the rising velocity of oil droplets based on their density and size and the difference in the specific gravities of oil and water, which is much smaller than the difference in the specific gravities of solids and water. Based on such design criterion, most suspended solids will settle to the bottom of phase separators as a sediment layer while oil will rise to the top of phase separators or form a layer that can be extracted by skimming or other means. Water forms a middle layer between the oil and the solids. Solids falling to the bottom of a separator are periodically removed for disposal. Heat and/or at least one chemical compound may be introduced into an aqueous-based mixture in order to increase the rate of phase separation.

The greater the difference in the density of an oil droplet and the density of a continuous water phase, the more rapid the gravity separation. The terminal velocity of a rising or falling particle is affected by anything that will alter the drag of the particle. Terminal velocity is most notably dependent upon the size, spherical shape and density of the particles, as well as the viscosity and density of the water. When the particle (or droplet) size exceeds that which causes a rate of rising or falling greater than the velocity of laminar flow, flow around the particle becomes turbulent and it will not rise or fall as rapidly as calculated by Stokes's Law because of hydrodynamic drag. However, larger particles (or droplets) will fall or rise very quickly in relationship to smaller particles and can be removed by a properly designed separator.

Drag coefficients quantify the resistance of an object to movement in a fluid environment and are always associated with the surface area of a particle; low drag coefficients indicate objects have less hydrodynamic drag. Skin friction directly relates to the surface area of a body in contact with a fluid, and indicates the manner in which a particle resists any change in motion caused by viscous drag in a boundary layer around the particle. Skin friction rises with the square of its velocity.

As described herein, magnetic conditioning has been determined to alter a dispersive surface tension and/or a polar surface tension of water. While increasing particle size has the greatest impact with respect to the rate of separation calculated by Stokes's Law, altering a dispersive surface tension and/or a polar surface tension of the continuous phase (for example, by magnetically conditioning water that flows within a separator according to the presently claimed and/or disclosed inventive concepts) has a significant impact on the rate of phase separation. Magnetic conditioning influences the viscosity of water as it affects intermolecular forces within the liquid.

The presently claimed and/or disclosed inventive concepts include an apparatus for increasing the rate of separation of at least one dissimilar material from an aqueous-based mixture, including a magnetically conductive conduit having magnetic energy directed along the longitudinal axis of the magnetically conductive conduit and extending through at least a portion of the magnetically conductive conduit; and at least one separation apparatus downstream of the magnetically conductive conduit, wherein an aqueous-based mixture is capable of flowing through the magnetically conductive conduit and into the at least one separation unit.

At least one length of magnetically conductive material may form a magnetically conductive conduit having a fluid entry port at the proximal end of the magnetically conductive conduit, a fluid discharge port at the distal end of the magnetically conductive conduit and a fluid impervious boundary wall having an inner surface and an outer surface extending between the fluid entry port and the fluid discharge port, the inner surface of the boundary wall establishing a fluid flow path extending along the longitudinal axis of the conduit. The magnetically conductive conduit may further have at least one electrical conductor having a first conductor lead and a second conductor lead, the electrical conductor coiled with at least one turn to form at least one uninterrupted coil of electrical conductor, each coil forming at least one layer of coiled electrical conductor. The magnetically conductive conduit may further include at least one coiled electrical conductor encircling the magnetically conductive conduit within the coiled electrical conductor, wherein the at least one coiled electrical conductor sleeves at least a section of an outer surface of the boundary wall of the magnetically conductive conduit with at least one turn of the electrical conductor oriented substantially orthogonal to the fluid flow path extending through the conduit. The magnetically conductive conduit may further have at least one electrical power supply operably connected to at least one of the first and second conductor leads, wherein the at least one coiled electrical conductor is thereby energized to provide a magnetic field having lines of flux directed along a longitudinal axis of the magnetically energized conduit. As used herein, the term "magnetically energized conduit" refers to the "magnetically conductive conduit" in an energized state. The lines of flux form loops and the resulting magnetic field is of a strength that allows the flux to extend along the longitudinal axis of the magnetically energized conduit and concentrate at distinct points beyond each end of the conduit such that the magnetic flux extends from a point where the lines of flux concentrate beyond one end of the magnetically energized conduit, around the periphery of the coiled electrical conductor along the longitudinal axis of the fluid impervious boundary wall, and to a point where the lines of flux concentrate beyond the other end of the magnetically energized conduit. The boundary wall absorbs the magnetic field and the magnetic flux loops generated by the coiled electrical conductor at the points of flux concentration.

The presently claimed and/or disclosed inventive concepts include alternate embodiments having more than one length of magnetically conductive material forming the magnetically conductive conduit, each length of magnetically conductive material having a fluid entry port at the proximal end of the conduit, a fluid discharge port at the distal end of the conduit, and a boundary wall having an inner surface and an outer surface extending between the fluid entry port and the fluid discharge port. Two non-contiguous lengths of magnetically conductive conduit may form an embodiment of the magnetically conductive conduit having more than one length of magnetically conductive material. Increasing the density and thickness of the boundary wall of the magnetically conductive conduit typically results in greater concentrations of magnetic energy within each section of magnetically conductive conduit and non-magnetically conductive regions established between magnetically conductive conduits. At least one length of magnetically conductive material may sleeve at least one additional length of magnetically conductive material to increase the density and thickness of the boundary wall of the magnetically conductive conduit. Magnetic flux may extend from a point where the lines of flux concentrate beyond one end of an embodiment of the magnetically energized conduit having more than one length of magnetically conductive material forming the magnetically conductive conduit, around the periphery of the coiled electrical conductor along the longitudinal axis of each magnetically conductive boundary wall and to a point where the lines of flux concentrate beyond the other end of the magnetically energized conduit. Each length of magnetically conductive material may absorb the magnetic field and the magnetic flux loops generated by the coiled electrical conductor at the points of flux concentration; and it can be appreciated that magnetic energy may be concentrated in a plurality of distinct areas along the longitudinal axis of embodiments of a magnetically energized conduit having more than one length of magnetically conductive material forming the magnetically conductive conduit.

Magnetically conductive coupling devices and/or segments of magnetically conductive conduit may be utilized to make fluid impervious connections with the inlet and outlet ports of the magnetically energized conduit to promote the flow of fluid through magnetic energy. Utilization of magnetically conductive couplings and conduits results in magnetic energy that would otherwise concentrate at each end of a magnetically energized conduit being absorbed by the contiguous array of magnetically conductive coupling devices and/or segments of magnetically conductive conduit. Magnetic fluid conditioning may then be limited to only that region along the fluid flow path within the coiled electrical conductor sleeving an outer surface of the magnetically conductive conduit and/or concentrated in a space between two non-contiguous lengths of magnetically energized conduit in an embodiment of the magnetically energized conduit having more than one length of magnetically conductive material forming the magnetically conductive conduit, since the magnetic flux loops at each end of the magnetically energized conduit are absorbed by the contiguous array of magnetically conductive conduits and can no longer concentrate at each end of the magnetically energized conduit.

A magnetically conductive fluid flow conduit may be sleeved within the boundary wall of a magnetically energized conduit to increase the density and thickness of the fluid impervious boundary wall and provide for greater concentrations of magnetic energy within the magnetically conductive conduit; and a fluid directed to pass through a magnetically conductive fluid flow conduit may be exposed to at least one area of concentrated magnetic energy.

Non-magnetically conductive coupling devices and/or segments of non-magnetically conductive conduit may also be utilized to make fluid impervious connections with the inlet and outlet ports of a magnetically energized conduit to promote the flow of fluid through the magnetically energized conduit. Utilization of non-magnetically conductive materials allows the lines of flux to pass through the fluid impervious boundary walls of the non-magnetically conductive coupling devices and/or conduits and concentrate within the inlet and outlet ports at each end of a length of magnetically conductive material so that fluid flowing through the magnetically conductive conduit receives additional magnetic conditioning in these regions. Therefore, it can be appreciated that magnetic energy may be concentrated in a plurality of distinct areas along the longitudinal axis of a magnetically energized conduit when utilizing non-magnetically conductive coupling devices and/or segments of non-magnetically conductive conduit to make fluid impervious connections with the inlet and outlet ports of the magnetically energized conduit. A non-magnetically conductive fluid flow conduit may be sleeved within the boundary wall of a magnetically energized conduit so that a fluid directed to pass through the non-magnetically conductive fluid flow conduit may be exposed to plurality of distinct areas of concentrated magnetic energy.

In large diameter conduits, a magnetically conductive nucleus having an outer surface may be deployed within the aperture of a magnetically conductive conduit to promote an increased concentration of magnetic energy within the cross section of a fluid flow path extending through the conduit. Deploying a magnetically conductive nucleus within a non-magnetically conductive region between segments of magnetically energized conduit forming the magnetically conductive conduit provides an increased concentration of magnetic energy within the fluid flow path as the magnetically energized conduit segments concentrically attract the magnetically conductive nucleus.

The electrical conductor may have at least one strand of electrical conducting material, such as a length of wire, or at least one sheet of an electrical conducting foil material. A single length of electrical conducting material may be coiled to form a single layer of coiled electrical conductor, or form a first layer and second layer of coiled electrical conductor. A first length of electrical conducting material may be coiled to form a first layer of coiled electrical conductor and a second length of electrical conducting material may be coiled to form a second layer of coiled electrical conductor. A side-by-side array of a first length of electrical conducting material and a second length of electrical conducting material may be coiled in a substantially parallel orientation to form at least one layer of coiled electrical conductor.

The electrical conductor may be coiled around a coil core, said coil core having a tubular conduit defining a boundary wall with an inner surface and an outer surface and having a port at the proximal end of the tube and a port at the distal end of the tube, the outer surface of said boundary wall adapted to receive the coiled electrical conductor and the ports at each end of the tube and the inner surface of said boundary wall adapted to sleeve at least a section of the magnetically conductive conduit, whereby at least a section of the inner surface of the boundary wall of said coil core is coaxially disposed in substantially concentric surrounding relation to at least a section of the outer surface of the boundary wall of the magnetically conductive conduit. The coil core may be made with a length of magnetically conductive material, such as a magnetically conductive conduit, or a coil core may be made with a non-magnetically conductive material, such as a film of non-magnetic stabilizing material or a non-magnetically conductive tube.

As used herein, encircling the magnetically conductive conduit within at least one coiled electrical conductor, wherein at least one coiled electrical conductor sleeves at least a section of an outer surface of the magnetically conductive conduit with at least one turn of the electrical conductor oriented substantially orthogonal to the fluid flow path extending through the conduit may include coiling at least one electrical conductor around at least a section of the outer surface of the fluid impervious boundary wall of the magnetically conductive conduit or coiling at least one electrical conductor around at least a section of the outer surface of the boundary wall of a coil core and sleeving at least a section of the magnetically conductive conduit within the coil core.

First and second layers of coiled electrical conductor may be coaxially disposed and have a plurality of spacers deployed between the layers to establish radial spacing therebetween. The spacers may be arranged substantially parallel to the longitudinal axis of the magnetically conductive conduit and equidistant to an adjacent spacer to form a pattern of open-air cooling ducts extending substantially parallel to the longitudinal axis of the magnetically conductive conduit, said cooling ducts having a capacity to dissipate heat from between coil layers.

A non-contiguous array of a first coil of electrical conducting material and a second coil of electrical conducting material may encircle the magnetically conductive conduit, or a non-contiguous array of a first coil of electrical conducting material and a second coil of electrical conducting material may encircle a coil core. A space between a non-contiguous array of a first coil of electrical conducting material and a second coil of electrical conducting material may establish a cooling duct extending substantially orthogonal to the longitudinal axis of the magnetically conductive conduit, with the cooling duct having a capacity to dissipate heat from the first coil of electrical conducting material and a second coil of electrical conducting material. A non-magnetically conductive material may be disposed in a space between a non-contiguous array of a first coil of electrical conducting material and a second coil of electrical conducting material to establish a heat sink extending substantially orthogonal to the longitudinal axis of the magnetically conductive conduit, with the heat sink having a capacity to dissipate heat from the first coil of electrical conducting material and a second coil of electrical conducting material.

A first non-magnetically conductive fluid flow conduit and a second non-magnetically conductive fluid flow conduit may be sleeved within the boundary wall of a magnetically energized conduit. A first fluid may be directed to pass through the first non-magnetically conductive fluid flow conduit and exposed a plurality of distinct areas of concentrated magnetic energy and a second fluid may be directed to pass through the second non-magnetically conductive fluid flow conduit and exposed to a plurality of distinct areas of concentrated magnetic energy.

A first magnetically conductive fluid flow conduit and a second magnetically conductive fluid flow conduit may be sleeved within the boundary wall of a third magnetically energized conduit. A first fluid may be directed to pass through the first magnetically conductive fluid flow conduit and exposed to at least one area of concentrated magnetic energy and a second fluid may be directed to pass through the second magnetically conductive fluid flow conduit and exposed to at least one area of concentrated magnetic energy.

The at least one electrical power supply may energize the coiled electrical conductor with a constant output of electrical energy having a direct current component, a constant output of electrical energy having an alternating current component, a pulsed output of electrical energy having a direct current component, and/or a pulsed output of electrical energy having an alternating current component.

The at least one electrical power supply may establish an output of electrical energy having an alternating current component to energize at least one coiled electrical conductor having a first conductor lead and a second conductor lead through a switching sequence including initially energizing said at least one coiled electrical conductor during a first time interval with electrical energy flowing between the first conductor lead to the second conductor lead in a first direction, switching the direction of the flow of electrical energy and energizing said at least one coiled electrical conductor during a second time interval with electrical energy flowing between the first conductor lead to the second conductor lead in a second direction and causing the switching sequence to repeat at a repetition rate.

The at least one electrical power supply may establish a pulsed output of electrical energy having a direct current component through a switching sequence including initially switching an output of electrical energy to an "on" state during a first time interval to energize at least one coiled electrical conductor having a first conductor lead and a second conductor lead with electrical energy flowing from the first conductor lead to the second conductor lead, switching said first output of electrical energy to an "off" state to interrupt the energizing of said at least one coiled electrical conductor, switching an output of electrical energy to the "on" state during a second time interval to energize said at least one coiled electrical conductor with electrical energy flowing from the first conductor lead to the second conductor lead, switching said second output of electrical energy to the "off" state to interrupt the energizing of said at least one coiled electrical conductor and causing the switching sequence to repeat at a repetition rate. The first and second time intervals and the repetition rate may be substantially constant or one or more of the first and second time intervals and the repetition rate may be variable.

The at least one electrical power supply may establish a pulsed output of electrical energy having an alternating current component through a switching sequence including initially switching an output of electrical energy to an "on" state during a first time interval to energize at least one coiled electrical conductor having a first conductor lead and a second conductor lead with electrical energy flowing between the first conductor lead to the second conductor lead in a first direction, switching said first output of electrical energy to an "off" state to interrupt the energizing of said at least one coiled electrical conductor, reversing the direction of the flow of electrical energy, switching an output of electrical energy to the "on" state during a second time interval to energize said at least one coiled electrical conductor with electrical energy flowing between the first conductor lead to the second conductor lead in a second direction, switching said second output of electrical energy to the "off" state to interrupt the energizing of said at least one coiled electrical conductor and causing the switching sequence to repeat at a repetition rate. The first and second time intervals and the repetition rate may be substantially constant or one or more of the first and second time intervals and the repetition rate may be variable.

A duty cycle is the percentage of one time interval in which an output of electrical energy is active, with a time interval being the length of time it takes for an output of electrical energy to complete an on-and-off cycle. A duty cycle may be expressed in a formula as $D=T/P \times 100\%$, wherein D is the duty cycle, T is the time the output of electrical energy is switched to an "on" state during a time interval and P is the total time interval of the output of electrical energy. For example, a 75% duty cycle would require an output of electrical energy to be switched to an "on" state for 75% during a time interval and switched to an "off" state for 25% during that same time interval. A pulsed output of electrical energy may be constant; or pulsed outputs of electrical energy may sweep a range of repetition rates. For example, an output of electrical energy may be pulsed with a repetition rate as low as 1 Hz to as high as 300 KHz, and may have a duty cycle from as low as 5% to as high as 95%. An at least one electrical power supply may establish pulsed outputs of electrical energy sweeping a range of repetition rates, with the repetition rates and/or duty cycles for a specific range of pulsed outputs of electrical energy being established according to the composition of a fluid to be conditioned.

One or more of the voltage and current of the output of electrical energy may be substantially constant or one or more of the voltage and current of the output of electrical energy may be variable. One or more of the time intervals, repetition rate, duty cycle or direction of a pulsed output of electrical energy may be established according to one or more of the material forming the coiled electrical conductor, resistance or impedance of the coiled electrical conductor and/or the configuration of the at least one coiled electrical conductor.

The at least one power supply may provide a plurality of programmable outputs of electrical energy, each output of electrical energy establishing a distinct output of electrical energy wherein a first output of electrical energy energizes a first coiled electrical conductor and a second output of electrical energy energizes a second coiled electrical conductor. A first supply of electrical power and a second supply of electrical power may be connected in series or parallel to energize at least one coiled electrical conductor.

The at least one separation apparatus may have at least one inlet port, at least one outlet port and a fluid impervious boundary wall extending between the at least one inlet port and the at least one outlet port.

The at least one separation apparatus may have a fluid impervious boundary wall having an inner surface, an inlet port for receiving an aqueous-based mixture or a magnetically conditioned aqueous-based medium, a first outlet port for discharging water having a reduced volume of the at least one dissimilar material and a second outlet port for discharging the at least one dissimilar material containing a reduced volume of water.

As used herein, a separation apparatus having a capacity to separate at least one dissimilar material from an aqueous-based mixture or a magnetically conditioned aqueous-based medium by centrifugal force, mechanical screening, gravity separation and/or physical separation may be selected from a group consisting of, but not limited to, two-phase separation equipment, three-phase separation equipment, dewatering apparatus, dissolved air flotation apparatus, induced gas flotation apparatus, froth flotation systems, centrifuges, hydrocyclones, desanders, wash tanks, oil/water separators, knock-out units, clarifiers, petroleum production equipment, fuel filters, lubricant filters, distillation systems, desalination equipment, reverse osmosis systems, ultrafiltration apparatus, pulsed electromagnetic wave apparatus, ultrasonic systems, cavitation apparatus, and combinations thereof or equivalent types of separation apparatus known to those of ordinary skill in the art. A magnetically conductive conduit may be disposed within the fluid impervious boundary wall of a separation apparatus.

The at least one separation apparatus may have a fluid impervious boundary wall having an inner surface, an inlet port for receiving an aqueous-based mixture or a magnetically conditioned aqueous-based medium, and at least one outlet port for discharging water containing a reduced volume of the at least one dissimilar material.

As used herein, a separation apparatus having a capacity to separate at least one dissimilar material from an aqueous-based mixture or a magnetically conditioned aqueous-based medium by mechanical screening, gravity separation and/or physical separation may be selected from a group consisting of, but not limited to, settling tanks, gravity separators, weir tanks, clarifiers, screening apparatus, cartridge filters, water filters, fuel filters, lubricant filters, ultrafiltration apparatus, pulsed electromagnetic wave apparatus, ultrasonic systems, cavitation apparatus, and combinations thereof or equivalent separation apparatus known to those of ordinary skill in the art. As used herein, open top pits and settling ponds having a fluid impervious boundary wall to contain a conditioned aqueous-based medium may be included as one exemplary, but non-limiting, embodiment of the presently claimed and/or disclosed separation apparatus. A volume of the at least one dissimilar material that may be retained within a fluid impervious boundary wall of a separation apparatus may periodically be removed to provide capacity for ongoing separation of the at least one dissimilar material from the conditioned aqueous-based medium. A magnetically conductive conduit may be disposed within the fluid impervious boundary wall of a separation apparatus.

At least one pair of electrically charged electrodes may be disposed within a fluid impervious boundary wall of an electrochemical fluid conditioning apparatus having an inner surface, an inlet port for receiving an aqueous-based fluid, such as an aqueous-based mixture or a magnetically conditioned aqueous-based medium, and at least one outlet port for discharging an amount of the aqueous-based mixture directed to pass through an electrolysis process.

An aqueous-based fluid may be directed to pass through at least one pair of electrodes energized with electrical energy. Each electrode may include at least one plate made of an electrical conducting material and having at least one conductor lead, with at least one pair of electrodes configured as a substantially parallel array of spaced-apart plates interleaving to form at least one cavity between the facing surfaces of adjacent plates. Each electrode plate may be energized with a positive or negative electrical charge opposite from its adjacent plate. As an aqueous-based fluid passes through charged electrodes, at least one dissimilar material within the water may experience neutralization of ionic and particulate charges as an electrode acting as a cathode generates hydrogen, and also reduces the valence state of some dissolved solids, causing those materials to become less soluble or achieve a neutral valence state; while an electrode acting as an anode generates oxygen and ozone that eliminates many contaminants in the fluid.

Carbon steel, aluminum, titanium, platinum, noble metals, stainless steel, and other electrically conductive materials may form the electrodes, with the composition of the aqueous-based fluid and the desired quality of water conditioning typically determining the type of material used to make the electrode plates.

The conductivity of an aqueous-based fluid is primarily dependent upon the composition and quantity of the at least one dissimilar material carried within water. Aqueous-based fluids having high percentages of suspended and dissolved materials are typically more electrically conductive, and therefore provide less resistance to the flow of electrical charges through water than aqueous-based fluids relatively free of suspended or dissolved materials. Seawater, for example, is typically more conductive than fresh water due to its high levels of dissolved minerals. A constant flow of electrons between the electrodes is desired for effective electrolysis. In many instances, voltage supplied to the electrodes may be allowed to fluctuate with the conductivity of an aqueous-based fluid to provide for a constant level of amperage supplied to the electrodes.

Electrodes made of non-sacrificial materials, such as stainless steel, titanium, platinum, noble metals, and/or electrically conductive materials coated or plated with one or more noble metal materials, such as platinum coating of titanium, niobium, zirconium and/or tantalum typically donate few, if any, metal ions to an aqueous-based fluid. Phase-pure crystalline materials forming protective films consisting of fine grains, such as diamonds, may also be used to coat electrically conductive materials. Mixed metal oxide coatings of ruthenium, iridium, platinum and palladium and/or platinum catalytic coatings may be utilized to coat titanium and similar materials to form non-sacrificial electrodes; and other combinations of similar materials may be used to form electrodes. An aqueous-based fluid directed to pass through non-sacrificial electrodes may be exposed to oxygen, ozone, hydrogen, hydroxyl radicals, and/or hydrogen peroxide as a result of electrolysis of water. In addition, electrolysis of the aqueous-based fluid can eliminate many organisms and biological contaminants by altering the function of their cells.

Electrodes made of copper and/or silver may donate ions to an aqueous-based fluid, thereby providing residual sanitizing properties to the water. In addition to the destruction of many pathogens, additional benefits of electrolysis include significant reductions in the odor and turbidity of an effluent, as well as lower levels of total suspended solids, total petroleum hydrocarbons, chemical oxygen demand, and/or biological oxygen demand.

An electrolysis process commonly known as electrocoagulation utilizes electrodes made of sacrificial materials that donate metal ions to an aqueous-based fluid. The metal ions tend to combine with the at least one dissimilar material to form a stable floc. For example, the aqueous-based fluid may initially be exposed to sacrificial electrodes donating iron ions that may then combine with at least one dissimilar material in the water. Sacrificial aluminum electrodes may then distribute aluminum ions into the aqueous-based fluid to coalesce with suspended contaminants (as well as iron ions already combined with suspended contaminants) to form a stable floc that can be separated from the water. In other applications, ions of iron, aluminum, and other flocculating elements may be dispersed into an aqueous-based fluid upstream, or downstream, of energized electrodes to initiate coalescing of the at least one dissimilar material. Chemical compounds containing coagulating elements may also be dispersed into an aqueous-based fluid. Combining flocculants and/or coagulants with electrolysis may allow many materials to emerge as newly formed compound that facilitate the separation of at least one dissimilar material from the water.

Aqueous-based fluids exposed to electrochemical conditioning may be directed to subsequent treatment phases, if necessary, to extract contaminants remaining in water. Contaminants may float to the surface of the water and be removed by skimming, dissolved air flotation and/or induced air flotation apparatus, or equivalent separation apparatus known to those of ordinary skill in the art; or readily settle as a floc in a settling tank, gravity separator, clarifier, weir tank, filter, open-top pit, settling pond, and/or other type of separation apparatus. Electrodes may be energized with electrical energy having an alternating current component or a direct current component. When energizing electrodes with direct current, the polarity of the charge applied to an electrode may periodically be reversed in order to reduce the plating of the surfaces of the electrodes with contaminants and also allow relatively equally degradation of sacrificial electrodes.

As used herein, an electrochemical fluid conditioning apparatus having at least one pair of electrically charged electrodes disposed within a fluid impervious boundary wall having an inner surface, an inlet port for receiving an aqueous-based fluid, and at least one outlet port for discharging an amount of the aqueous-based fluid directed to pass through the charged electrodes may be selected from a group consisting of but not limited to, electrolysis, electrocoagulation, or equivalent electrochemical fluid conditioning known to those of ordinary skill in the art. A magnetically conductive conduit may be disposed within the fluid impervious boundary wall of an electrochemical fluid conditioning apparatus upstream and/or downstream of the electrodes. A magnetically conductive conduit may be disposed upstream and/or downstream of an electrochemical fluid conditioning apparatus.

An aqueous-based mixture may be directed to make a single pass through the magnetically conductive conduit and a single pass through at least one separation apparatus, or a magnetically conditioned aqueous-based medium may be directed to make at least one additional pass through the magnetically conductive conduit, at least one additional pass through at least one separation apparatus, and/or both. At least one separation apparatus may be utilized upstream of the magnetically conductive conduit to separate at least one dissimilar material from the aqueous-based mixture.

Water recovered from a conditioned aqueous-based medium may be directed to pass through subsequent processing methods and apparatus to improve the quality of the fluid. Such methods and apparatus may include pulsed electromagnetic waves generated by at least one antenna and/or cavitation waves generated by at least one transducer to destroy contaminants remaining in the fluid and/or accelerate the extraction of any remaining solid materials. Other fluid processing methods may include filtration systems, distillation systems, desalination equipment, reverse osmosis systems, ultrafiltration, and combinations thereof or equivalent types of separation apparatus known to those of ordinary skill in the art.

An aqueous-based mixture may be directed to a collection vessel. An aqueous-based mixture may be directed to make at least one pass through at least one magnetically energized conduit and the magnetically conditioned aqueous-based medium may then be directed to a collection vessel. In some instances, it may be desirable to blend multiple samples of collected aqueous-based mixtures into a homogenized aqueous-based mixture before directing the homogenized aqueous-based mixture to make at least one pass through at least one magnetically energized conduit; or multiple samples of magnetically conditioned aqueous-based mediums may be blended into a homogenized aqueous-based medium before directing the homogenized magnetically conditioned aqueous-based medium to make at least one additional pass through at least one magnetically energized conduit. An aqueous-based mixture and/or a magnetically conditioned aqueous-based medium may further be directed to pass through at least one separation apparatus and/or pretreatment apparatus to facilitate the separation of at least one dissimilar material from water. An aqueous-based mixture may be directed to make at least one pass through at least one magnetically conductive conduit having magnetic energy directed along the longitudinal axis of the magnetically energized conduit and extending through at least a portion of the aqueous-based mixture thereby providing a conditioned aqueous-based medium, then directed to pass through a first separation apparatus having a capacity to extract at least one hydrocarbon phase from the conditioned aqueous-based medium. The conditioned aqueous-based medium may then be directed to pass through a second separation apparatus having a capacity to extract at least one solid phase from the conditioned aqueous-based medium; then discharged as recovered water having a reduced volume of a hydrocarbon phase and a reduced volume of a solids phase within the water that can be reused (for hydraulic fracturing of petroleum producing formations, for example). In some instances, it may be desirable to direct the conditioned aqueous-based medium to pass through a solids phase separation apparatus prior to directing the conditioned aqueous-based medium to pass through a hydrocarbon phase separation apparatus. A gas phase may be extracted and/or collected from the conditioned aqueous-based medium as it passes through the hydrocarbon phase separation apparatus, the solids phase separation apparatus and/or a separation apparatus dedicated to removing a gas phase from the aqueous-based mixture and/or the conditioned aqueous-based medium. The water may be directed to subsequent chemical treatment and/or separation methods utilized in phase separation, as well as non-conventional water treatment methods (electrocoagulation/electrolysis/ultrasonic/ultrafiltration) and combinations thereof or equivalent types of separation methods known to those of ordinary skill in the art to extract any remaining dissimilar materials and/or contaminants from the water. At least one magnetically conductive conduit may be deployed upstream of at least one collection vessel, at least one pretreatment apparatus and/or at least one separation apparatus.

An aqueous-based mixture may be selected from a group including water containing at least one dissimilar material, aqueous-based solutions, aqueous-based amalgamations, and/or combinations thereof or other fluids containing water known to those of ordinary skill in the art. At least one dissimilar material may be selected from a group including hydrocarbon compounds, chemical compounds, solids, fats, biological contaminants and/or combinations thereof. Hydrocarbon compounds may include, but are not limited to, crude oil, bitumen, shale oils, mineral oils, asphalt, lubricating oils, fuel oils, hydrocarbon fuels, natural gasses, other compounds whose molecules contain carbon, and/or equivalents. Chemical compounds may include, but are not limited to, molecular compounds held together with covalent bonds, salts held together with ionic bonds, intermetallic compounds held together with metallic bonds, complexes held together with coordinated covalent bonds, other chemical substances consisting of two or more chemical elements that can be separated into simpler substances by chemical reactions, and/or combinations and equivalents thereof. Solids may include, but are not limited to, metals, minerals, ceramics, polymers, organic solids, composite materials, natural organic materials having cellulose fibers imbedded in a matrix of lignin, biomaterials, other substances having structural rigidity and resistance to changes in shape or volume, and/or combinations and equivalents thereof. Fats may include, but are not limited to, vegetable oils, grease, other compounds that are generally soluble in organic solvents and generally insoluble in water, and/or combinations and equivalents thereof. Biological contaminants may include, but are not limited to living microorganisms and/or by-products of a living microorganism detrimental to exploration and production activities found in water, aqueous solutions, aqueous-based mixtures, and oilfield exploration and production fluids and/or combinations and equivalents thereof.

FIG. 1 is a schematic diagram of an embodiment of the presently claimed and/or disclosed inventive concepts for phase separation of an aqueous-based mixture wherein a magnetically conductive conduit 2 is shown coupled to a separation apparatus 3 for fluid flow there between. An aqueous-based mixture introduced to port 1 may be directed to pass through fluid entry port 2a at the proximal end of the magnetically conductive conduit before passing through magnetic energy directed along the longitudinal axis of magnetically energized conduit 2. The fluid may then be discharged from fluid discharge port 2b at the distal end of the magnetically conductive conduit as a conditioned aqueous-based medium. The conditioned aqueous-based medium may then be directed through inlet port 3a of separation apparatus 3 having a capacity to separate at least one dissimilar material from the conditioned aqueous-based medium and retaining a volume of at least one dissimilar material within the fluid impervious boundary wall of the separation apparatus, then directed to pass through outlet port 3b of the separation apparatus before being discharged as an amount of water containing a reduced volume of at least one dissimilar material through port 4.

The presently claimed and/or disclosed inventive concepts have been examined and quantified. As disclosed herein in a first example, a length of new ⅛" plastic tubing was deployed through the fluid impervious wall of an embodiment of the presently claimed and disclosed magnetically conductive conduit having a 1" diameter boundary wall and extending through each end of the conduit to establish a fluid flow path; with the tubing being made of a material that, in and of itself, would not affect any physical properties of an aqueous-based mixture sample. A high throughput peristaltic (non-direct contact) pump was then used to propel samples of seawater through the magnetically conductive conduit at a flow rate of 1150 ml/min. A first sample of untreated seawater was collected in a certified clean container after being directed to make only one pass through the length of non-energized magnetically conductive conduit. The sample flowed uncollected for approximately 30 to 45 seconds to allow for the dismissal of any bubbles so that the untreated seawater sample was collected during steady-state flow. A second sample of seawater was collected in a certified clean container after energizing a coiled electrical conductor encircling the conduit with 12 VDC and approximately 5 amps of electrical energy and directing the seawater to make only one pass through a magnetically energized conduit having an area of magnetic conditioning concentrated along a path extending through at least one turn of the electrical conductor encircling the outer surface of the magnetically energized conduit generating approximately 0.085 Tesla (unit of magnetic field measurement) of magnetic energy, as well as approximately 0.015 Tesla of magnetic energy concentrated at each end of the magnetically energized conduit. The magnetically conditioned seawater sample was similarly allowed to flow uncollected for approximately 30 to 45 seconds to allow for the dismissal of any bubbles so that the water sample was collected during steady-state flow. Overall surface tensions of untreated and magnetically conditioned seawater samples were measured by the Wilhelmy plate method, with both samples tested for contact angle against a standard polytetrafluoroethylene (PTFE) hydrophobic reference surface, in order to determine the fraction of the overall surface tension of each sample making up their non-polar surface tensions. Such results are shown in Table I.

TABLE I

Surface Tensions and Contact Angles on PTFE
Untreated and Magnetically Conditioned Sea Water

| Test # | Untreated Sea Water Surface Tension (mN/m) | Conditioned Sea Water Surface Tension (mN/m) | Untreated Sea Water Contact Angle (degrees) | Conditioned Sea Water Contact Angle (degrees) |
| --- | --- | --- | --- | --- |
| 1 | 64.95 | 62.12 | 114.1 | 117.8 |
| 2 | 64.95 | 62.13 | 113.6 | 117.3 |
| 3 | 64.96 | 62.17 | 114.5 | 117.3 |
| 4 | 64.98 | 62.12 | 114.2 | 117.3 |
| 5 | 64.98 | 62.12 | 113.5 | 117.8 |
| Average | 64.96 | 62.13 | 114.0 | 117.5 |
| Std. Dev. | 0.01 | 0.02 | 0.4 | 0.3 |

Reducing the overall surface tension of seawater and increasing its surface polarity makes seawater more hydrophilic. The overall surface tension of untreated seawater (64.96 MilliNewtons per meter, or mN/M) is quite a bit lower than that of pure distilled water (72.5 mN/m), and its surface polarity (68.25%) is a bit higher than that of pure distilled water (63.4%). Seawater contains both surface active impurities in the form of proteins and other organics from sea life that lower overall surface tension, as well as polarity building impurities in the form of salts that increase the surface polarity of seawater.

Untreated seawater had an overall surface tension of 64.96 mN/M, a dispersive surface tension of 20.62 mN/M, a polar surface tension of 44.34 mN/M and surface polarity of 68.25%; magnetically conditioned seawater had an overall surface tension of 62.13 mN/M, a dispersive surface tension of 15.53 mN/M, a polar surface tension of 46.60 mN/M and surface polarity of 75.00%. Such results are shown in Table II.

TABLE II

Untreated and Magnetically
Conditioned Seawater (Flowing through Magnet)

| | Overall Surface Tension (mN/m) | Dispersive Surface Tension (mN/m) | Polar Surface Tension (mN/m) | Surface Polarity (%) |
| --- | --- | --- | --- | --- |
| Untreated Sea Water | 64.96 | 20.62 | 44.34 | 68.25 |
| Conditioned Sea Water | 62.13 | 15.53 | 46.60 | 75.00 |

Interfacial tension is normally moderately high between oil and water, and the two liquids are immiscible because the hydrogen bonding structure of water discourages interaction with the oil. As disclosed herein, experimentation has shown that directing an aqueous-based mixture, (e.g., seawater) and at least one dissimilar material (e.g., motor oil) through a magnetically conductive conduit having magnetic energy directed along the longitudinal axis of the magnetically energized conduit and extending through at least a portion of the aqueous-based mixture provides a conditioned aqueous-based medium, wherein at least one dissimilar material separates from the conditioned aqueous-based medium at an increased rate as compared to a rate of separation of the at least one dissimilar material from the aqueous-based mixture.

The pendant drop method was utilized to analyze the interfacial tensions of seawater against motor oil. A drop of seawater having minerals and salts dissolved in the water to be studied for interfacial tension was formed to about 90% of its detachment volume on the end of a downward-pointing capillary tip, within a bulk phase of the motor oil. The drop was then digitally imaged using a high pixel camera, and analyzed to determine the drop's mean curvature at over 300 points along its surface.

The curvature of the drop that is pendant to the capillary tip, at any given point on its interface with the continuous phase, is dependent on two opposing factors, or forces. Interfacial tension works to keep the drop spherical while gravity works to make the drop elongated or "drip-like"; and the greater the difference in density between the drop of liquid and the continuous phase, the greater this force. Pendant drop evaluation involves observing the balance that exists between gravity and interfacial tension in the form of the drop's mean curvature at various points along its interface with the continuous phase. Lower interfacial tension liquids form a more "drip-like" shape while higher interfacial tension liquids form a more spherical drop shape. The actual mathematics of pendant drop analysis are based on the Laplace equation that says pressure differences exist across curved surfaces. The measurement of interfacial tension is actually made by determining the mean curvature of a drop at over 300 points, with the points then used in pairs in equations to solve for interfacial tension at least 150 times on any given drop; with those interfacial tension values then being averaged to give a single value for the overall interfacial tension of the drop.

This technique requires known values for the densities of all liquids involved in the studies at the conditions of interest, i.e. temperature. Such densities were determined prior to each set of pendant drop experiments by weighing precise volumes of each liquid phase having an identical temperature. The density of seawater was determined to be 1.003 g/cm$^3$ and the density of motor oil was determined to be 0.8423 g/cm$^3$. Using those densities, and as shown in Table III, the following interfacial tensions were determined for the treated and untreated samples.

TABLE III

Interfacial Tensions between Motor Oil and Sea Water

| Test # | Untreated Motor Oil/ Seawater Interfacial Tension (mN/m) | Conditioned Motor Oil/ Sea Water Interfacial Tension (mN/m) |
|---|---|---|
| 1 | 28.36 | 33.14 |
| 2 | 28.33 | 33.05 |
| 3 | 28.39 | 33.10 |
| 4 | 28.42 | 33.14 |
| 5 | 28.42 | 33.08 |
| Average | 28.38 | 33.10 |
| Std. Dev. | 0.03 | 0.04 |

The interfacial tension of untreated seawater and motor oil was determined to be 28.38 mN/M. The interfacial tension of the magnetically conditioned seawater and motor oil was determined to be 33.10 mN/M. The higher interfacial tension of the conditioned motor oil/seawater indicates magnetic conditioning has an emulsion-breaking effect thereby improving oil/water separation.

Figure 1A:
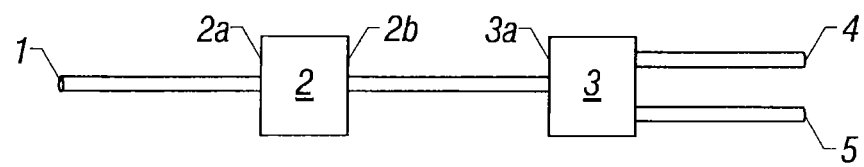
FIG. 1A is a schematic diagram of a magnetically conductive conduit and a separation apparatus.

FIG. 1A is a schematic diagram of an embodiment of the presently claimed and/or disclosed inventive concepts for phase separation of an aqueous-based mixture wherein magnetically conductive conduit 2 is shown coupled to separation apparatus 3 for fluid flow there between. An aqueous-based mixture introduced to port 1 may be directed to pass through fluid entry port 2a at the proximal end of the magnetically conductive conduit before passing through magnetic energy directed along the longitudinal axis of magnetically energized conduit 2. The fluid may then be discharged from fluid discharge port 2b at the distal end of the magnetically conductive conduit as a conditioned aqueous-based medium. The conditioned aqueous-based medium may then be directed through inlet port 3a of separation apparatus 3 having a capacity to separate at least one dissimilar material from the conditioned aqueous-based medium. At least one dissimilar material containing a reduced volume of water may be discharged through outlet port 4, and water having a reduced volume of at least one dissimilar material may be discharged through outlet port 5.

The presently claimed and/or disclosed inventive concepts include a method of increasing the rate by which a dissimilar material separates in an aqueous-based mixture, including the steps of passing a first aqueous-based mixture through a magnetically conductive conduit having magnetic energy directed along the longitudinal axis of the magnetically conductive conduit and extending through at least a portion of the first aqueous-based mixture thereby providing a conditioned aqueous-based medium; and separating the conditioned aqueous-based medium into at least two distinct phases in at least one separation apparatus downstream of the magnetically conductive conduit, wherein the at least one dissimilar material separates from water in the conditioned aqueous-based medium at an increased rate as compared to a rate of separation of the at least one dissimilar material from water in the first aqueous-based mixture. The presently claimed and/or disclosed inventive concepts may further include the step of recovering water from the conditioned aqueous-based medium, wherein the water has a reduced volume of the at least one dissimilar material. The water may be injected into a waterflood formation. The water may be injected into a disposal well. The water may be reclaimed for exploration and production applications. The water may be discharged into the environment, or directed through additional water reclamation processes and discharged into the environment.

The presently claimed and/or disclosed inventive concepts may further include the step of recovering the at least one dissimilar material from the conditioned aqueous-based medium, wherein the at least one dissimilar material has a reduced volume of water. The at least one dissimilar material may be selected from the group consisting of hydrocarbon compounds, autotrophic organisms, biological contaminants, chemical compounds, solid materials, fats, and combinations thereof. The viscosity of the conditioned aqueous-based medium may be lower than the viscosity of the first aqueous-based mixture. A particle size of at least one dissimilar material in the conditioned aqueous-based medium may be larger than a particle size of the at least one dissimilar material in the first aqueous-based mixture. The first aqueous-based mixture may be heated upstream of the magnetically conductive conduit. The conditioned aqueous-based medium may be heated upstream of the at least one separation apparatus and/or within the at least one separation apparatus. At least one chemical compound may be dispersed in the first aqueous-based mixture. At least one chemical compound may be dispersed in the conditioned aqueous-based medium.

Sediment, dirt, oil, and water that accumulate at the bottom of oilfield collection vessels and storage tanks reduce the storage capacity of such vessels and tanks. Oily sludge forms an amalgamated mixture that must be periodically cleaned from such vessels.

Oil sands are a type of unconventional petroleum deposit having naturally occurring mixtures of sand saturated with a form of petroleum technically referred to as bitumen that flows very slowly. Oil sands may be extracted for processing by strip mining, or the oil may be made to flow into wells by in-situ techniques such as cyclic steam stimulation, steam assisted gravity drainage, solvent extraction, vapor extraction or toe to heel processes which reduce oil viscosity by injecting steam, solvents and/or hot air into the sands. These processes can use large quantities of water that are typically blended with the hydrocarbons and solids of the oil sands to form an amalgamated mixture. Significant amounts of energy are required to extract hydrocarbons from amalgamated mixtures and process the water and solids for disposal and/or reuse.

The presently claimed and disclosed inventive concepts of increasing the efficiency of phase separation of a dissimilar material from a first fluid mixture containing at least one polar substance were quantified in a third example. A closed loop system having a 2 gallon collection vessel, a centrifugal pump operating at a flow rate of 4 gpm, and an embodiment of the presently claimed and disclosed magnetically conductive conduit were connected with ½" plastic tubing being made of a material that, in and of itself, would not affect any physical properties of an aqueous-based mixture sample to generate untreated and magnetically conditioned fluid samples. The closed loop system allowed fluid to be pulled from collection vessel by the pump and propelled through the magnetically conductive conduit before being returned to the collection vessel.

A first sample was generated by decanting 500 ml of high mineral content Greek yogurt whey containing suspended solids, such as lactose, calcium, magnesium, lactates and other minerals into the collection vessel. The pump was energized and adjusted to circulate the whey through the system at a rate of 1.0 gallon per minute (gpm). After circulating the untreated whey containing minerals for 2 minutes to allow for the dismissal of any bubbles so that it was circulating at a steady-state flow, a first sample of untreated high mineral content whey was collected in a first 1 liter separatory funnel. The coiled electrical conductor encircling the magnetically conductive conduit was not energized during the generation of the first whey sample.

A second sample was generated by decanting 500 ml of the untreated high mineral content whey into the collection vessel, circulating the untreated whey for 2 minutes to achieve steady-state flow and then energizing the coiled electrical conductor encircling the magnetically conductive conduit with approximately 32 VDC and 10 amps of electrical energy, with the energized conduit configured to induce a negative polarity to fluid flowing through the conduit. The whey was then directed to make 10 passes through areas of magnetic conditioning concentrated along a path extending through the magnetically energized conduit. Approximately 0.330 Tesla of magnetic energy was concentrated near the center of the magnetically energized conduit and approximately 0.100 Tesla of magnetic energy was concentrated at each end of the conduit. The second sample of negatively conditioned high mineral content whey was collected in a second 1 liter separatory funnel. Approximately 30 minutes elapsed between the generation of the first sample and the second sample.

After purging any negatively charged whey from the closed-loop and rinsing the system, a third sample was generated by decanting 500 ml of the untreated high mineral content whey into the collection vessel and circulating the untreated whey for 2 minutes to achieve steady-state flow. Prior to energizing the magnetically energized conduit, the polarity induced by the magnetically energized conduit was reversed. The whey was then directing to make 10 passes through the magnetically energized conduit inducing a positive polarity. The third sample of positively conditioned high mineral content whey was collected in a third 1 liter separatory funnel. Approximately 30 minutes elapsed between the generation of the second sample and the third sample.

The pH of each sample was adjusted to ~7.2 using sodium hydroxide and then the samples were heated to ~80 degrees C. Gravity separation of minerals from the untreated whey (control) and magnetically conditioned samples was observed for 1 hour. Approximately 200 ml of minerals settled to the bottom of the separatory funnel containing the first (untreated) sample, approximately 180 ml of minerals settled to the bottom of the separatory funnel containing the second (negatively conditioned) sample, and approximately 180 ml of minerals settled to the bottom of the separatory funnel containing the third (positively conditioned) sample. After decanting the liquid portion of each separatory funnel, the settled mineral content of each funnel was analyzed.

Using the equation Yield (%)=([(% suspended solids) sub Bottom×([weight)] sub Bottom)/([(% suspended solids) sub feed×([weight)] sub feed)×100, the negatively conditioned sample and the positively conditioned sample were found to each contain approximately 50% more minerals content than the untreated (control) sample. Such results are shown in Table IV.

TABLE IV

Untreated and Magnetically Greek Whey (Flowing through Magnet)

| | Untreated Whey Circulated to Steady-State | Negatively Conditioned Whey 10 Passes | Positively Conditioned Whey 10 Passes |
|---|---|---|---|
| % Separation of Minerals | 40% | 59% | 58% |

Figure 1B:
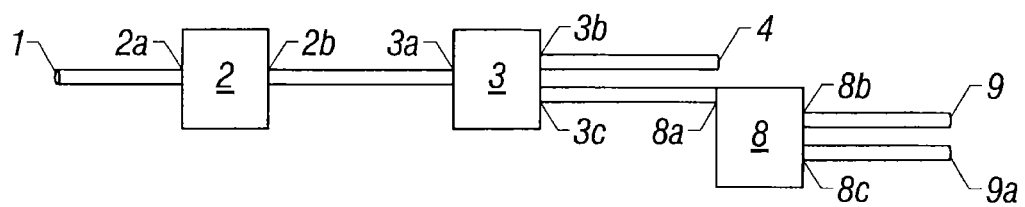
FIG. 1B is a schematic diagram of a magnetically conductive conduit, a first separation apparatus and a second separation apparatus.

FIG. 1B is a schematic diagram of an embodiment of the presently claimed and/or disclosed inventive concepts for phase separation of an aqueous-based mixture wherein magnetically conductive conduit 2 is shown coupled to separation apparatus 3 for fluid flow there between. An aqueous-based mixture introduced to port 1 may be directed to pass through fluid entry port 2a at the proximal end of the magnetically conductive conduit before passing through magnetic energy directed along the longitudinal axis of magnetically energized conduit 2. The fluid may then be discharged from fluid discharge port 2b at the distal end of the magnetically conductive conduit as a conditioned aqueous-based medium. The conditioned aqueous-based medium may then be directed through inlet port 3a of separation apparatus 3 having a capacity to separate a first dissimilar material from the conditioned aqueous-based medium. An amount of the first dissimilar material may be discharged through outlet port 3b before being directed through outlet port 4 as a first dissimilar material containing a reduced volume of the conditioned aqueous-based medium. The conditioned aqueous-based medium having a reduced volume of the first dissimilar material may then be discharged through outlet port 3c of separation apparatus 3 before being directed through inlet port 8a of separation apparatus 8 having a capacity to separate a second dissimilar material from the conditioned aqueous-based medium. An amount of the second dissimilar material may be discharged through outlet port 8b before being directed through outlet port 9 as a second dissimilar material containing a reduced volume of water; and water may be discharged through outlet port 8c before being directed through outlet port 9a as water having a reduced volume of the first dissimilar material and the second dissimilar material.

The presently claimed and/or disclosed inventive concepts include a method for performing phase separation of an aqueous-based mixture, having the steps of passing an amount of a first aqueous-based mixture through a magnetically conductive conduit having magnetic energy directed along the longitudinal axis of the magnetically conductive conduit and extending through at least a portion of the first aqueous-based mixture thereby providing a conditioned aqueous-based medium; establishing a flow of an amount of the conditioned aqueous-based mixture through at least one separation apparatus, said at least one separation apparatus having a capacity to extract at least one of a solid material and a hydrocarbon material from water in the conditioned aqueous-based medium; and separating at least one of a hydrocarbon phase and a solid phase from water in the conditioned aqueous-based medium, wherein at least one of the solid material phase and the hydrocarbon material phase separates from water in the conditioned aqueous-based medium at an increased rate as compared to a rate of separation of at least one of the solid material phase and the hydrocarbon material phase from water in the first aqueous-based mixture.

The presently claimed and/or disclosed inventive concepts may further include the step of recovering water from the conditioned aqueous-based medium, wherein the water has a reduced volume of at least one of the solid phase and the hydrocarbon phase. The water may be injected into a waterflood formation. The water may be injected into a disposal well. The water may be reclaimed for exploration and production applications. The water may be discharged into the environment, or directed through additional water reclamation processes and discharged into the environment.

The presently claimed and/or disclosed inventive concepts may further include the step of recovering at least one solid phase from the conditioned aqueous-based medium, wherein the solid phase has a reduced volume of at least one of the hydrocarbon phase and water; and the step of recovering a hydrocarbon phase from the conditioned aqueous-based medium, wherein the hydrocarbon phase has a reduced volume of at least one of the solid phase and water. The first aqueous-based mixture may be heated upstream of the magnetically conductive conduit. The conditioned aqueous-based medium may be heated upstream of the at least one separation apparatus and/or within the at least one separation apparatus. At least one chemical compound may be dispersed in the first aqueous-based mixture. At least one chemical compound may be dispersed in the conditioned aqueous-based medium. The viscosity of the conditioned aqueous-based medium may be lower than the viscosity of the first aqueous-based mixture. A particle size of at least one dissimilar material in the conditioned aqueous-based medium may be larger than a particle size of at least one of the solid material and the hydrocarbon material in the first aqueous-based mixture.

The presently claimed and/or disclosed inventive concepts include a method for performing phase separation of an aqueous-based mixture, having the steps of collecting an amount of water containing at least one solid material and at least one hydrocarbon material to form a first aqueous-based mixture; passing an amount of the first aqueous-based mixture through a magnetically conductive conduit having magnetic energy directed along the longitudinal axis of the magnetically conductive conduit and extending through at least a portion of the first aqueous-based mixture thereby providing a conditioned aqueous-based medium; and separating water, a hydrocarbon phase, and a solid phase from the conditioned aqueous-based medium, wherein water separates from the conditioned aqueous-based medium at an increased rate as compared to a rate of separation of water from the first aqueous-based mixture.

The presently claimed and/or disclosed inventive concepts may further include the step of recovering water from the conditioned aqueous-based medium, wherein the water has a reduced volume of at least one of the solid phase and the hydrocarbon phase. The water may be injected into a waterflood formation. The water may be injected into a disposal well. The water may be reclaimed for exploration and production applications. The water may be discharged into the environment, or directed through additional water reclamation processes and discharged into the environment.

The presently claimed and/or disclosed inventive concepts may further include the step of recovering the solid phase from the conditioned aqueous-based medium, wherein the solid phase has a reduced volume of the hydrocarbon phase and water; and the step of recovering the hydrocarbon phase from the conditioned aqueous-based medium, wherein the hydrocarbon phase has a reduced volume of the solid phase and water.

The first aqueous-based mixture may be heated upstream of the magnetically conductive conduit. The conditioned aqueous-based medium may be heated upstream of the at least one separation apparatus and/or within the at least one separation apparatus. At least one chemical compound may be dispersed in the first aqueous-based mixture. At least one chemical compound may be dispersed in the conditioned aqueous-based medium. The viscosity of the conditioned aqueous-based medium may be lower than the viscosity of the first aqueous-based mixture. A particle size of at least one of the solid material and the hydrocarbon material in the conditioned aqueous-based medium may be larger than a particle size of at least one of the solid material and the hydrocarbon material in the first aqueous-based mixture.

The presently claimed and/or disclosed inventive concepts include a method of separating at least one dissimilar material from an aqueous-based mixture, having the steps of establishing a flow of a first aqueous-based mixture through a magnetically conductive conduit having magnetic energy directed along the longitudinal axis of the magnetically conductive conduit and extending through at least a portion of the first aqueous-based mixture thereby providing a conditioned aqueous-based medium; and directing a flow of at least a portion of the conditioned aqueous-based medium through at least one separation apparatus. The first aqueous-based mixture may be heated upstream of the magnetically conductive conduit. The conditioned aqueous-based medium may be heated upstream of the at least one separation apparatus and/or within the at least one separation apparatus. At least one chemical compound may be dispersed in the first aqueous-based mixture. At least one chemical compound may be dispersed in the conditioned aqueous-based medium. The viscosity of the conditioned aqueous-based medium may be lower than the viscosity of the first aqueous-based mixture. A particle size of at least one dissimilar material in the conditioned aqueous-based medium may be larger than a particle size of the at least one dissimilar material in the first aqueous-based mixture.

The presently claimed and/or disclosed inventive concepts include a method of increasing the efficiency of phase separation of a dissimilar material from a first aqueous-based mixture at ambient temperature, having the step of installing a magnetically conductive conduit having magnetic energy directed along the longitudinal axis of the magnetically conductive conduit upstream of an inlet of at least one separation apparatus thereby providing a conditioned aqueous-based medium entering the inlet of a separation system, wherein the at least one dissimilar material separates from the conditioned aqueous-based medium at an increased rate as compared to a rate of separation of the at least one dissimilar material from the first aqueous-based mixture. At least one chemical compound may be dispersed in the first aqueous-based mixture. At least one chemical compound may be dispersed in the conditioned aqueous-based medium. The viscosity of the conditioned aqueous-based medium may be lower than the viscosity of the first aqueous-based mixture. A particle size of at least one dissimilar material in the conditioned aqueous-based medium may be larger than a particle size of the at least one dissimilar material in the first aqueous-based mixture.

Figure 1C:
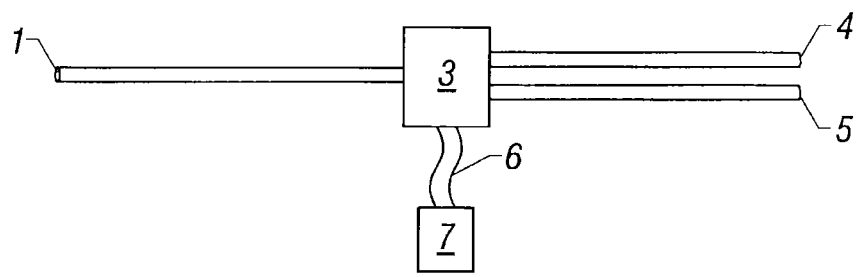
FIG. 1C schematically depicts a magnetically conductive conduit disposed within a separation apparatus.

FIG. 1C schematically depicts an embodiment of the presently claimed and/or disclosed inventive concepts for increasing the efficiency of phase separation of a dissimilar material from an aqueous-based mixture wherein a magnetically conductive conduit is disposed within separation apparatus 3.

The presently claimed and/or disclosed inventive concepts for increasing the efficiency of phase separation of a dissimilar material from an aqueous-based mixture includes the steps of establishing a flow of a first aqueous-based mixture through an inlet port of a separation apparatus having a capacity to separate the at least one dissimilar material from a conditioned aqueous-based medium. Separation apparatus 3 has a fluid impervious boundary wall having an inner surface, the inlet port for receiving the aqueous-based mixture, a first outlet port for discharging a first amount of water having a reduced volume of the at least one dissimilar material and a second outlet port for discharging the at least one dissimilar material containing a reduced volume of water. The first aqueous-based mixture may then be directed to pass through a magnetically conductive conduit disposed downstream of the inlet port and within the inner surface of the fluid impervious wall of separation apparatus 3, the magnetically conductive conduit having magnetic energy directed along the longitudinal axis of the magnetically energized conduit and extending through at least a portion of the first aqueous-based mixture, thereby provides a conditioned aqueous-based medium. A flow of at least a portion of the conditioned aqueous-based medium may then be directed through the separation apparatus, wherein the at least one dissimilar material separates from water in the conditioned aqueous-based medium at an increased rate as compared to a rate of separation of the at least one dissimilar material from water in the first aqueous-based mixture.

At least one electrical power supply 7 is shown operably connected to at least one of the first and second conductor leads 6 of the magnetically conductive conduit disposed within separation apparatus 3. Heat produced by the magnetically energized conduit may radiate into the conditioned aqueous-based medium within separation apparatus 3 to increase the rate of phase separation. An amount of water having a reduced volume of the at least one dissimilar material may then be discharged from first outlet port 4, and at least one dissimilar material containing a reduced volume of water may then be discharged from second outlet port 5. At least one chemical compound may be dispersed in the first aqueous-based mixture. At least one chemical compound may be dispersed in the conditioned aqueous-based medium. The viscosity of the conditioned aqueous-based medium may be lower than the viscosity of the first aqueous-based mixture. A particle size of at least one dissimilar material in the conditioned aqueous-based medium may be larger than a particle size of the at least one dissimilar material in the first aqueous-based mixture.

In each embodiment of the presently claimed and/or disclosed inventive concepts for separating at least one dissimilar material from an aqueous-based mixture, it can be appreciated that magnetic energy may be concentrated in a plurality of distinct areas along the longitudinal axis of the magnetically energized conduit.

Figure 2:
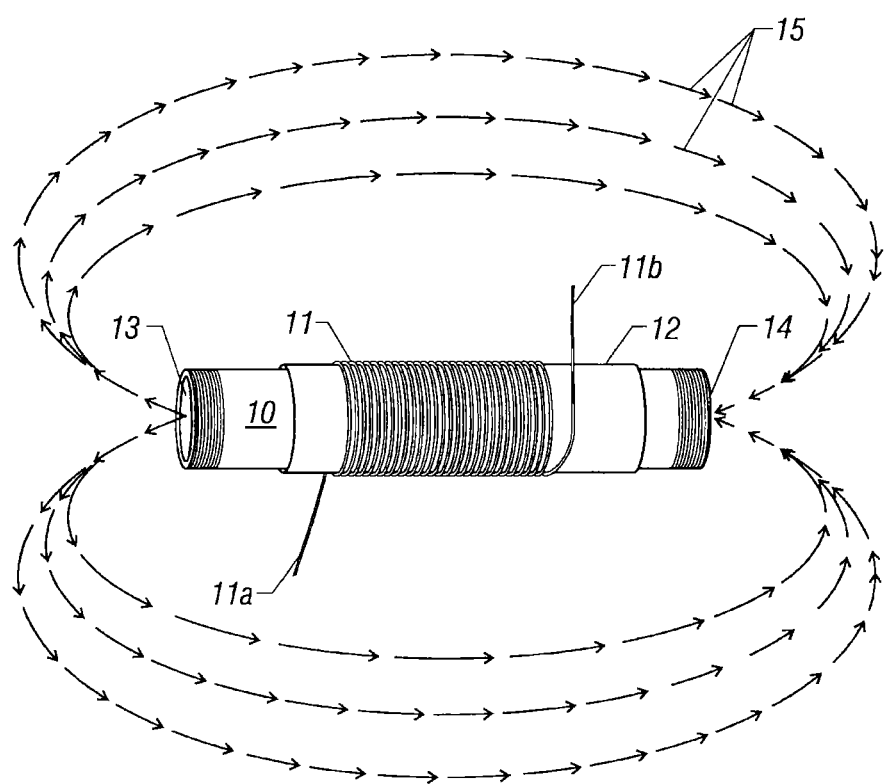
FIG. 2 schematically depicts the flow of magnetic flux loops encircling a length of magnetically energized conduit.

FIG. 2 shows a flow of magnetic flux loops 15 generated by energized coil 11. Coil core 12 is shown sleeving a section of magnetically conductive conduit 10 wherein coiled electrical conductor 11 encircling coil core 12 sleeves at least a section of an outer surface of magnetically conductive conduit 10 with at least one turn of the electrical conductor oriented substantially orthogonal to the longitudinal axis of the conduit. A single length of electrical conducting material is shown forming coil 11.

Operably connecting first conductor lead 11a and second conductor lead 11b to at least one supply of electrical power energizes the coiled electrical conductor and produce an electromagnetic field absorbed by magnetically conductive conduit 10 and concentrated within the inner surface of the fluid impervious boundary wall of the conduit. Magnetic flux loops 15 are shown consolidated at a point beyond port 13 at the proximal end of magnetically energized conduit 10, flowing around the periphery of continuous coil 11 along the longitudinal axis of the conduit and reconsolidating at a point beyond port 14 at the distal end of the magnetically energized conduit. A fluid, such as water, an aqueous-based mixture, an aqueous solution and/or an exploration and production fluid, directed to pass through magnetically energized conduit 10 may receive magnetic conditioning in at least one region along the fluid flow path extending through the magnetically energized conduit. Magnetically conductive coupling devices and/or conduits and/or non-magnetically conductive coupling devices and/or conduits may be utilized to make fluid impervious connections with inlet port 13 and outlet port 14 of magnetically energized conduit 10 to promote the flow of fluid through magnetic energy. Magnetically conductive conduits and/or non-magnetically conductive conduits may be sleeved within the fluid impervious boundary wall of magnetically energized conduit 10 to promote the flow of fluid through magnetic energy.

FIG. 3 schematically depicts an embodiment of the magnetically conductive conduit having a length of magnetically conductive material 30 defining a fluid impervious boundary wall with an inner surface and an outer surface and having port 30a at the proximal end of the conduit and port 30b at the distal end of the conduit. The inner surface of the boundary wall of magnetically conductive conduit 30 establishes a fluid flow path extending along the longitudinal axis of the conduit. A single length of electrical conducting material is shown forming first coil layer 33 and second layer 34 encircling the outer surface of magnetically conductive conduit 30 wherein the coiled electrical conductor sleeves at least a section of an outer surface of the magnetically conductive conduit with at least one turn of the electrical conductor oriented substantially orthogonal to the fluid flow path extending through the conduit. Non-magnetic stabilizer 35 is shown disposed between the coil layers. Conductor leads 33a and 34a may be operably connected to at least one electrical power supply to energize the coiled electrical conductor and establish a magnetic field having lines of flux directed along the flow path of the fluid. Introducing a fluid, such as water, an aqueous-based mixture, an aqueous solution and/or an exploration and production fluid, to port 30a may direct the fluid to pass through at least one area of magnetic energy concentrated along a path extending through at least one turn of electrical conducting material encircling the outer surface of magnetically conductive conduit 30.

Coupling segment 20 is an embodiment of a non-magnetically conductive fluid flow conduit utilized to promote a flow of fluid through magnetically conductive conduit 30, said coupling segment having a non-magnetically conductive material defining a fluid impervious boundary wall with an inner surface and an outer surface and having inlet port 20a and outlet port 20b. Outlet port 20b may be adapted to provide for the fluid impervious connection with port 30a of magnetically conductive conduit 30, and inlet port 20a may be adapted to provide for the fluid impervious, non-contiguous connection of magnetically conductive conduit 30 with an additional segment of conduit, said non-contiguous connection establishing a non-magnetically conductive region providing for a concentration of magnetic energy at port 30a of conduit 30.

The non-contiguous connection between the magnetically conductive conduit 30 and an additional segment of magnetically conductive conduit establishes a non-magnetically conductive region providing for an increased concentration of magnetic energy in the space between the magnetically conductive conduits. An additional non-magnetically conductive coupling segment may similarly provide for the connection of port 30*b* of magnetically conductive conduit 30 with an additional segment of conduit to establish a non-magnetically conductive region providing for a concentration of magnetic energy at port 30*b* of magnetically conductive conduit 30.

Non-magnetically conductive conduit 21 is an embodiment of a non-magnetically conductive fluid flow conduit utilized to promote a flow of a fluid through magnetically conductive conduit 30, said fluid flow conduit having a non-magnetically conductive material defining a fluid impervious boundary wall with an inner surface and an outer surface and having port 21*a* adapted to provide for the fluid impervious connection of fluid flow conduit 21 with port 30*a* of magnetically energized conduit 30, whereby said connection establishes a non-magnetically conductive region providing for a concentration of magnetic energy at port 30*a* of magnetically conductive conduit 30. An additional segment of non-magnetically conductive fluid flow conduit may similarly be adapted to provide a fluid impervious connection with port 30*b* of magnetically conductive conduit 30 to establish a non-magnetically conductive region providing for a concentration of magnetic energy at port 30*b* of magnetically conductive conduit 30.

FIG. 3A schematically depicts an embodiment of the magnetically conductive conduit having a length of magnetically conductive material 30 defining a fluid impervious boundary wall with an inner surface and an outer surface and having port 30*a* at the proximal end of the conduit and port 30*b* at the distal end of the conduit. The inner surface of the boundary wall of magnetically conductive conduit 30 establishes a fluid flow path extending along the longitudinal axis of the conduit. A first length of electrical conducting material forming coil layer 33 and a second length of electrical conducting material forming coil layer 34 are shown encircling magnetically conductive conduit 30, wherein the coiled electrical conductor sleeves at least a section of an outer surface of magnetically conductive conduit 30 with at least one turn of the electrical conductor oriented substantially orthogonal to the fluid flow path extending through the conduit. Non-magnetic stabilizer 35 is shown disposed between the layers of electrical conducting material to maintain the alignment of the coaxially disposed coil layers.

First conductor lead 33*a* and second conductor lead 33*b* of the first coil layer and first conductor lead 34*a* and second conductor lead 34*b* of the second coil layer may be operably connected separately and/or in combination to at least one supply of electrical power, to energize the coils. The first and second conductor leads of the first length of electrical conducting material may be connected to a first at least one supply of electrical power and first and second conductor leads of the second length of electrical conducting material may be connected to a second at least one supply of electrical power to energize the coils.

Fluid flow conduit 22 is an embodiment of a non-magnetically conductive fluid flow conduit utilized to promote a flow of a fluid, such as water, an aqueous-based mixture, an aqueous solution and/or an exploration and production fluid, through magnetically conductive conduit 30, said fluid flow conduit defining a section of conduit within a piping system having a non-magnetically conductive material sleeved within magnetically conductive conduit 30, the fluid flow conduit being made with a length of non-magnetically conductive material defining a fluid impervious boundary wall with an inner surface and an outer surface and having inlet and outlet ports. Introducing a fluid to the inlet of conduit 22 may direct the fluid to pass through a first area of magnetic conditioning concentrated at port 30*a* at the proximal end of magnetically energized conduit 30, a second area of magnetic conditioning concentrated along a path extending through at least one turn of electrical conducting material encircling the outer surface of magnetically conductive conduit 30 and a third area of magnetic conditioning concentrated at port 30*b* at the distal end of magnetically energized conduit 30.

In an alternate embodiment of the magnetically conductive conduit wherein more than one length of magnetically conductive material forms the magnetically conductive conduit, magnetically conductive fluid flow conduit 22 may be sleeved within magnetically conductive conduit 30 to increase the density and thickness of the fluid impervious boundary wall and provide for greater concentrations of magnetic energy within the magnetically conductive conduit. A fluid directed to pass through magnetically conductive fluid flow conduit 22 may be exposed to at least one area of concentrated magnetic energy.

FIG. 4 schematically depicts an alternate embodiment of the magnetically conductive conduit having more than one length of magnetically conductive material forming the magnetically conductive conduit. A serial coupling of a magnetically conductive inlet conduit segment, a non-magnetically conductive intermediate conduit segment and a magnetically conductive outlet conduit segment may form the magnetically conductive conduit, each conduit segment having a length of material defining a fluid impervious boundary wall with an inner surface and an outer surface and having a port at the proximal end of the conduit segment and a port at the distal end of the conduit segment. The inner surfaces of the boundary walls of the serial coupling of conduit segments establish a flow path extending along the longitudinal axis of the magnetically conductive conduit.

The serial coupling of magnetically conductive inlet conduit segment 30, non-magnetically conductive intermediate conduit segment 31 and magnetically conductive outlet conduit segment 32 establishes a non-magnetically conductive region between the magnetically conductive conduit segments that provides for a concentration of magnetic energy in the area between distal port 30*b* of magnetically conductive inlet conduit segment 30 and proximal port 32*a* of magnetically conductive outlet conduit segment 32. A single length of electrical conducting material is shown forming first coil layer 33 and second coil layer 34 encircling magnetically conductive inlet conduit segment 30, non-magnetically conductive intermediate conduit segment 31 and magnetically conductive outlet conduit segment 32, wherein the coiled electrical conductor sleeves at least a section of an outer surface of at least each magnetically conductive conduit segment with at least one turn of the electrical conductor oriented substantially orthogonal to the fluid flow path extending through the magnetically conductive conduit. Non-magnetic stabilizer 35 is shown disposed between the coil layers to maintain the alignment of the coaxially disposed coil layers.

First conductor lead 33*a* and second conductor lead 34*a* may be operably connected to at least one supply of electrical power to energize the coiled electrical conductor and establish a magnetic field having lines of flux directed along the flow path of the fluid. Introducing a fluid, such as water, an aqueous-based mixture, an aqueous solution and/or an exploration and production fluid, to port 30*a* may direct a flow of the fluid to pass through a first area of magnetic conditioning concentrated at port 30*a* at the proximal end of the magnetically energized conduit. The flow of fluid may then pass through a second area of magnetic conditioning concentrated along a path extending through at least one turn of the coiled electrical conductor encircling the outer surface of magnetically energized inlet conduit segment 30 and a third area of magnetic conditioning concentrated in the space between port 30*b* at the distal end of magnetically energized inlet conduit segment 30 and port 32*a* at the proximal end of magnetically energized outlet conduit segment 32. The fluid may then pass through a fourth area of magnetic conditioning concentrated along a path extending through at least one turn of the coiled electrical conductor encircling the outer surface of magnetically energized outlet conduit segment 32 and a fifth area of magnetic conditioning concentrated at port 32*b* at the distal end of the magnetically energized conduit.

Coupling segment 20 is an embodiment of a non-magnetically conductive fluid flow conduit utilized to promote a flow of fluid through the magnetically conductive conduit, said coupling segment including a non-magnetically conductive material defining a fluid impervious boundary wall with an inner surface and an outer surface and having inlet port 20*a* and outlet port 20*b*. Outlet port 20*b* may be adapted to provide for the fluid impervious connection with port 30*a* of magnetically energized inlet conduit segment 30 and inlet port 20*a* may be adapted to provide for the fluid impervious, non-contiguous connection of the magnetically energized conduit with an additional segment of conduit, said non-contiguous connection establishing a non-magnetically conductive region providing for a concentration of magnetic energy at port 30*a* of the magnetically energized conduit.

The non-contiguous connection between magnetically energized inlet conduit segment 30 and an additional segment of magnetically conductive conduit establishes a non-magnetically conductive region providing for an increased concentration of magnetic energy in the space between magnetically energized inlet conduit segment 30 and the additional segment of magnetically conductive conduit. An additional non-magnetically conductive coupling segment may similarly provide for the connection of port 32*b* of magnetically conductive outlet conduit segment 32 with an additional segment of conduit to establish a non-magnetically conductive region providing for a concentration of magnetic energy at port 32*b* of the magnetically energized conduit.

Non-magnetically conductive conduit 21 is an embodiment of a non-magnetically conductive fluid flow conduit utilized to promote a flow of a fluid through the magnetically conductive conduit, said fluid flow conduit including a non-magnetically conductive material defining a fluid impervious boundary wall with an inner surface and an outer surface and having port 21*a* adapted to provide for the fluid impervious connection of said fluid flow conduit with port 30*a* of magnetically energized inlet conduit segment 30, whereby said connection establishes a non-magnetically conductive region providing for a concentration of magnetic energy at port 30*a* of the magnetically energized conduit. An additional segment of non-magnetically conductive fluid flow conduit may similarly be adapted to provide a fluid impervious connection with port 32*b* of the magnetically energized outlet conduit segment to establish a non-magnetically conductive region providing for a concentration of magnetic energy at port 32*b* of the magnetically energized conduit.

FIG. 4A schematically depicts an alternate embodiment of the magnetically conductive conduit having more than one length of magnetically conductive material forming the magnetically conductive conduit wherein the inner surfaces of the boundary walls of the serial coupling of conduit segments establish a flow path extending along the longitudinal axis of the magnetically conductive conduit.

A first length of electrical conducting material is shown forming first coil layer 33 having conductor leads 33*a* and 33*b* encircling magnetically conductive inlet conduit segment 30, a second length of electrical conducting material is shown forming second coil layer 34 having conductor leads 34*a* and 34*b* encircling coil layer 33. Coil core 36 is shown sleeving magnetically conductive outlet conduit segment 32. A third length of electrical conducting material is shown forming a first coil layer 37 having conductor leads 37*a* and 37*b* encircling coil core 36 and a fourth length of electrical conducting material is shown forming second coil layer 38 having conductor leads 38*a* and 38*b* encircling coil layer 37, wherein the coiled electrical conductors sleeve at least a section of an outer surface of a magnetically conductive conduit segment with at least one turn of the electrical conductor oriented substantially orthogonal to the fluid flow path extending through the magnetically conductive conduit. Non-magnetic stabilizer 35 is shown disposed between the layers of coiled electrical conducting material to maintain the alignment of the layers.

Conductor leads 33*a* and 33*b*, 34*a* and 34*b*, 37*a* and 37*b* and 38*a* and 38*b* may be operably connected separately and/or in combination to at least one supply of electrical power. Energizing the coiled electrical conductor with at least one supply of electrical power produces an electromagnetic field conducted by the magnetically conductive inlet conduit segment and the magnetically conductive outlet conduit segment and concentrated within the inner surface of the fluid impervious boundary wall of each segment of magnetically conductive conduit, said magnetic field extending beyond each end of the magnetically conductive inlet conduit segment and magnetically conductive outlet conduit segment along the longitudinal axis of the magnetically energized conduit.

Fluid flow conduit 22 is an embodiment of a non-magnetically conductive fluid flow conduit utilized to establish a fluid flow path extending along the longitudinal axis of the magnetically conductive conduit, said fluid flow conduit defining a section of conduit within a piping system having a non-magnetically conductive material sleeved by magnetically conductive inlet conduit segment 30, non-magnetically conductive intermediate conduit segment 31 and magnetically conductive outlet conduit segment 32, said fluid flow conduit being made with a length of non-magnetically conductive material defining a fluid impervious boundary wall with an inner surface and an outer surface and having inlet and outlet ports.

Introducing a fluid, such as water, an aqueous-based mixture, an aqueous solution and/or an exploration and production fluid, to the inlet port of fluid flow conduit 22 may direct the fluid to pass through a first area of magnetic conditioning concentrated at port 30*a* at the proximal end of the magnetically energized conduit, a second area of magnetic conditioning concentrated along a path extending through at least one turn of electrical conductor encircling the outer surface of magnetically energized inlet conduit segment 30, a third area of magnetic conditioning concentrated within non-magnetically conductive conduit segment 31 in the space between port 30*b* at the distal end of the magnetically energized inlet conduit segment and port 32*a* at the proximal end of the magnetically energized outlet conduit segment, a fourth area of magnetic conditioning concentrated along a path extending through at least one turn of electrical conductor encircling the outer surface of magnetically energized outlet conduit segment 32 and a fifth area of magnetic conditioning concentrated at port 32b at the distal end of the magnetically energized conduit.

In an alternate embodiment of the magnetically conductive conduit wherein more than one length of magnetically conductive material forms the magnetically conductive conduit, magnetically conductive fluid flow conduit 22 may be sleeved within magnetically conductive inlet conduit segment 30, non-magnetically conductive intermediate conduit segment 31 and magnetically conductive outlet conduit segment 32 to increase the density and thickness of the fluid impervious boundary wall and provide for greater concentrations of magnetic energy within the magnetically conductive conduit. A fluid directed to pass through magnetically conductive fluid flow conduit 22 may be exposed to at least one area of concentrated magnetic energy.

Figure 5:
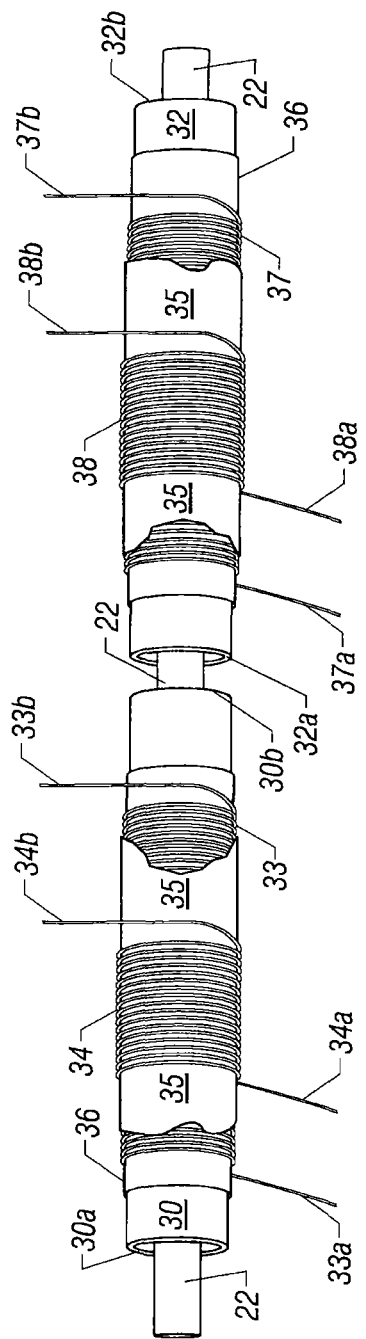
FIG. 5 schematically depicts a non-contiguous array of magnetically conductive conduits sleeving a fluid flow conduit.

FIG. 5 schematically depicts an alternate embodiment of the magnetically conductive conduit having more than one length of magnetically conductive material forming the magnetically conductive conduit with a non-contiguous array of first magnetically conductive conduit 30 and second magnetically conductive conduit 32 forming the magnetically conductive conduit. Fluid flow conduit 22, made with a length of non-magnetically conductive material defining a fluid impervious boundary wall with an inner surface and an outer surface and having a fluid entry port at one end of the conduit and a fluid discharge port at the other end of the conduit, is shown extending through fluid entry port 30a at the proximal end of the magnetically conductive conduit, port 30b at a distal end of magnetically conductive conduit 30, port 32a at a proximal end of magnetically conductive conduit 32 and fluid discharge port 32b at a distal end of the magnetically conductive conduit to define a fluid flow path extending along the longitudinal axis of the magnetically conductive conduit.

A first length of an electrical conducting material having first conductor lead 33a and second conductor lead 33b forms first coil layer 33 encircling coil core 36, a second length of an electrical conducting material having first conductor lead 34a and second conductor lead 34b forms second coil layer 34 encircling coil layer 33, a third length of an electrical conducting material having first conductor lead 37a and second conductor lead 37b forms first coil layer 37 encircling coil core 36 and a fourth length of an electrical conducting material having first conductor lead 38a and second conductor lead 38b forms second coil layer 38 encircling coil layer 37, wherein each coiled electrical conductor sleeves at least a section of an outer surface of a length of magnetically conductive material forming the magnetically conductive conduit with at least one turn of the electrical conductor oriented substantially orthogonal to the fluid flow path extending through the conduit.

Coil core 36 is shown sleeving a section of the outer surface of magnetically conductive conduit 30 and coil core 36 is shown sleeving a section of the outer surface of magnetically conductive conduit 32. Non-magnetically conductive material 35 is shown disposed between the first and second layers of electrical conductors to maintain the alignment of the coil layers. At least one electrical power supply may be operably connected to at least one conductor lead to energize the coiled electrical conductors to produce a magnetic field having lines of flux directed along the fluid flow path. A fluid, such as water, an aqueous-based mixture, an aqueous solution and/or an exploration and production fluid, flowing through non-magnetically conductive fluid flow conduit 22 may be directed to pass through a first area of fluid conditioning at port 30a, a second area of magnetic conditioning along a path extending through and substantially orthogonal to each turn of the electrical conductors forming coils 33 and 34 encircling magnetically conductive conduit 30, a third area of magnetic conditioning in the space between port 30b and port 32a, a fourth area of magnetic conditioning along a path extending through and substantially orthogonal to each turn of the electrical conductors forming coils 37 and 38 encircling the outer surface of magnetically conductive conduit 32 and a fifth area of magnetic conditioning at port 32b.

In an alternate embodiment of the magnetically conductive conduit wherein more than one length of magnetically conductive material forms the magnetically conductive conduit, magnetically conductive fluid flow conduit 22 may be sleeved within magnetically conductive conduit 30, the space between port 30b of magnetically conductive conduit 30 and port 32a of magnetically conductive conduit 32, and magnetically conductive conduit 32 to increase the density and thickness of the fluid impervious boundary wall and provide for greater concentrations of magnetic energy within the magnetically conductive conduit. A fluid directed to pass through magnetically conductive fluid flow conduit 22 may be exposed to at least one area of concentrated magnetic energy.

Embodiments of the magnetically conductive conduit having a non-contiguous array of magnetically conductive conduits may be energized with at least one coil sleeving at least a section of a first magnetically conductive conduit, a non-magnetically conductive region between the magnetically conductive conduits and at least a section of a second magnetically conductive conduit.

An alternate embodiment of the magnetically conductive conduit may be made of a sheet of magnetically conductive material rolled into at least one layer to form a tube defining a boundary wall with an inner surface and an outer surface and having a port at the proximal end of the tube and a port at the distal end of the tube.

The inner and outer surfaces of the fluid impervious boundary wall of the magnetically conductive conduit may be covered with a protective coating to prevent corrosion and extend the functional life of the conduit. At least one end of a fluid impervious boundary wall of the magnetically conductive conduit may be tapered. A non-magnetic stabilizing material may be disposed between the outer surface of the magnetically conductive conduit and the coiled electrical conductor, between the outer surface of the magnetically conductive conduit and the inner surface of a coil core, and/or between the outer surface of a coil core and the coiled electrical conductor. A non-magnetic stabilizing material may envelope the outer layer of a coiled electrical conductor to maintain the alignment of the coil and protect the electrical conducting material from cuts and abrasions.

FIG. 6 schematically depicts an alternate embodiment of the magnetically conductive conduit having more than one length of magnetically conductive material forming the magnetically conductive conduit with an exploded view of first length of magnetically conductive conduit segment 53 adapted to sleeve second length of magnetically conductive conduit segment 18, whereby at least a section of the inner surface of the boundary wall of magnetically conductive conduit segment 53 may be coaxially disposed in substantially concentric surrounding relation to at least a section of the outer surface of the boundary wall of magnetically conductive conduit segment 18, with the inner surface of the boundary wall of conduit segment 18 establishing a fluid flow path extending along the longitudinal axis of the magnetically conductive conduit. Coiled electrical conductor 54 is shown encircling coil core 54c.

Coil core 54c is shown sleeving a section of conduit segment 53 so that at least one turn of the coiled electrical conductor encircles at least a section of the outer surface of magnetically conductive conduit segment 53. As magnetically conductive conduit segment 53 sleeves magnetically conductive conduit segment 18, at least one coiled electrical conductor may encircle at least a section of each segment of magnetically conductive material with at least one turn of the electrical conductor oriented substantially orthogonal to the fluid flow path extending through the magnetically conductive conduit.

FIG. 6A schematically depicts an alternate embodiment of the magnetically conductive conduit having more than one length of magnetically conductive material forming the magnetically conductive conduit with an exploded view of magnetically conductive conduit segment 53 adapted to sleeve the non-contiguous array of magnetically conductive conduit segment 18 and magnetically conductive conduit segment 18a, whereby at least a section of the inner surface of the boundary wall of magnetically conductive conduit segment 53 may be coaxially disposed in substantially concentric surrounding relation to at least a section of the outer surface of the boundary wall of magnetically conductive conduit segment 18, a non-magnetically conductive region between the distal end of magnetically conductive conduit segment 18 and the proximal end of magnetically conductive conduit segment 18a, and at least a section of the outer surface of the boundary wall of magnetically conductive conduit segment 18a.

A spacer made of a non-magnetically conductive material may be utilized to maintain the non-magnetically conductive region between the distal end of magnetically conductive conduit segment 18 and the proximal end of magnetically conductive conduit segment 18a, with the inner surfaces of the boundary walls of magnetically conductive conduit segment 18 and magnetically conductive conduit segment 18a establishing a flow path extending along the longitudinal axis of the magnetically conductive conduit. As magnetically conductive conduit segment 53 sleeves the non-contiguous array of magnetically conductive conduit segment 18 and magnetically conductive conduit segment 18a, at least one coiled electrical conductor encircling at least a section of the outer surface of magnetically conductive conduit segment 53 may encircle at least a section of each segment of magnetically conductive material with at least one turn of the electrical conductor oriented substantially orthogonal to the fluid flow path extending through the magnetically conductive conduit.

FIG. 6B schematically depicts an alternate embodiment of the magnetically conductive conduit having more than one length of magnetically conductive material forming the magnetically conductive conduit with an exploded view of magnetically conductive conduit segment 53 adapted to sleeve a serial coupling of magnetically conductive conduit segment 18, non-magnetically conductive conduit segment 18b and magnetically conductive conduit segment 18a, with the inner surfaces of the boundary walls of magnetically conductive conduit segment 18, non-magnetically conductive conduit segment 18b and magnetically conductive conduit segment 18a establishing a fluid flow path extending along the longitudinal axis of the magnetically conductive conduit. As magnetically conductive conduit segment 53 sleeves the serial coupling of magnetically conductive conduit segment 18, non-magnetically conductive conduit segment 18b and magnetically conductive conduit segment 18a, at least one coiled electrical conductor encircling at least a section of the outer surface of magnetically conductive conduit segment 53 may encircle at least a section of each length of magnetically conductive material with at least one turn of the electrical conductor oriented substantially orthogonal to the fluid flow path extending through the magnetically conductive conduit.

In an alternate embodiment of the magnetically conductive conduit having more than one length of magnetically conductive material forming the magnetically conductive conduit, a first segment of magnetically conductive material may be adapted to sleeve at least a section of the outer surface of magnetically conductive conduit segment 18 and a second segment of magnetically conductive material may be adapted to sleeve at least a section of the outer surface of magnetically conductive conduit segment 18a. At least one coiled electrical conductor encircling at least a section of the first segment of magnetically conductive material may be adapted to sleeve at least a section of the outer surface of magnetically conductive conduit segment 18 with at least one turn of the electrical conductor oriented substantially orthogonal to the fluid flow path extending through the magnetically conductive conduit and at least one coiled electrical conductor encircling at least a section of the second segment of magnetically conductive material may be adapted to sleeve at least a section of the outer surface of magnetically conductive conduit segment 18a with at least one turn of the electrical conductor oriented substantially orthogonal to the fluid flow path extending through the magnetically conductive conduit.

FIG. 6C schematically depicts an alternate embodiment of the magnetically conductive conduit having more than one length of magnetically conductive material forming the magnetically conductive conduit with an exploded view of first serial coupling of magnetically conductive conduit segment 53, non-magnetically conductive conduit segment 53a and magnetically conductive conduit segment 53b adapted to sleeve second serial coupling of magnetically conductive conduit segment 18, non-magnetically conductive conduit segment 18b and magnetically conductive conduit segment 18a, with the inner surfaces of the boundary walls of magnetically conductive conduit segment 18, non-magnetically conductive conduit segment 18b and magnetically conductive conduit segment 18a establishing a fluid flow path extending along the longitudinal axis of the magnetically conductive conduit. As magnetically conductive conduit segment 53, non-magnetically conductive conduit segment 53a and magnetically conductive conduit segment 53b sleeve magnetically conductive conduit segment 18, non-magnetically conductive conduit segment 18b and magnetically conductive conduit segment 18a, at least one coiled electrical conductor encircling at least a section of the outer surface of magnetically conductive conduit segment 53 and at least a section of the outer surface of magnetically conductive conduit segment 53b may encircle at least a section of each length of magnetically conductive material with at least one turn of the electrical conductor oriented substantially orthogonal to the fluid flow path extending through the magnetically conductive conduit.

FIG. 7 schematically depicts an alternate embodiment of the magnetically conductive conduit having more than one length of magnetically conductive material forming the magnetically conductive conduit with the inner surfaces of the fluid impervious boundary walls of serial coupling of magnetically conductive conduit segment 18, non-magnetically conductive conduit segment 18b and magnetically conductive conduit segment 18a establishing a fluid flow path extending along the longitudinal axis of the magnetically conductive conduit. Magnetically conductive nucleus 39 is made of a magnetically conductive material and has an outer surface. The nucleus may be deployed within non-magnetically conductive conduit segment 18b by utilizing a non-magnetically conductive material to make at least one mechanical connection extending between the inner surface of the boundary wall of conduit segment 18b and the outer surface of magnetically conductive nucleus 39. The inner surface of the boundary walls of magnetically conductive conduit segment 18 and magnetically conductive conduit segment 18a are shown in coaxial alignment to the outer surface of magnetically conductive nucleus 39.

At least one coiled electrical conductor may encircle at least a section of each segment of magnetically conductive conduit with at least one turn of the electrical conductor oriented substantially orthogonal to the fluid flow path extending through the magnetically conductive conduit. At least one coiled electrical conductor may encircle at least a section of magnetically conductive conduit segment 18, non-magnetically conductive conduit segment 18b and at least a section of magnetically conductive conduit segment 18a with at least one turn of the electrical conductor oriented substantially orthogonal to the fluid flow path extending through the magnetically conductive conduit. A fluid, such as water, an aqueous-based mixture, an aqueous solution and/or an exploration and production fluid, flowing through the serial coupling of magnetically conductive conduit segment 18, non-magnetically conductive conduit segment 18b and magnetically conductive conduit segment 18a may be exposed to high concentrations of magnetic energy as it flows between the inner surface of the boundary wall of conduit segment 18b and the outer surface of magnetically conductive nucleus 39. At least a section of magnetically conductive conduit segment 18, non-magnetically conductive conduit segment 18b and at least a section of magnetically conductive conduit segment 18a may be sleeved within at least one additional magnetically conductive segment to increase the density and thickness of the fluid impervious boundary wall of the magnetically conductive conduit to provide for greater concentrations of magnetic energy within each segment of magnetically conductive conduit and the non-magnetically conductive region established between the magnetically conductive conduit segments.

FIG. 7A schematically depicts an alternate embodiment of the magnetically conductive conduit having more than one length of magnetically conductive material forming the magnetically conductive conduit with serial coupling of magnetically conductive conduit segment 18, non-magnetically conductive conduit segment 18b and magnetically conductive conduit segment 18a establishing a fluid flow path extending along the longitudinal axis of the magnetically conductive conduit. Magnetically conductive nucleus 39 is made of a magnetically conductive material and has an outer surface. The magnetically conductive nucleus 39 may be deployed within non-magnetically conductive conduit segment 18b by utilizing one or more pieces of non-magnetically conductive material 39a to make at least one mechanical connection extending between the inner surface of the boundary wall of conduit segment 18b and the outer surface of magnetically conductive nucleus 39. As shown in FIG. 7A, the non-magnetically conductive material 39a making a mechanical connection between the inner surface of the boundary wall of conduit segment 18b and the outer surface of magnetically conductive nucleus 39 may have two components 39a1 and 39a2 which define two openings 39b1 and 39b2 to permit passage of fluid past the magnetically conductive nucleus 39 to form a static mixing device within the fluid flow path extending through conduit segment 18b. As shown in FIG. 7A, the non-magnetically conductive material 39a2 may form a restriction within the conduit segment 18b by encompassing from about 30 degrees to about 180 degrees of cross-sectional area of conduit segment 18b. The size of the openings 39b1 and 39b2 can collectively vary from about 330 degrees to about 180 degrees of the cross-sectional area of conduit segment 18b. For example, the openings 39b1 and 39b2 depicted in FIG. 11 collectively encompass approximately 240 degrees of the cross-sectional area of conduit segment 18b. The inner surface of the boundary walls of the magnetically conductive conduit segment 18 and magnetically conductive conduit segment 18a are shown in coaxial alignment to the outer surface of magnetically conductive nucleus 39. In some embodiments, the magnetically conductive nucleus 39 is formed of a permanent magnet. Although components 39a1 and 39a2 are shown oriented substantially orthogonal to the fluid flow path extending through the conduit, it should be understood that components 39a1 and 39a2 forming a static mixing device within the fluid flow path extending through conduit segment 18b may be deployed in oblique, tangential and/or other orientations with the flow path extending through the conduit.

FIG. 8 schematically depicts an alternate embodiment of the magnetically conductive conduit having more than one length of magnetically conductive material forming the magnetically conductive conduit with a non-contiguous array of first length of magnetically conductive conduit segment 18 and second length of magnetically conductive conduit segment 18a forming the magnetically conductive conduit. A spacer made of a non-magnetically conductive material may be utilized to maintain the non-magnetically conductive region between the distal end of conduit segment 18 and the proximal end of conduit segment 18a. The inner surface of the boundary wall of magnetically conductive conduit segment 18 and the inner surface of the boundary wall of magnetically conductive conduit segment 18a define a flow path extending along the longitudinal axis of the magnetically conductive conduit. Fluid flow conduit 29, made with a length of non-magnetically conductive material defining a fluid impervious boundary wall with an inner surface and an outer surface and having a fluid entry port at one end of the conduit and a fluid discharge port at the other end of the conduit, is shown extending through magnetically conductive conduit segment 18 and magnetically conductive conduit segment 18a to direct a fluid, such as water, an aqueous-based mixture, an aqueous solution and/or an exploration and production fluid, through the magnetically conductive conduit. Magnetically conductive nucleus 39 is made of a magnetically conductive material and has an outer surface and is shown deployed within the aperture of non-magnetically conductive fluid flow conduit 29. The inner surface of the boundary walls of magnetically conductive conduit segment 18 and magnetically conductive conduit segment 18a are shown in coaxial alignment to the outer surface of magnetically conductive nucleus. The nucleus may be deployed within non-magnetically conductive fluid flow conduit 29 by utilizing a non-magnetically conductive material to make at least one mechanical connection extending between the inner surface of the boundary wall of non-magnetically conductive fluid flow conduit 29 and the outer surface of magnetically conductive nucleus 39. At least one coiled electrical conductor may encircle at least a section of each length of magnetically conductive conduit with at least one turn of the electrical conductor oriented substantially orthogonal to the fluid flow path extending through the magnetically conductive conduit. At least one coiled electrical conductor may encircle at least a section of magnetically conductive conduit segment 18, the non-magnetically conductive region between the distal end of conduit segment 18 and the proximal end of conduit segment 18a, and at least a section of magnetically conductive conduit segment 18a with at least one turn of the electrical conductor oriented substantially orthogonal to the fluid flow path extending through the magnetically conductive conduit. The non-magnetically conductive material making the mechanical connection between the inner surface of the boundary wall of conduit segment 18b and the outer surface of magnetically conductive nucleus 39 may have more than one component, which defines more than one opening to permit passage of fluid past the magnetically conductive nucleus 39 to form a static mixing device within the fluid flow path extending through conduit segment 18b.

A fluid flowing along a path extending through non-magnetically conductive conduit 29 sleeved by magnetically energized conduit segment 18 and magnetically energized conduit segment 18a may be exposed to high concentrations of magnetic energy as it flows between the inner surface of the boundary wall of fluid flow conduit 29 and the outer surface of magnetically conductive nucleus 39. At least a section of magnetically conductive conduit segment 18 and at least a section of magnetically conductive conduit segment 18a may be sleeved within at least one additional magnetically conductive segment to increase the density and thickness of the fluid impervious boundary wall of the magnetically conductive conduit to provide for greater concentrations of magnetic energy within each segment of magnetically conductive conduit and the non-magnetically conductive region established between the magnetically conductive conduit segments. At least a section of magnetically conductive conduit segment 18, the non-magnetically conductive region between the distal end of conduit segment 18 and the proximal end of conduit segment 18a, and at least a section of magnetically conductive conduit segment 18a may be sleeved within at least one additional magnetically conductive segment to increase the density and thickness of the fluid impervious boundary wall of the magnetically conductive conduit to provide for greater concentrations of magnetic energy within each segment of magnetically conductive conduit and the non-magnetically conductive region established between the magnetically conductive conduit segments.

Magnetically conductive contaminants, such as metal shavings and/or other forms of ferrous metal debris, may be introduced into a fluid column during a number of production procedures, such as milling operations and/or perforating wellbore casing and production tubing. If not removed from a fluid, such impurities and aggregates of metal debris may be circulated and reintroduced downhole where they accumulate in higher concentrations and collect in the cavities of recirculating pumps. Metal contaminants can cut pump liners and pistons, which impedes the flow of fluids. Frequently replacement of circulating pump parts is necessary, resulting in downtime and high maintenance costs.

The presently claimed and/or disclosed inventive concepts have been demonstrated to simply and effectively collect magnetically conductive impurities and metal contaminants from fluids. Magnetically conductive debris suspended within a fluid flowing through a magnetically energized conduit may adhere to the inner surface of the boundary wall of a magnetically energized conduit and/or the outer surface of a magnetically conductive nucleus, effectively collecting such contaminants and removing them from fluid discharged from the magnetically energized conduit. Switching an output of electrical energy to an "off" state to interrupt the energizing of the at least one coiled electrical conductor may allow the magnetically conductive debris to be dislodged from the inner surface of the boundary wall of a magnetically conductive conduit and/or the magnetically conductive nucleus by the flow of fluid through the magnetically conductive conduit. A flow of fluid containing the collected contaminants may then be directed to a filter, collection vessel and/or other separation apparatus known to those of ordinary skill in the art, downstream of the magnetically conductive conduit to capture the debris and remove it from the fluid.

In some instances, small magnetically conductive contaminants less than 10 microns in size, may be collected from a fluid passing through an alternate embodiment of the magnetically conductive conduit, wherein a nucleus comprising a screen of magnetically conductive wire mesh may be deployed within the magnetically conductive conduit and oriented substantially orthogonal to the fluid flow path extending through a non-magnetically conductive region established between two magnetically conductive conduit segments. The wire mesh screen may comprise at least one length of magnetically conductive material forming a strand of wire, each strand of wire having an outer surface, with at least one strand of wire configured to form a crisscross grid of wire.

The magnetically conductive wire mesh may be deployed within a non-magnetically conductive conduit segment of a serial coupling of conduit segments by making at least one mechanical connection extending between the inner surface of the boundary wall of the non-magnetically conductive conduit segment and at least one peripheral surface of the magnetically conductive wire mesh screen. The magnetically conductive wire mesh screen may be deployed within the non-magnetically conductive fluid flow conduit by making at least one mechanical connection extending between the inner surface of the boundary wall of the non-magnetically conductive fluid flow conduit and at least one peripheral surface of the magnetically conductive wire mesh screen. The magnetically energized wire mesh screen nucleus provides a significant increase in surface area across the cross section of the fluid flow path. Small sized magnetically conductive debris may adhere to the magnetically energized wire mesh screen nucleus, effectively collecting such contaminants from fluid discharged from the magnetically energized conduit. Such smaller sized contaminants may then be collected for disposal by switching an output of electrical energy to an "off" state to interrupt the energizing of the at least one coiled electrical conductor to allow the magnetically conductive debris to be dislodged from the outer surface of the magnetically conductive wire mesh screen nucleus by the flow of fluid through the magnetically conductive conduit with a flow of fluid containing the collected smaller sized contaminants directed to filter, collection vessel, electrochemical fluid conditioning device and/or other separation apparatus known to those of ordinary skill in the art, downstream of the magnetically conductive conduit to capture the debris and remove it from the fluid.

Figure 9:
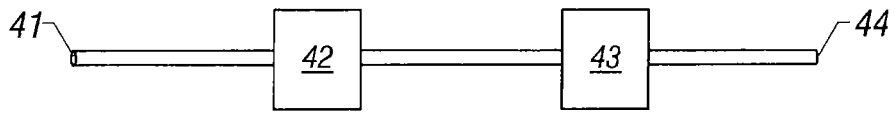
FIG. 9 schematically depicts an apparatus to improve blending as disclosed herein.

FIG. 9 schematically depicts an embodiment of the presently claimed and/or disclosed inventive concepts for altering a dispersive surface tension and/or a polar surface tension of an aqueous solution to influence its interaction with at least one dissimilar substance, such as improved blending of two or more distinct phases into a homogenous exploration and production fluid that will not readily separate into distinct phases over time. In many instances, it may be desirable to extract at least one dissimilar material from an aqueous solution prior to blending two or more distinct phases into a homogenous exploration and production fluid.

A flow of an aqueous solution may be established through port 41 of magnetically conductive conduit 42 having magnetic energy directed along the longitudinal axis of the magnetically energized conduit and extending through at least a portion of the aqueous solution, thereby altering a dispersive surface tension and/or a polar surface tension of a conditioned aqueous medium. The conditioned aqueous medium may then be directed through blending apparatus 43 where an amount of at least one dissimilar substance may be dispersed into the magnetically conditioned aqueous medium and blended into a homogenous exploration and production fluid before being discharged from port 44 as a continuous mixture.

Utilizing the previously disclosed method of generating untreated and magnetically conditioned fluid samples, wherein a high throughput peristaltic pump (to prevent direct contact with the fluid samples) was used to propel the fluid samples through tubing (being made of a material that, in and of itself, would not affect any physical properties of an aqueous solution sample) sleeved by a non-energized magnetically conductive conduit and a magnetically energized conduit at a flow rate of 1150 ml/min; as disclosed herein, magnetic conditioning of well water having concentrations of >300 ppm of calcium, magnesium, gypsum and other minerals was determined to alter a dispersive surface tension and a polar surface tension of the well water and influence its interaction with other substances.

A first sample of untreated well water was collected in a certified clean container after being directed to make only one pass through the length of non-energized magnetically conductive conduit. The sample flowed uncollected for approximately 30 to 45 seconds to allow for the dismissal of any bubbles so that the untreated well water sample was collected during steady-state flow.

A second sample of the well water was collected in a certified clean container after energizing a coiled electrical conductor encircling the conduit with 12 VDC and approximately 5 amps of electrical energy and directing the well water to make only one pass through a magnetically energized conduit having an area of magnetic conditioning concentrated along a path extending through at least one turn of the electrical conductor encircling the outer surface of the magnetically conductive conduit generating approximately 0.085 Tesla of magnetic energy, as well as approximately 0.015 Tesla of magnetic energy concentrated at each end of the magnetically conductive conduit. The magnetically conditioned well water sample was similarly allowed to flow uncollected for approximately 30 to 45 seconds to allow for the dismissal of any bubbles so that the water sample was collected during steady-state flow.

Overall surface tensions of well water containing concentrations of >300 ppm of calcium, magnesium, gypsum and other minerals were measured on both untreated and magnetically conditioned water samples by the Wilhelmy plate method. Both samples were also tested for contact angle against a standard PTFE surface to determine the fraction of the overall surface tension of each sample making up their non-polar surface tensions. Untreated well water had an overall surface tension of 71.12 mN/M, a dispersive surface tension of 26.35 mN/M, a polar surface tension of 44.77 mN/M and surface polarity of 62.9%. Magnetically conditioned well water had an overall surface tension of 61.36 mN/M, a dispersive surface tension of 17.43 mN/M, a polar surface tension of 43.93 mN/M and a surface polarity of 71.6%. Periodic monitoring indicated the changes in overall surface tension, dispersive surface tension, polar surface tension and surface polarity of the magnetically conditioned well water were greatest immediately after magnetic conditioning. Each property of the magnetically conditioned well water gradually returned to its untreated value after conditioning, with the magnetically conditioned well water returning to its untreated surface tension and surface polarity values after 48 hours. Such results are shown in Table V.

TABLE V

Component Surface Tension Information After Magnetic Conditioning Well Water-(Flowing through Magnet)

| Time After Conditioning (hours) | Overall Surface Tension (mN/m) | Dispersive Surface Tension (mN/m) | Polar Surface Tension (mN/m) | Surface Polarity (%) |
|---|---|---|---|---|
| 0 | 61.36 | 17.43 | 43.93 | 71.6 |
| 1 | 63.52 | 18.89 | 44.63 | 70.3 |
| 8 | 66.23 | 21.21 | 45.02 | 68.0 |
| 24 | 69.08 | 24.09 | 44.99 | 65.1 |
| 36 | 70.51 | 25.63 | 44.88 | 63.6 |
| 48 | 71.12 | 26.35 | 44.77 | 62.9 |

Reducing the surface tension of an aqueous solution (such as magnetically conditioned water) improves blending and allows at least one dissimilar substance (such as a chemical compound and/or at least one component of an exploration and production fluid) to be more readily dispersed and evenly distributed within a continuous mixture. At least one dissimilar substance may be selected from a group consisting of, but not limited to, chemical compounds and/or components of exploration and production fluids including scale inhibitors, biocides, surfactants, gelling agents, friction reducers, corrosion inhibitors, acids, cross-linked polymers, potassium chloride, ferrous control agents, pH adjustors, emulsion breakers, bentonite, barite, cement, foaming agents, diesel fuel, synthetic oil, and/or waterflood formation stimulants and combinations thereof or equivalent substances known to those of ordinary skill in the art to form a continuous mixture propelled under pressure into a hydrocarbon producing formation, reservoir and/or wellbore.

The presently claimed and/or disclosed inventive concepts include a method of increasing the efficiency of blending at least one dissimilar substance with an aqueous solution, including the steps of establishing a flow of a first aqueous solution through a magnetically conductive conduit having magnetic energy directed along the longitudinal axis of the magnetically energized conduit and extending through at least a portion of the first aqueous solution thereby altering a dispersive surface tension and/or a polar surface tension and/or a polar surface tension of a conditioned aqueous medium and dispersing an amount of at least one dissimilar substance into the conditioned aqueous medium to form a continuous mixture. The at least one dissimilar substance may be a chemical compound. The at least one dissimilar substance may be a component of an exploration and production fluid. At least one chemical compound may be dispersed in the first aqueous solution. At least one chemical compound may be dispersed in the continuous mixture.

Figure 10:
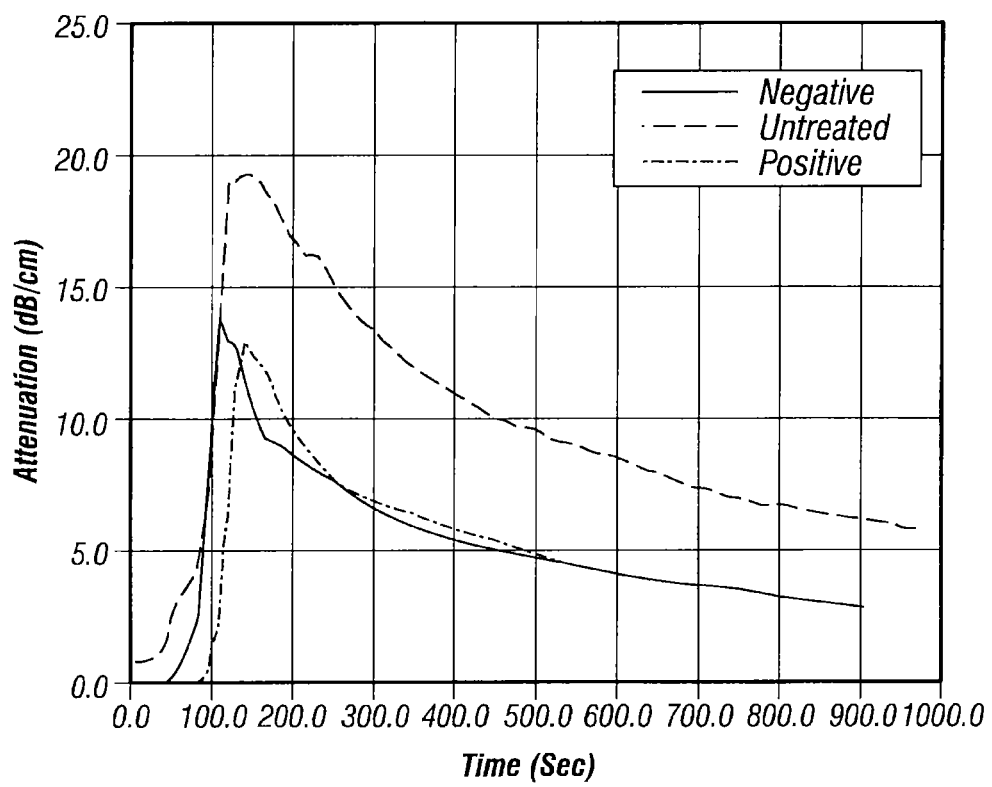
FIG. 10 is a graph showing changes in ultrasound attenuation over time of dissolution of MPC80 in a first sample of water subjected to no magnetic conditioning, a second sample of water subjected to positive magnetic conditioning, and a third sample of water subjected to negative magnetic conditioning.

As disclosed herein, magnetic conditioning of an aqueous solution was discovered to alter a dispersive surface tension and/or a polar surface tension of a conditioned aqueous medium and improve the mechanical blending of two or more distinct phases into a homogenous mixture. The dissolution behavior of high protein milk powder (MPC80) in water was studied. For this purpose, ten percent milk protein solutions were prepared using untreated tap water (control), tap water directed to make approximately 5 passes through magnetic energy inducing a positive polarity thereby providing a first aqueous medium, and tap water directed to make approximately 5 passes through magnetic energy inducing a negative polarity thereby providing a second conditioned aqueous medium. Ten grams of MPC80 powder were mixed with 90 g of untreated tap water, ten grams of MPC80 powder were mixed with 90 g of water directed to make multiple passes through magnetic energy inducing a positive polarity, and ten grams of MPC80 powder were mixed with 90 g of water directed to make multiple passes through magnetic energy inducing a negative polarity. The dissolution behavior of each milk protein continuous mixture sample was observed using an ultrasound spectrometer. FIG. 10 shows the changes in the ultrasound attenuation over time during the dissolution of the MPC80 in each sample. As shown in FIG. 10, the attenuation begins to increase in all the samples when the powder is added to the water. However, the ultrasound attenuation decreased quickly in each sample generated with magnetically conditioned water; but the attenuation continued to rise with the sample of untreated tap water. This indicates the MPC80 was readily dispersed and evenly distributed within each continuous mixture formed with a conditioned aqueous medium, with similar rapid dissolution and dispersion of dairy based high protein powders recorded in the water directed to make multiple passes through magnetic energy inducing a positive polarity and the water directed to make multiple passes through magnetic energy inducing a negative polarity.

The presently claimed and/or disclosed inventive concepts include an apparatus for increasing the efficiency of blending at least one dissimilar substance with an aqueous solution, including a magnetically conductive conduit having magnetic energy directed along the longitudinal axis of the magnetically conductive conduit and extending through at least a portion of the magnetically conductive conduit; and at least one blending apparatus downstream of the magnetically conductive conduit, wherein the aqueous solution may be capable of flowing through the magnetically conductive conduit and into the at least one blending unit to mix with the at least one dissimilar substance.

At least one length of magnetically conductive material may form a magnetically conductive conduit having a fluid entry port at the proximal end of the magnetically conductive conduit, a fluid discharge port at the distal end of the magnetically conductive conduit and a fluid impervious boundary wall having an inner surface and an outer surface extending between the fluid entry port and the fluid discharge port, the inner surface of the boundary wall establishing a fluid flow path extending along the longitudinal axis of the conduit. The magnetically conductive conduit may further have at least one electrical conductor having a first conductor lead and a second conductor lead, the electrical conductor coiled with at least one turn to form at least one uninterrupted coil of electrical conductor, each coil forming at least one layer of coiled electrical conductor. The magnetically conductive conduit may further include at least one coiled electrical conductor encircling the magnetically conductive conduit within the coiled electrical conductor, wherein the at least one coiled electrical conductor sleeves at least a section of an outer surface of the boundary wall of the magnetically conductive conduit with at least one turn of the electrical conductor oriented substantially orthogonal to the fluid flow path extending through the conduit. The magnetically conductive conduit may further have at least one electrical power supply operably connected to at least one of the first and second conductor leads, wherein the at least one coiled electrical conductor is thereby energized to provide a magnetic field having lines of flux directed along a longitudinal axis of the magnetically energized conduit.

The at least one blending apparatus may have a capacity to disperse an amount of at least one dissimilar substance into a magnetically conditioned aqueous medium to form a continuous mixture. The at least one blending unit may have a fluid impervious boundary wall having an inner surface, a first inlet port for receiving a magnetically conditioned aqueous medium, a second inlet port for receiving an amount of at least one dissimilar substance, and an outlet port for discharging a continuous mixture.

As used herein, blending apparatus having a capacity to disperse an amount of at least one dissimilar substance into a magnetically conditioned aqueous medium to form a continuous mixture by mechanical blending, centrifugal mixing, in-line static mixing, and/or power jet blending may be selected from a group consisting of, but not limited to, drilling fluid mixers, mud agitators, mud tank mixers, high torque mixers having large pitch impellors, venturi blenders, radial mixers, mixing eductors, jet nozzles, apparatus having vortices converging in a mixing chamber, and combinations thereof or equivalent blending apparatus known to those of ordinary skill in the art.

In each embodiment of the presently claimed and/or disclosed inventive concepts for increasing the efficiency of blending at least one dissimilar substance with an aqueous solution, it can be appreciated that magnetic energy may be concentrated in a plurality of distinct areas along the longitudinal axis of the magnetically energized conduit.

The presently claimed and/or disclosed inventive concepts have been demonstrated to alter a dispersive surface tension and/or a polar surface tension of an exploration and production fluid and affect its viscosity. A fundamental understanding of the properties of exploration and production fluids is essential for safe and efficient oil and gas exploration and production activities. Drilling mud, drilling fluid, and mud are used to provide hydrostatic pressure to control a well during drilling operations and the density of these fluids is normally reported in pounds per gallon. Frac fluid, a mixture of water, chemicals and proppants, is pumped into shale formations under high pressure to create fissures and release gas and/or oil trapped in shale formations. Completion fluid, acid, and cement are utilized during the transition from reservoir drilling to well completion and petroleum production. Injection well water is flowback water, produced water, and other wastewater generated in oil and gas exploration and/or production activities that may be directed to wastewater disposal facilities for injection into underground formations void of viable oil and gas production. Produced water injected back into the reservoir where it originated is used as a waterflood formation stimulant to reestablish sufficient pressure within a hydrocarbon producing formation to allow for the recovery of additional amounts of oil.

The viscosity of a drilling fluid is defined as its internal resistance of fluid flow. Yield point (YP) of a drilling fluid is the resistance to initial flow, or the stress required to initiate fluid movement. Yield point is used to evaluate the ability of mud to lift cuttings; with a higher yield point implying a drilling fluid has the ability to carry cuttings better than a fluid of similar density but lower yield point.

Plastic viscosity (PV) of a drilling fluid is the slope of the shear stress-shear rate plot above the yield point of the fluid. A low plastic viscosity indicates mud may be utilized for rapid drilling due to its low viscosity as it exits a bit. A high plastic viscosity is created as excess colloidal solids are entrained in a viscous base fluid.

Utilizing the previously disclosed method of generating untreated and magnetically conditioned fluid samples, wherein a closed loop system having a five gallon collection vessel, a 12 VDC diaphragm pump energized with a variable power supply, a flow meter and an embodiment of the presently claimed and/or disclosed magnetically conductive conduit connected with ½" plastic tubing (that would not affect physical properties of a fluid sample) was utilized to generate untreated and magnetically conditioned drilling fluid samples; as disclosed herein, magnetic conditioning of a drilling fluid was determined to alter a dispersive surface tension and/or a polar surface tension of an exploration and production fluid and affect its viscosity.

Three gallons of a water-based drilling fluid containing bentonite, salts, polymers, scale inhibitors, and other additives were decanted into the collection vessel. The pump was energized and power supply adjusted to circulate the drilling fluid through the system at a rate of 2.0 gpm. After circulating the drilling fluid for 5 minutes to achieve a steady-state flow, a first sample of untreated drilling fluid was collected and measured by utilizing a viscometer rotating at 300 rpm and 600 rpm to determine the viscosity of the fluid. Untreated drilling fluid had a plastic viscosity of 27 cP (centipoise) and a yield point of 24 dynes/cm$^2$.

A coiled electrical conductor encircling the magnetically conductive conduit was then energized with 12 VDC and approximately 5 amps of electrical energy. A second sample of drilling fluid, directed to make only one pass through an area of magnetic conditioning having a first polarity concentrated along a path extending through the electrical conductor encircling the outer surface of the magnetically energized conduit generating approximately 0.100 Tesla of magnetic energy, as well as approximately 0.015 Tesla of magnetic energy concentrated at each end of the magnetically energized conduit, was collected to determine the viscosity of the fluid. Utilizing the same viscometer rotating at 300 rpm and 600 rpm, no significant change in the viscosity of the fluid was measured after only one pass through the magnetically energized conduit. However, after circulating the drilling fluid through the magnetically energized conduit so that it made approximately 5 passes through magnetic energy inducing the first polarity, the viscosity of the drilling mud was reduced as indicated by a drop in the plastic viscosity from 27 cP to 22 cP and a drop in the yield point from 24 dynes/cm$^2$ to 19 dynes/cm$^2$. After circulating the drilling fluid through the magnetically energized conduit for approximately 10 additional passes through the first polarity, the viscosity of the drilling fluid was further reduced as indicated by a drop in the plastic viscosity from 22 cP to 20 cP, for a net drop in the plastic viscosity of the drilling fluid conditioned with a first polarity of 25.9%. The yield point of the drilling fluid conditioned with a first polarity dropped from 19 dynes/cm$^2$ to 18 dynes/cm$^2$ for a net drop in yield point of 25%.

The magnetically conditioned drilling fluid having the reduced viscosity as a result of making 15 passes through the magnetically energized conduit inducing a first polarity was then circulated through the closed loop system so that it made approximately 17 passes through the magnetically energized conduit inducing magnetic energy having a second polarity. The plastic viscosity of the drilling mud conditioned with a first polarity increased from 20 cP to 24 cP, for a net increase in the plastic viscosity of the drilling fluid conditioned with a second polarity of 25.9%. The yield point of the drilling mud conditioned with a first polarity increased from 18 dynes/cm$^2$ to 21 dynes/cm$^2$, for a net increase in the yield point of the drilling fluid conditioned with a second polarity of 14.3%. These results are shown in Table VI.

TABLE VI

Water-based Drilling Fluid Viscosity
Untreated and Magnetic Conditioning (Flowing through Magnet)

| Untreated Drilling Fluid PV/YP | Conditioning w/1st Polarity PV/YP | % Change From Untreated | Conditioning w/2nd Polarity PV/YP | % Change From 1st Polarity |
|---|---|---|---|---|
| 27 cP/ 24 dyn/cm2 | 20 cP/ 18 dyn/cm2 | −25.9%/ −25.0% | 24 cP/ 21 dyn/cm2 | +16.7%/ +14.3% |

Figure 11:
FIG. 11 schematically depicts an apparatus for altering a dispersive surface tension and/or a polar surface tension of a fluid as disclosed herein.

FIG. 11 is an embodiment of the presently claimed and/or disclosed inventive concepts for altering the physical properties of an exploration and production fluid at ambient temperature. An exploration and production fluid introduced to port 41 may be directed to pass through magnetically conductive conduit 42 having magnetic energy directed along the longitudinal axis of the magnetically energized conduit and extending through at least a portion of the exploration and production fluid, thereby altering a dispersive surface tension and/or a polar surface tension of a conditioned exploration and production medium discharged from port 44. The ability to alter at least one physical property of water flowing under pressure (e.g., increasing the flow rate of a water-based fluid propelled at a constant pressure, or reducing the pressure required to propel a volume of a water-based fluid at a constant flow rate) may increase productivity and reduce costs.

The presently claimed and/or disclosed inventive concepts also include a method of altering the physical properties of an exploration and production fluid at ambient temperature, including the step of passing a first exploration and production fluid mixture through a magnetically conductive conduit having magnetic energy directed along the longitudinal axis of the magnetically energized conduit and extending through at least a portion of the first exploration and production fluid mixture thereby altering a dispersive surface tension and a polar surface tension of a conditioned exploration and production fluid medium. Inducing a first magnetic polarity may increase the viscosity of the conditioned exploration and production fluid medium; and inducing a second magnetic polarity may reduce the viscosity of the conditioned exploration and production fluid medium, for example.

The presently claimed and/or disclosed inventive concepts also include an apparatus for altering the physical properties of an exploration and production fluid at ambient temperature, including a magnetically conductive conduit having magnetic energy directed along the longitudinal axis of a magnetically energized conduit and extending through at least a portion of the magnetically conductive conduit. At least one length of magnetically conductive material may form a magnetically conductive conduit having a fluid entry port at the proximal end of the magnetically conductive conduit, a fluid discharge port at the distal end of the magnetically conductive conduit and a fluid impervious boundary wall having an inner surface and an outer surface extending between the fluid entry port and the fluid discharge port, the inner surface of the boundary wall establishing a fluid flow path extending along the longitudinal axis of the conduit. The magnetically conductive conduit may further have at least one electrical conductor having a first conductor lead and a second conductor lead, the electrical conductor coiled with at least one turn to form at least one uninterrupted coil of electrical conductor, each coil forming at least one layer of coiled electrical conductor. The magnetically conductive conduit may further include at least one coiled electrical conductor encircling the magnetically conductive conduit within the coiled electrical conductor, wherein the at least one coiled electrical conductor sleeves at least a section of an outer surface of the boundary wall of the magnetically conductive conduit with at least one turn of the electrical conductor oriented substantially orthogonal to the fluid flow path extending through the conduit. The magnetically conductive conduit may further have at least one electrical power supply operably connected to at least one of the first and second conductor leads, wherein the at least one coiled electrical conductor is thereby energized to provide a magnetic field having lines of flux directed along a longitudinal axis of the magnetically energized conduit.

In each embodiment of the presently claimed and/or disclosed inventive concepts for altering the physical properties of an exploration and production fluid at ambient temperature, it can be appreciated that magnetic energy may be concentrated in a plurality of distinct areas along the longitudinal axis of the magnetically energized conduit.

As used herein, water-based fluids defined by the term "fluid containing at least one polar substance" refer to "distilled water", "water", "aqueous-based mixtures", "aqueous solutions", "exploration and production fluids" and combinations thereof or equivalent water-based fluids known to those of ordinary skill in the art.

Utilizing the previously disclosed method of generating untreated and magnetically conditioned fluid samples, wherein a high throughput peristaltic pump (to prevent direct contact with the fluid samples) was used to propel the fluid samples through tubing (being made of a material that, in and of itself, would not affect any physical properties of a fluid mixture sample) sleeved by a non-energized magnetically conductive conduit and a magnetically energized conduit at a flow rate of 1150 ml/min; as disclosed herein, magnetic conditioning of a fluid containing at least one polar substance was determined to alter a dispersive surface tension and a polar surface tension of distilled water.

A first sample of untreated distilled water was collected in a certified clean container after being directed to make only one pass through the length of non-energized magnetically conductive conduit. The sample flowed uncollected for approximately 30 to 45 seconds to allow for the dismissal of any bubbles so that the untreated distilled water sample was collected during steady-state flow.

A second sample of the distilled water was collected in a certified clean container after energizing a coiled electrical conductor encircling the conduit with 12 VDC and approximately 5 amps of electrical energy and directing the distilled water to make only one pass through a magnetically energized conduit having an area of magnetic conditioning concentrated along a path extending through at least one turn of the electrical conductor encircling the outer surface of the magnetically conductive conduit generating approximately 0.85 Tesla of magnetic energy, as well as approximately 0.015 Tesla of magnetic energy concentrated at each end of the magnetically conductive conduit. The magnetically conditioned distilled water sample was similarly allowed to flow uncollected for approximately 30 to 45 seconds to allow for the dismissal of any bubbles so that the water sample was collected during steady-state flow. The overall surface tensions of both untreated and magnetically conditioned distilled water samples were measured by the Wilhelmy plate method. Both samples were also tested for contact angle against a standard PTFE surface in order to determine the fraction of the overall surface tension of each sample making up their non-polar surface tensions. Results are shown in Table VII.

TABLE VII

Component Surface Tension Information After Magnetic Conditioning Distilled Water-(Flowing through Magnet)

| Time After Conditioning (hours) | Overall Surface Tension (mN/m) | Dispersive Surface Tension (mN/m) | Polar Surface Tension (mN/m) | Surface Polarity (%) |
|---|---|---|---|---|
| 0 | 72.72 | 24.89 | 47.83 | 65.8 |
| 1 | 72.73 | 25.03 | 47.70 | 65.6 |
| 8 | 72.75 | 26.01 | 46.74 | 64.2 |
| 24 | 72.74 | 26.42 | 46.32 | 63.7 |
| 36 | 72.73 | 26.56 | 46.17 | 63.5 |
| 48 | 72.74 | 26.57 | 46.17 | 63.5 |

Untreated distilled water had an overall surface tension of 72.74 mN/M while magnetically conditioned distilled water had an overall surface tension of 72.72 mN/M, a value within a measurable margin of error indicating there was no change in the surface tension of the magnetically conditioned distilled water. However, untreated distilled water had a dispersive surface tension of 26.57 mN/M, a polar surface tension of 46.17 mN/M and a surface polarity of 63.5% while magnetically conditioned distilled water had a dispersive surface tension of 24.89 mN/M, a polar surface tension of 47.83 mN/M and a surface polarity of 65.8%, indicating significant changes in a dispersive surface tension and a polar surface tension of magnetically conditioned distilled water. Changes in the dispersive surface tension, polar surface tension and surface polarity of the distilled water sample directed to make one pass through the magnetically conductive conduit were greatest immediately after magnetic conditioning, with each property of the magnetically conditioned water sample returning to its untreated dispersive surface tension, polar surface tension and surface polarity value in less than 48 hours.

The presently claimed and/or disclosed inventive concepts also include a method of altering the physical properties of distilled water at ambient temperature, including the step of passing a first volume of distilled water through a magnetically conductive conduit having magnetic energy directed along the longitudinal axis of the magnetically energized conduit and extending through at least a portion of the distilled water thereby providing a conditioned distilled water medium, wherein a dispersive surface tension of the conditioned distilled water medium is lower than a dispersive surface tension of the first volume of distilled water and a polar surface tension of the conditioned distilled water medium is higher than a polar surface tension the first volume of distilled water.

The presently claimed and/or disclosed inventive concepts also include an apparatus for altering a dispersive surface tension and/or a polar surface tension of a fluid containing at least one polar substance at ambient temperature, including a magnetically conductive conduit having magnetic energy directed along the longitudinal axis of a magnetically energized conduit and extending through at least a portion of the magnetically conductive conduit. The magnetically conductive conduit may have a fluid entry port at the proximal end of the magnetically conductive conduit, a fluid discharge port at the distal end of the magnetically conductive conduit and a fluid impervious boundary wall having an inner surface and an outer surface extending between the fluid entry port and the fluid discharge port, the inner surface of the boundary wall establishing a fluid flow path extending along the longitudinal axis of the conduit. The magnetically conductive conduit may further have at least one electrical conductor having a first conductor lead and a second conductor lead, the electrical conductor coiled with at least one turn to form at least one uninterrupted coil of electrical conductor, each coil forming at least one layer of coiled electrical conductor. The magnetically conductive conduit may further include at least one coiled electrical conductor encircling the magnetically conductive conduit within the coiled electrical conductor, wherein the at least one coiled electrical conductor sleeves at least a section of an outer surface of the boundary wall of the magnetically conductive conduit with at least one turn of the electrical conductor oriented substantially orthogonal to the fluid flow path extending through the conduit. The magnetically conductive conduit may further have at least one electrical power supply operably connected to at least one of the first and second conductor leads, wherein the at least one coiled electrical conductor is thereby energized to provide a magnetic field having lines of flux directed along a longitudinal axis of the magnetically energized conduit. In each embodiment of the presently claimed and/or disclosed inventive concepts for altering a dispersive surface tension and/or a polar surface tension of a fluid, it can be appreciated that magnetic energy may be concentrated in a plurality of distinct areas along the longitudinal axis of the magnetically energized conduit.

FIG. 11 is an embodiment of the presently claimed and/or disclosed inventive concepts for increasing the flow rate of a fluid containing at least one polar substance propelled through a conduit under pressure at ambient temperature. A first fluid containing at least one polar substance introduced to port 41 may be directed to pass through magnetically conductive conduit 42 having magnetic energy directed along the longitudinal axis of the magnetically energized conduit and extending through at least a portion of the first fluid containing at least one polar substance, thereby altering a dispersive surface tension and/or a polar surface tension of a conditioned fluid containing at least one polar substance medium discharged from port 44.

As disclosed herein, experimentation has shown magnetic conditioning as described in the presently claimed and/or disclosed inventive concepts alters at least one physical property of a fluid containing at least one polar substance flowing under pressure. The presently claimed and/or disclosed inventive concepts also include a method of reducing a pressure to propel a fluid containing at least one polar substance, including the steps of establishing a flow of a first fluid containing at least one polar substance mixture through a magnetically conductive conduit having magnetic energy directed along the longitudinal axis of the magnetically energized conduit and extending through at least a portion of the first fluid containing at least one polar substance mixture thereby providing a conditioned fluid containing at least one polar substance medium; and directing a volume of the conditioned fluid containing at least one polar substance medium to flow through a constricted region, wherein the pressure required to propel a volume of the conditioned fluid containing at least one polar substance medium through the constricted region is reduced as compared to the pressure required to propel a substantially identical volume of the first fluid containing at least one polar substance mixture through the constricted region.

The presently claimed and/or disclosed inventive concepts also include a method of reducing a pressure to pass a fluid containing at least one polar substance through a conduit at ambient temperature, including the steps of establishing a flow of a first fluid containing at least one polar substance mixture through a magnetically conductive conduit having magnetic energy directed along the longitudinal axis of the magnetically energized conduit and extending through at least a portion of the first fluid containing at least one polar substance mixture thereby providing a conditioned fluid containing at least one polar substance medium; and passing the conditioned fluid containing at least one polar substance medium at a constant flow rate through a conduit downstream of the magnetically conductive conduit, wherein the pressure required to pass a volume of the conditioned fluid containing at least one polar substance medium at a constant flow rate through the conduit at ambient temperature is reduced as compared to the pressure required to pass a substantially identical volume of the first fluid containing at least one polar substance mixture at a substantially identical constant flow rate through the conduit at ambient temperature.

Utilizing the previously disclosed method of generating untreated and magnetically conditioned fluid samples, wherein a closed loop system having a five gallon collection vessel, a 12 VDC diaphragm pump energized with a variable power supply, a flow meter and an embodiment of the presently claimed and/or disclosed magnetically conductive conduit connected with new ½" plastic tubing (that would not affect physical properties of a fluid sample) was utilized to generate untreated and magnetically conditioned fluid samples; as disclosed herein, magnetic conditioning of a fluid mixture containing at least one polar substance was determined to increase the flow rate of a fluid mixture propelled through a conduit under pressure at ambient temperature.

Four gallons of tap water were decanted into the collection vessel, the pump was energized and power supply adjusted to circulate the water through the system at a rate of 4.0 gpm. After circulating the water for 5 minutes to achieve a steady-state flow, a first sample of untreated tap water was collected in a collapsible plastic bladder. The water sample was then placed in a pneumatically driven flow evaluation system, wherein air pressure compressed the collapsible plastic bladder to propel the water sample through an adjustable solenoid valve and a 30" length of 3/16" stainless steel tubing before being decanted into a sample collection flask.

The solenoid valve, having a capacity to regulate fluid flow through an adjustable orifice at a predetermined pressure, was connected to an electric timer utilized to regulate the length of time the valve was open to allow for pneumatically driven fluid flow. Flow rates through the system were then determined by dividing the volume of water collected in the sample flask by the amount of time the solenoid valve was open to allow fluid to flow through the valve. The average flow rate of untreated water propelled at 20 psi through the system was determined to be 17.2 milliliters per second, or 0.0273 gpm and the average flow rate of untreated water propelled at 40 psi was determined to be 21.6 milliliters per second, or 0.0342 gpm.

A coiled electrical conductor encircling the magnetically conductive conduit was then energized with 12 VDC and approximately 5 amps of electrical energy. A second 4 gallon sample of tap water was circulated through the magnetically energized closed loop conditioning system at a rate of 4.0 gpm for approximately 10 minutes before collecting a sample of conditioned tap water after it made approximately 10 passes through a magnetically energized conduit.

The magnetically conditioned water sample was then placed in the pneumatically driven flow evaluation system and samples were generated with water propelled through the solenoid valve at 20 psi and 40 psi. The average flow rate of magnetic conditioned water propelled at 20 psi through the flow evaluation system was determined to be 18.4 milliliters per second, or 0.0292 gpm; a 7.0% increase in flow rate as a result of magnetic conditioning and the average flow rate of magnetic conditioned water propelled at 40 psi through the flow evaluation system was determined to be 26.2 milliliters per second, or 0.0415 gpm, an increased flow rate of 21.3% as a result of magnetic conditioning. These results are shown in Table VIII.

TABLE VIII

Tap Water Propelled Through a Conduit at Pressure
Untreated and Magnetic Conditioning (Flowing through Magnet)

| Untreated Tap Water 20 psi | Magnetic Conditioning 20 psi | % Change @ 20 psi | Untreated Tap Water 40 psi | Magnetic Conditioning 40 psi | % Change @ 40 psi |
|---|---|---|---|---|---|
| .0273 gpm | .0292 gpm | 7.0% | .0342 gpm | .0415 gpm | 21.3% |

The presently claimed and/or disclosed inventive concepts also include a method of increasing the flow rate of a fluid containing at least one polar substance propelled through a conduit under pressure at ambient temperature, including the steps of establishing a flow of a first fluid containing at least one polar substance mixture through a magnetically conductive conduit having magnetic energy directed along the longitudinal axis of the magnetically energized conduit and extending through at least a portion of the first fluid containing at least one polar substance mixture thereby providing a conditioned fluid containing at least one polar substance medium; and propelling the conditioned fluid containing at least one polar substance medium under pressure through a conduit downstream of the magnetically conductive conduit, wherein the flow rate of a volume of the conditioned fluid containing at least one polar substance medium propelled at a constant pressure through the conduit at ambient temperature is increased as compared to the flow rate of a substantially identical volume of the first fluid containing at least one polar substance mixture propelled at a substantially identical constant pressure through the conduit at ambient temperature.

The presently claimed and/or disclosed inventive concepts also include a method of increasing the flow rate of a fluid containing at least one polar substance, including the steps of establishing a flow of a first fluid containing at least one polar substance mixture through a magnetically conductive conduit having magnetic energy directed along the longitudinal axis of the magnetically energized conduit and extending through at least a portion of the first fluid containing at least one polar substance mixture thereby providing a conditioned fluid containing at least one polar substance medium; and directing a volume of the conditioned fluid containing at least one polar substance medium to flow through a constricted region, wherein the flow rate of a volume of the conditioned fluid containing at least one polar substance medium propelled through the constricted region is increased as compared to the flow rate of a substantially identical volume of the first fluid containing at least one polar substance mixture propelled through the constricted region.

A first flow of electrical energy having a first set of electrical characteristics may be utilized to provide conditioning for a first fluid, such as water, an aqueous-based mixture, an aqueous solution and/or an exploration and production fluid, and a second flow of electrical energy having a second set of electrical characteristics may be used to provide conditioning for a second fluid. One or more of the time intervals, repetition rate, duty cycle, voltage, current, or direction of a pulsed output of electrical energy may be programmable to provide effective fluid conditioning as the characteristics of a fluid being conditioned change. The size, shape and dimensions of the electrical conducting material, the length to diameter ratio of the at least one coiled electrical conductor encircling the magnetically conductive conduit and/or the size, shape, dimensions and/or number of layers of coiled electrical conductor forming a coil may be adapted for specific applications.

Other variables may include the size, shape and material comprising the conduit and coupling segments; and the size, shape and composition of materials comprising an enclosure to protect at least the coiled electrical conductor. At least one magnetically conductive material or at least one non-magnetically conductive material may be utilized to maintain the spacing between a non-contiguous array of coils. At least one non-magnetically conductive material may be utilized to maintain the spacing between the outer layer of a coiled electrical conducting material and the inner surface of a protective coil enclosure. In certain applications, an enclosure protecting at least the coiled electrical conductor may be configured within a fluid impervious "water jacket" housing to allow water and/or other fluids to flow around the outer surface of the enclosure to dissipate heat from the coil enclosure.

Energizing the coiled electrical conductor with at least one pulsed output of electrical energy provides a variety of fluid conditioning benefits. In a first example, switching the output of electrical energy to an "off" state to interrupt the energizing of the at least one coiled electrical conductor may allow magnetically conductive debris that may adhere to the inner surface of the boundary wall and/or the outer surface of a magnetically conductive nucleus of a magnetically energized conduit to be dislodged and removed by a flow of a fluid passing through the non-energized magnetically conductive conduit.

In a second example, energizing the at least one coiled electrical conductor with pulsed outputs of electrical energy having continuous repetition rates may generate alternating positive and negative pressure waves in some fluids that tend to tear fluids apart and create vacuum cavities that form micron-size bubbles. Such bubbles may continue to grow under the influence of the alternating positive and negative pressure waves until they reach a resonant size where they then collapse, or implode, under a force known as cavitation. Imploding bubbles form jets of plasma having extremely high temperatures that travel at high rates of speed for relatively short distances. Energy released from a single cavitation bubble is extremely small, but the cavitation of millions of bubbles every second has a cumulative effect throughout a fluid as the pressure, temperature and velocity of the jets of plasma destroy many contaminants in the water. In certain applications, diffused ambient air or other forms of small bubbles may be introduced immediately upstream of a magnetically energized conduit to assist in initiating the cavitation process. Electrolysis of water, aqueous solutions and/or aqueous-based mixtures may be utilized to generate small bubbles upstream of a magnetically conductive conduit energized with pulsed outputs of electrical energy.

A variety of processes and methods have been devised in an effort to control and/or eliminate biological contaminants, such as unwanted bacteria and other forms of undesirable microorganisms found in fluid mixtures containing at least one polar substance. As used herein, a fluid mixture containing at least one polar substance and at least one biological contaminant may refer to "water", "aqueous-based mixtures", "aqueous solutions", "exploration and production fluids", "produced water", "flowback water", "drilling fluids", "frac fluids", "muds", "completion fluids", "injection well water", "waterflood formation stimulant", diesel compounds containing at least one polar substance, and/or combinations thereof or other fluid mixtures containing at least one polar substance and at least one biological contaminant known to those of ordinary skill in the art.

For example, traditional thermal treatments, such as pasteurization, are commonly used in the food industry to ensure food safety and meet extended shelf-life goals. However, thermal treatments are known to cause unwanted changes in the nutritional, organoleptic and functional properties of many food products. Other modern methods of food preservation include exposing such products to various types of radiation, such as ultraviolet light. While many of these methods of controlling unwanted microorganisms in food products have proven to be quite desirable, they can substantially alter the nature of the food so that the quality and taste of the processed foods are often undesirable. Microwave cooking subjects food to a magnetic field; however, as mentioned above, the induced thermal effect kills microorganisms while substantially altering the character of the food.

Other alternative processing technologies such as chemical additives, high intensity ultrasound processing, high hydrostatic pressure processing, pulsed electric fields processing, and ozone processing are some of the most common fluid processing technologies to control pathogenic and spoilage bacteria in foods. Although "non-thermal" is a term associated with some of these technologies, most cause a rise in the temperature of aqueous-based fluids and the reduction in microbial population is often a synergistic effect associated with temperature elevation. Moreover, some of these technologies can accelerate enzymatic or non-enzymatic reactions in foods that can affect the sensory properties of foods. For example, exposure of milk to UV light can trigger oxidative changes and is responsible for subsequent development of oxidized flavor. Conventional ozone generators (either corona discharge or UV lamps) typically do not scale down and are impractical for low flow rate water treatment regimens (i.e., for treating 500 L/hr. or less).

The use of oscillating magnetic fields in conditioning fluids is a non-thermal processing technology. Limited studies have been carried out on the application of this novel technology where reductions in the number of microorganisms in fluids containing at least one polar substance can be achieved by exposing the fluids to high intensity magnetic fields for a very short time without a significant increase in temperature.

In U.S. Pat. No. 1,863,222, Hoermann et al. described a method of exposing food and other products with high frequency oscillations by placing them in the conductive pathway of a high frequency electrical circuit. In U.S. Pat. No. 3,876,373, Glyptis described a method and apparatus for sterilizing matter by inhibiting the reproduction of organisms by the use of a plasma discharge or by electromagnetic excitation to destroy or disrupt the functioning of the DNA molecule of the organisms.

Magnetic fields have been used previously in conjunction with certain food processing steps. For example, in U.S. Pat. No. 4,042,325, Tensmeyer described a method of killing microorganisms inside a container by directing an electromagnetic field into the container, inducing a plasma by focusing a single-pulsed, high-power laser beam into the electromagnetic field and exposing the inside of the container to the plasma for about 1.0 millisecond to about 1.0 second by sustaining the plasma with the electromagnetic field.

In U.S. Pat. No. 4,524,079, Hofmann described a method and apparatus utilizing moderate frequency, high intensity magnetic fields as a non-thermal process to inactivate some selected microorganisms within a generally non-electrically conductive environment. Destruction of microorganisms within food (disposed in a container having relatively high electrical resistivity and subjected to an oscillating magnetic field) was accomplished within very short time periods during which no significant rise in temperature was observed in the food. The food was sterilized without any detectable change in its character, without a plasma being produced and without the addition of chemicals. According to Hofmann, exposing various food products to a high intensity, moderate frequency oscillating magnetic field for very short time periods made his method of controlling such biological contaminants effective as microorganisms were either destroyed or reproductively inactivated. He found that during the batch treatment of orange juice, milk and yogurt, the short period of time these food products were subjected to an oscillating magnetic field resulted in minimal heating of the food and except for destruction of the microorganisms, the food was substantially unaltered. He described a single pulse of the magnetic field as generally having the capacity to decrease the microorganism population by at least about two orders of magnitude, and subjecting the material to additional pulses more closely approached substantially complete sterility, yet the taste of the food was unaltered.

Most biological contaminants regulate their water intake through osmosis via the electrical charge of fats and proteins in their surface membranes. Directing some biological contaminants to pass through concentrated magnetic energy may overwhelm the electrical fields and charges in their surface membranes and drive the microorganisms to an imbalanced state, weakening their cell walls and destroying the membranes. Unlike chemical treatment and other means of controlling many biological contaminants, such organisms may not develop immunity to the presently claimed and/or disclosed inventive concepts of fluid conditioning.

In addition to the food industry, other industries are also looking for ways to control and/or eliminate unwanted bacteria and undesirable microorganisms in fluids containing at least one polar substance. Ballast water brought onboard an empty ocean going vessel to stabilize the ship at its port of departure typically contains a variety of non-native biological materials, including plants, viruses and bacteria that can cause extensive ecological and economic damage to aquatic ecosystems when untreated prior to its discharge at a destination port. In the oilfield, water that is injected into a formation is typically treated to prevent the reservoir from being flooded with water containing sulfate-reducing bacteria that can result in the in-situ development of H2S concentrations during the waterflood. Once sulfate-reducing bacteria have been introduced into a reservoir, they are essentially impossible to kill; however, and result in a lower quality hydrocarbons being produced by the formation as well as posing a number of economic challenges as well as health and environmental dangers for operators.

Until the development of the presently claimed and/or disclosed inventive concepts for conditioning fluids, high levels of continuous electromagnetic field generation were only possible in large laboratory environments, and only capable of providing batch treatment similar to that disclosed by Hofmann (1985). The presently claimed and/or disclosed inventive concepts for conditioning fluids provide non-contact conditioning that can be delivered to a fluid flowing through a conduit in any process, without any need for engineering modifications. In addition, this method of conditioning fluids has no moving parts and is scalable to configure to a broad range of flow rates. Further, heat generation that has been a major limitation in providing conditioning for flowing fluids is virtually eliminated.

A fluid containing at least one biological contaminant requires no special preparation prior to directing it through the presently claimed and/or disclosed inventive concepts for conditioning fluids. No chemical additives are required, and the process may be utilized to destroy the membranes of biological contaminants flowing through magnetically conductive conduit. Typically, a fluid may be conditioned at ambient temperature, but conditioning may also occur at a wide range of temperatures.

The intensity of the pulsed magnetic energy that is used may be as low as 0.25 Tesla and may exceed 1.5 Tesla, and preferably the intensity of the magnetic field is between 0.75 and 1.0 Tesla. The actual intensity of the magnetic field used depends on the properties of the fluid being conditioned, including the resistivity of the fluid and its viscosity, with higher intensities typically utilized for fluids having lower resistivities and greater viscosity. Sufficient destruction of microorganisms may be effected by adjusting parameters, such as exposure time, which is a function of the flow rate through the distinct regions of concentrated fluid conditioning energy, as well as the repetition rate and uniformity of the pulsed outputs of magnetic energy.

Total exposure time of a fluid mixtures containing at least one polar substance to the magnetic energy is minimal, ranging from about 1,000 milliseconds up to about 10,000 milliseconds. With reference to the above-described process, exposure time can be considered the number of pulses multiplied by the duration of each pulse as the liquid flows through each region of concentrated energy. A single pulse of highly concentrated magnetic energy generally decreases the population of a microorganism colony by about two orders of magnitude; however, additional pulses may be used to affect a greater degree of conditioning, and, typically, fluids are subjected to between about 100 pulses and about 1,000 pulses.

Regardless of the intensity of the magnetic energy and the number of pulses, a fluid mixture containing at least one polar substance will not be significantly heated, and will normally be subjected to at least 100 pulses, and it is considered desirable that the fluid mixture not be heated more than 1 degree C. by the magnetic conditioning procedure.

Biological contaminants in oilfield production fluids and/or injection water can be classified by their effect. Sulfate-reducing bacteria (SRB), heterotrophic nitrate-reducing bacteria (hNRB), sulfide-oxidizing bacteria (NR-SOB), yeast and molds, protozoa, *Sulfurospirillum* spp., *Thauera* spp., *Desulfovibrio* sp. strain Lac3, Lac6, and/or Lac15, and/or combinations and equivalents thereof can be encountered in nearly any body of water in and around an oilfield. Bacteria may be found in solution (planktonic), as dispersed colonies or immobile deposits (sessile bacteria), and rely on a variety of nitrogen, phosphorus, and carbon compounds (such as organic acids) to sustain growth. Concentrations of nitrogen and phosphorus usually found in exploration and production water are usually sufficient to sustain bacterial growth. The injection of organic nitrogen and phosphorus containing chemicals in fluid injected into hydrocarbon producing formations can increase the proliferation of microorganisms detrimental to exploration and production activities.

As disclosed herein, the presently claimed and/or disclosed inventive concepts include a method of separating at least one biological contaminant from a fluid mixture containing at least one polar substance and at least one biological contaminant, having the step of establishing a flow of a first fluid containing at least one biological contaminant mixture through a magnetically conductive conduit having magnetic energy directed along the longitudinal axis of the magnetically energized conduit and extending through at least a portion of the first fluid containing at least one biological contaminant mixture thereby providing a conditioned fluid containing at least one polar substance medium; wherein the flow of at least a portion of the conditioned fluid containing at least one polar substance medium through distinct areas of concentrated fluid conditioning energy destroys the membrane of at least one biological contaminant and the conditioned fluid containing at least one polar substance medium has a reduced volume of at least one dissimilar material.

In many instances, directing an aqueous-based mixture to pass through magnetic energy may neutralize the electrical charges of at least one dissimilar material in the water, rendering the dissimilar material non-adhesive and enhancing the clarification of the water. Water utilized as a heat transfer medium in thermal exchange systems may be directed through concentrated magnetic energy to retard the formation of scale and other heat insulating deposits in such thermal exchange systems.

Neutralizing the charges of suspended solids adhering to small oil droplets that tend to keep the oil suspended in water may disrupt the stability of some emulsions. Increasing the interfacial tension between water and oil allows small oil droplets to coalesce into larger droplets, float out of the water and be removed by separation apparatus. Charged electrodes may also be used in concert with magnetic water conditioning to break many bonds that tend to create emulsions. Similarly, water may be removed from hydrocarbon fluids.

Directing an aqueous-based mixture to pass through the presently claimed and/or disclosed inventive concepts may cause at least one dissimilar material in the water to be repelled from the aqueous-based mixture and facilitate its removal from the water, and thereby reduce the amount of flocculants and/or coagulants required for adequate dewatering processes so that drier solids and clearer filtrate may be discharged from dewatering equipment.

At least one chemical compound dispersing apparatus having a capacity to distribute a supply of at least one chemical compound into a fluid, such as water, an aqueous-based mixture, an aqueous solution and/or an exploration and production fluid, directed to pass through magnetic energy may be utilized to disperse a supply of at least one chemical into a fluid upstream of the magnetically conductive conduit, downstream of the magnetically conductive conduit, upstream of the separation apparatus, and/or downstream of the separation apparatus. As used herein, charged electrodes generating oxygen and hydrogen bubbles and hydroxyl radicals in the electrolysis of water, aqueous solutions and/or aqueous-based mixtures may be included as a chemical dispersing apparatus. Chemical compounds may be selected from a group consisting of but not limited to, algaecides, biocides, scale retardants, coagulants and flocculants, surfactants, exploration and production fluid additives, fuel additives, lubricant additives, ambient air, oxygen, hydrogen, ozone, hydrogen peroxide, and combinations thereof or equivalent chemical compounds known to those of ordinary skill in the art.

Algaecides may include, but are not limited to, copper sulfate, cupric sulfate, chelated copper, quaternary ammonia compounds and equivalents. Biocides, may include, but are not limited to, chlorine, hypochlorite solutions, sodium dichloro-s-triazinetrione, trichloro-s-triazinetrione, hypochlorous acid, halogenated hydantoin compounds and equivalents. Scale retardants may include, but are not limited to, ion-exchanger resins, analcime, chabazite, clintptilolite, heulandite, natrolite, phillipsite, stilbite and equivalents. Coagulants and flocculants may include, but are not limited to, multivalent cations such as aluminum, iron, calcium or magnesium, long-chain polymer flocculants such as modified polyacrylamides, and equivalents. Surfactants such as detergents, wetting agents, emulsifiers, foaming agents and dispersants may include, but are not limited to, ammonium lauryl sulfate, sulfate, sodium lauryl ether sulfate, sodium myreth sulfate, dioctyl sodium sulfosuccinate, perfluorooctanesulfonate, perfluorobutanesulfonate, linear alkylbenzene sulfonates, perfluorononanoate, octenidine dihydrochloride, perfluorononanoate, alkyltrimethylammonium salts, cocamidopropyl hydroxysultaine, cocamidopropyl betaine, polyoxyethylene glycol, alkyl ethers, octaethylene glycol monododecyl ether, pentaethylene glycol monododecyl ether, polyoxypropylene glycol alkyl ethers, polyoxyethylene glycol octylphenol ethers, polyoxyethylene glycol alkylphenol ethers, dodecyldimethylamine oxide, polyethylene glycol and equivalents.

In some instances, chemical pretreatment may hamper the efficiency of separation apparatus, such as screening apparatus, hydrocyclones, desanders and desilters that tend to blind off with chemically treated aqueous-based mixtures. Improved removal of at least one dissimilar material from an aqueous-based mixture may be achieved by directing an aqueous-based mixture free of coagulants or flocculants to pass through the magnetically conductive conduit upstream of such separation apparatus to enhance the separation of at least one dissimilar material from the water.

At least one fluid conditioning apparatus having a capacity to alter the flow of a fluid, such as water, an aqueous-based mixture, an aqueous solution and/or an exploration and production fluid, directed to pass through magnetic energy may be utilized to alter the flow of a fluid upstream of the magnetically conductive conduit, downstream of the magnetically conductive conduit, upstream of the separation apparatus, and/or downstream of the separation apparatus. Fluid conditioning apparatus may be selected from a group consisting of, but not limited to, pumps, blowers, vortex inducing equipment, static mixing devices, dynamic mixing apparatus to create turbulence in a flow of a fluid, laminar flow conditioners to remove turbulence from a flow of a fluid, and combinations thereof or equivalent fluid conditioning apparatus known to those of ordinary skill in the art.

Figure 12:
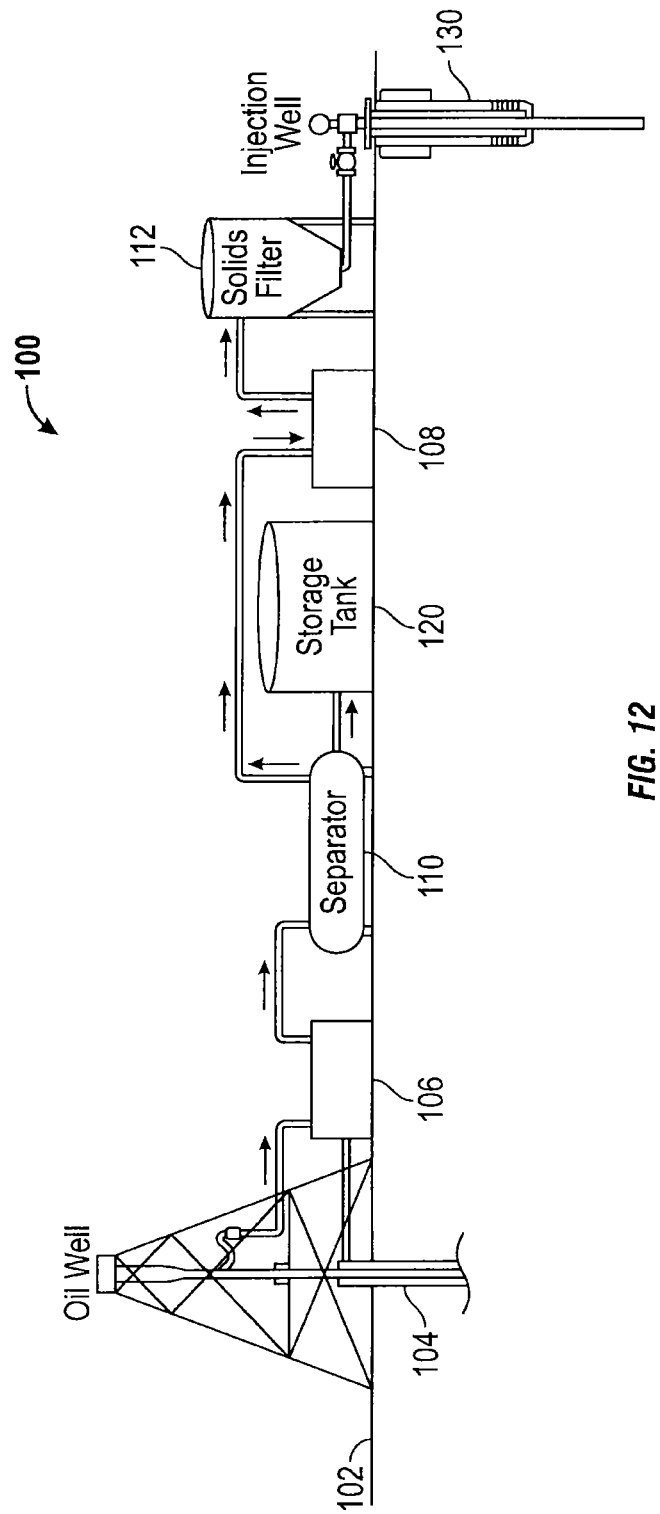
FIG. 12 is a diagrammatic illustration of an exemplary water treatment facility constructed in accordance with the presently disclosed inventive concepts located at a well site.

Referring now to FIG. 12, shown therein and designated by reference numeral 100 is an exemplary water recovery facility constructed in accordance with the presently disclosed inventive concepts discussed above. As shown in FIG. 12, the water recovery facility 100 is located at a well site 102 containing one or more wells 104 which may be used to recover aqueous-based mixtures containing a combination of water, minerals and hydrocarbons from the earth. The water recovery facility 100 may be provided with one or more magnetically energized conduits as well as one or more separation apparatus for separating one or more dissimilar material from the aqueous-based mixture. For example, as shown in FIG. 12, the water recovery facility 100 is provided with a first magnetically energized conduit 106, a second magnetically energized conduit 108, a first separation apparatus 110 and a second separation apparatus 112. The first and second magnetically energized conduits 106 and 108 may be constructed in a similar manner as the magnetically energized conduits 10, 30, 30/31/32, 30/32, 18, 18/18a, 18/18b/18a, 53 and 53/53a/53b, which are discussed above. The first magnetically energized conduit 106 may be coupled to the one or more wells 104 and the first separation apparatus 110 in order to receive aqueous-based mixtures from the one or more wells 104, condition the aqueous-based mixtures, and pass the magnetically conditioned aqueous-based medium to the first separation apparatus 110.

The aqueous-based mixture may be directed to make a single pass through the first magnetically energized conduit 106 and a single pass through the first separation apparatus 110, or a magnetically conditioned aqueous-based medium may be directed to make at least one additional pass through the first magnetically energized conduit 106, at least one additional pass through the first separation apparatus 110, and/or both. In this example, the first separation apparatus 110 is positioned downstream of the first magnetically energized conduit 106 to separate at least one dissimilar material, such as oil and/or natural gas, from the magnetically conditioned aqueous-based medium. Although first magnetically energized conduit 106 is shown upstream of first separation apparatus 110, it should be understood that the first magnetically energized conduit 106 may be disposed within the fluid impervious boundary wall of first separation apparatus 110.

In one embodiment, the first separation apparatus 110 is designed to separate at least one solid, liquid and/or gas phases of the dissimilar material from the magnetically conditioned aqueous-based medium. For example, the first separation apparatus 110 may be a two-phase separation apparatus, three-phase separation apparatus, dissolved air flotation apparatus, induced air flotation apparatus, dewatering apparatus, centrifuge, wash tank, gunbarrel separator, three-phase knock-out unit, clarifier, settling tank, gravity separator, clarifier, weir tank, open-top pit, settling pond, or equivalent types of separation apparatus known to those of ordinary skill in the art.

The water recovery facility 100 may also be provided with one or more storage tank 120 coupled to the first separation apparatus 110. The one or more storage tank 120 is preferably used for temporary storage of the at least one dissimilar material, which may be hydrocarbons, such as oil or natural gas, which is recovered from the magnetically conditioned aqueous-based medium. Water recovered from the first separation apparatus 110 may be transported away from the well-site 102, discharged into an injection well 130, or directed to pass through subsequent processing methods and apparatus to improve the quality and/or purity of the water and then re-used at the well-site 102, for example.

The first separation apparatus 110 may be coupled to the second separation apparatus 112. The magnetically conditioned aqueous-based medium having a reduced content of the dissimilar material discharged from the first separation apparatus 110 may be directed to the second separation apparatus 112, or directed to pass through the second magnetically energized conduit 108 such that the magnetically conditioned aqueous-based medium having a reduced content of the dissimilar material is directed from the first separation apparatus 110 to the second magnetically energized conduit 108. The second magnetically energized conduit 108 provides further magnetic conditioning to the magnetically conditioned aqueous-based medium and is coupled to the second separation apparatus 112 such that further at least one dissimilar material may be separated from the magnetically conditioned aqueous-based medium. The second separation apparatus 112 may be a solids filter for reducing dissimilar material in a solid phase from the magnetically conditioned aqueous-based medium. For example, the magnetically conditioned aqueous-based medium may be exposed to chemical treatment and/or electrochemical conditioning upstream of second separation apparatus 112 to facilitate the extraction of contaminants remaining in water in order to enhance the purity of the water. Contaminants may then float to the surface of the water and be removed by skimming, dissolved air flotation and/or induced air flotation apparatus, or equivalent separation apparatus known to those of ordinary skill in the art; or readily settle as a floc in a settling tank, gravity separator, clarifier, weir tank, filter, open-top pit, settling pond, and/or other type of separation apparatus.

The second separation apparatus 112 may be an electrochemical fluid conditioning apparatus having at least one pair of electrically charged electrodes disposed within a fluid impervious boundary wall having an inner surface, an inlet port for receiving the magnetically conditioned aqueous-based medium, and at least one outlet port for discharging an amount of the magnetically conditioned aqueous-based medium. The electrically charged electrodes may be configured to provide electrolysis, electrocoagulation, or equivalent electrochemical fluid conditioning known to those of ordinary skill in the art. Although the second magnetically energized conduit 108 is shown upstream of the second separation apparatus 112, it should be understood that the second magnetically energized conduit 108 may be disposed within the fluid impervious boundary wall of the second separation apparatus 112.

Water recovered from the second separation apparatus 112 may be directed to pass through subsequent processing methods and apparatus to improve the quality and/or purity of the water and then re-used at the well-site 102, transported away from the wellsite 102, or discharged into an injection well 130, for example. Such methods and apparatus may include pulsed electromagnetic waves generated by at least one antenna and/or cavitation waves generated by at least one transducer to destroy contaminants remaining in the fluid and/or accelerate the extraction of any remaining solid materials. For example, a method of neutralizing charges of solid contaminants and weakening cell walls and membranes of biological contaminants in a fluid comprises the steps of establishing a flow of a fluid through a fluid treatment chamber surrounded by a sidewall of a fluid treatment vessel shaped as a conduit having a fluid input port, and a fluid output port, the sidewall constructed of a shielding material; and energizing a coil of at least one antenna within the fluid treatment chamber with at least one electrical energizing unit to produce pulsed radiation within the fluid treatment chamber to treat the flow of the fluid therein, wherein the sidewall of the fluid treatment vessel establishes a resonant chamber having a capacity to restrict propagation of the pulsed radiation out of the fluid treatment vessel. Other fluid processing methods may include filtration systems, distillation systems, desalination equipment, reverse osmosis systems, ultrafiltration, and combinations thereof or equivalent types of separation apparatus known to those of ordinary skill in the art.

Figure 13:
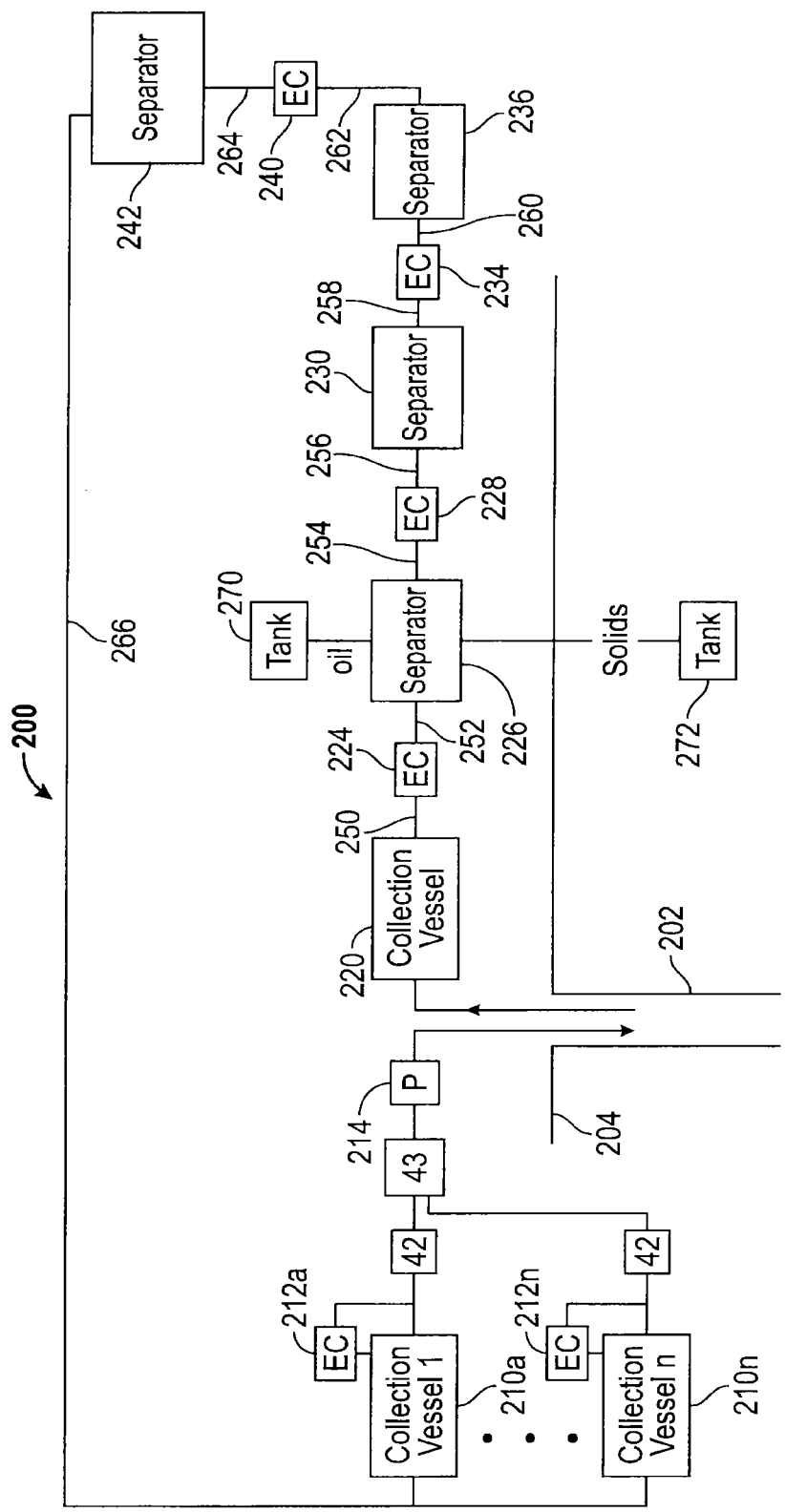
FIG. 13 is a diagrammatic illustration of another exemplary water treatment facility constructed in accordance with the presently disclosed inventive concepts and located at a well site.

Shown in FIG. 13 is a fluid processing system 200 for using and re-using water during a fracturing operation of a well 202 located at a well-site 204. By recovering water from the well 202 during the fracturing operation, and re-using the water at the well-site 204 for further fracturing operations, the amount of water that must be transported to the well-site 204 is substantially reduced thereby lowering the cost of fracturing additional wells at well-site 204, as well as reducing the amount of waste water that must be disposed of in an environmentally safe manner.

The fluid processing system 200 is provided with a plurality of collection vessels 210a-n for storing water during the fracturing operation. Water from the collection vessels 210a-n may be drawn from the collection vessels 210a-n, conditioned by magnetically energized conduits 212a-n and then directed back into the collection vessels 210a-n. To use the water for a fracturing operation, the water within the collection vessels 210a-n is directed to blender 43 through first magnetically energized conduits 42. The blender 43 mixes a variety of materials including proppants, thickeners and the like into the water to form a fracturing fluid. The blender 43 is connected to one or more fracturing pumps 214 which pressurize the fracturing fluid to a pressure within a range of between 15,000 to 25,000 psi. The pressurized fracturing fluid is then directed into the well 202 in order to fracture the rock surrounding the well 202.

An aqueous-based mixture containing water, such as flowback water and/or produced water, is recovered from the well 202 at the surface and then directed into a collection vessel 220 for temporary storage prior to subsequent treatment to recover dissimilar materials from the aqueous-based mixture while also purifying the water within the aqueous-based mixture. The purified water can then be directed back into the collection vessels 210a-n for re-use during subsequent fracturing operations. In order to recover the dissimilar materials while also purifying the water within the aqueous-based mixture, the fluid processing system 200 may be provided with a series of alternating magnetically energized conduits and separation apparatus. For example, the fluid processing system 200 may be provided with a second magnetically energized conduit 224, a first separation apparatus 226, a third magnetically energized conduit 228, a second separation apparatus 230 a fourth magnetically energized conduit 234, a third separation apparatus 236, a fifth magnetically energized conduit 240, and a fourth separation apparatus 242. Although magnetically energized conduits 210a-n, 224, 228, 234 and 240 106 and separation apparatus 226, 230, 236 and 242 are shown at well-site 204, it should be understood that large volumes of flowback water and produced water collected and transported to a disposal well site or other water processing facility may be directed through a similar array of any combination of magnetically energized conduits and separation apparatus to improve the quality and/or purity of the water and then transported back to the collection vessels 210a-n at well-site 204 for re-use in further fracturing operations, The collection vessel 220 is coupled to the second magnetically energized conduit 224 via a first fluid path 250; the second magnetically energized conduit 224 is coupled to the first separation apparatus 226 via a second fluid path 252; the first separation apparatus 226 is coupled to the third magnetically energized conduit 228 via a third fluid path 254; the third magnetically energized conduit 228 is coupled to the second separation apparatus 230 via a fourth fluid path 256; the second separation apparatus 230 is coupled to the fourth magnetically energized conduit 234 via a fifth fluid path 258; the fourth magnetically energized conduit 234 is coupled to the third separation apparatus 236 via a sixth fluid path 260; the third separation apparatus 236 is coupled to the fifth magnetically energized conduit 240 by a seventh fluid path 262; the fifth magnetically energized conduit 240 is coupled to the fourth separation apparatus 242 via an eighth fluid path 264; and the fourth separation apparatus 242 is coupled to the collection vessels 210a-210n via a ninth fluid path 266. The first, second, third, fourth, fifth, sixth, seventh, eighth and ninth fluid paths 250, 252, 254, 256, 258, 260, 262, 264, and 266 may be implemented using any suitable devices capable of moving the aqueous-based mixture between the various components within the fluid processing system 200. For example, the first, second, third, fourth, fifth, sixth, seventh, eighth and ninth fluid paths 250, 252, 254, 256, 258, 260, 262, 264, and 266 may be implemented using a variety of pipes, hoses, valves and mechanical fittings.

To purify the aqueous-based mixture, the aqueous-based mixture is directed from the collection vessel 220 to pass sequentially through the second magnetically energized conduit 224, the first separation apparatus 226, the third magnetically energized conduit 228, the second separation apparatus 230, the fourth magnetically energized conduit 234, the third separation apparatus 236, the fifth magnetically energized conduit 240, and the fourth separation apparatus 242. Although the specific embodiment depicted in FIG. 13 for purifying the aqueous-based mixture is provided with four magnetically energized conduits for producing the magnetically conditioned aqueous-based medium and four separation apparatuses for removing dissimilar materials from the magnetically conditioned aqueous-based medium, it should be understood that more or less magnetically energized conduits, and more or less separation apparatus can be provided and preferably arranged in a serial fashion.

For example, first separation apparatus 226 may be a gravity separation apparatus designed using Stokes's Law to define the rising velocity of oil droplets based on their density and size and the difference in the specific gravities of oil and water, which is much smaller than the difference in the specific gravities of solids and water. Based on such design criterion, most suspended solids will settle to the bottom of the first separation apparatus 226 as a sediment layer while oil will rise to the top and form a layer that can be extracted by skimming or other means. The oil recovered by the first separation apparatus 226 may be directed to a first tank 270. Water forms a middle layer between the oil and the solids and is directed to the third electromagnetic conduit 228. Solids falling to the bottom of the first separation apparatus 226 are removed for disposal and directed to a second tank 272 by way of an auger, for example. Heat and/or at least one chemical compound may be introduced into the magnetically conditioned aqueous-based medium in order to increase the rate of phase separation.

The second separation apparatus 230 may be an electrochemical fluid conditioning apparatus for removing solid, water-soluble hydrocarbons and other contaminants from the magnetically conditioned aqueous-based medium. The electrochemical fluid conditioning apparatus has at least one pair of electrically charged electrodes disposed within a fluid impervious boundary wall having an inner surface, an inlet port for receiving an aqueous-based mixture, and at least one outlet port for discharging an amount of the aqueous-based mixture directed to pass through the charged electrodes. The charged electrodes may be selected from a group consisting of, but not limited to, electrolysis, electrocoagulation, or equivalent electrochemical fluid conditioning known to those of ordinary skill in the art. One or more magnetically conductive conduit may be disposed within the fluid impervious boundary wall of the electrochemical fluid conditioning apparatus upstream and/or downstream of the electrodes. Further, as shown in FIG. 13, a magnetically conductive conduit 228 or 234 may be disposed upstream and/or downstream of the second separation apparatus 230, for example.

The third separation apparatus 236 may be a filtration device designed to capture and reduce a dissimilar material in a solid phase from the magnetically conditioned aqueous-based medium and/or a separation apparatus designed using Stokes's Law to define the sinking velocity of solid particles based on their density and size and the difference in the specific gravities of the solids and water. For example, the third separation apparatus 236 may include a back-washable screen, centrifuge, dissolved air flotation system, induced air flotation system, cartridge filter, screening apparatus, or expose the magnetically conditioned aqueous-based medium to electrochemical conditioning to extract contaminants remaining in water in order to enhance the purity of the water. Contaminants may float to the surface of the water and be removed by skimming, dissolved air flotation and/or induced air flotation apparatus, or equivalent separation apparatus known to those of ordinary skill in the art; or readily settle as a floc in a settling tank, gravity separator, clarifier, weir tank, filter, open-top pit, settling pond, and/or other type of separation apparatus.

The fourth separation apparatus 242 may be a fluid treatment chamber surrounded by a sidewall of a fluid treatment vessel shaped as a conduit having a fluid input port, and a fluid output port, the sidewall constructed of a shielding material. A coil of at least one antenna within the fluid treatment chamber may be energized with at least one electrical energizing unit to produce pulsed radiation within the fluid treatment chamber to treat the flow of the fluid therein, wherein the sidewall of the fluid treatment vessel establishes a resonant chamber having a capacity to restrict propagation of the pulsed radiation out of the fluid treatment vessel 242. Similar methods and apparatus may include the creation of pulsed electromagnetic waves generated by at least one antenna and/or cavitation waves generated by at least one transducer to destroy contaminants remaining in the fluid and/or accelerate the extraction of any remaining solid materials known to those of ordinary skill in the art.

It should be understood that the serial array of more or less magnetically energized conduits, and more or less separation apparatus, can be provided and preferably arranged for using and re-using water during a fracturing operation of a well.

The foregoing description of various embodiments, constrictions, and uses of presently claimed and/or disclosed inventive concepts has been for the purpose of explanation and illustration and should not be considered as limiting to the breadth and scope of the presently claimed and/or disclosed inventive concepts. It will be appreciated by those skilled in the art that modifications and changes may be made without departing from the essence and scope of the presently claimed and/or disclosed inventive concepts. For example, additional embodiments of energized coils may be utilized to induce a magnetic field for fluid conditioning. Therefore, it is contemplated that the appended claims will cover any modifications or embodiments that fall within the broad scope and/or obvious modifications and improvements of the presently claimed and/or disclosed inventive concepts.

What is claimed:

1. A method of separating at least one dissimilar material from an aqueous-based mixture, having the steps of:
    establishing a flow of a first aqueous-based mixture through a first magnetically conductive conduit having magnetic energy directed along the longitudinal axis of the first magnetically conductive conduit and extending through at least a portion of the first aqueous-based mixture thereby providing a first conditioned aqueous-based medium; and
    directing a flow of at least a portion of the first conditioned aqueous-based medium through a first type of separation apparatus;
    establishing a flow of the first conditioned aqueous-based mixture through a second magnetically conductive conduit having magnetic energy directed along the longitudinal axis of the second magnetically conductive conduit and extending through at least a portion of the first conditioned aqueous-based mixture thereby providing a second conditioned aqueous-based medium; and
    directing a flow of at least a portion of the second conditioned aqueous-based medium through a second type of separation apparatus, the second type of separation apparatus being different from the first type of separation apparatus.

2. The method of claim 1, wherein the first aqueous-based mixture is heated upstream of the first magnetically conductive conduit.

3. The method of claim 1, wherein the first conditioned aqueous-based medium is heated upstream of at least one first type of separation apparatus.

4. The method of claim 1, wherein the first conditioned aqueous-based medium is heated within at least one first type of separation apparatus.

5. The method of claim 1, wherein at least one chemical compound is dispersed in the first aqueous-based mixture.

6. The method of claim 1, wherein at least one chemical compound is dispersed in the first conditioned aqueous-based medium.

7. The method of claim 1, wherein the viscosity of the first conditioned aqueous-based medium is lower than the viscosity of the first aqueous-based mixture.

8. The method of claim 1, wherein a particle size of at least one dissimilar material in the first conditioned aqueous-based medium is larger than a particle size of the at least one dissimilar material in the first aqueous-based mixture.

9. The method of claim 1, wherein the magnetic energy is concentrated in a plurality of distinct areas along the longitudinal axis of the first and second magnetically energized conduits.

10. The method of claim 1 further having the step of recovering the water from the second conditioned aqueous-based medium.

11. The method of claim 1, wherein the water has a reduced volume of at least one of the solid phase and a hydrocarbon phase.

12. The method of claim 1, wherein the water is injected into a waterflood formation.

13. The method of claim 1, wherein the water is injected into a disposal well.

14. The method of claim 1, wherein the water is reclaimed for exploration and production applications.

15. The method of claim 1, wherein the water is directed through additional water reclamation processes and discharged into the environment.

16. The method of claim 1, further including the step of recovering at least one solid phase from the first conditioned aqueous-based medium.

17. The method of claim 16, wherein the solid phase has a reduced volume of at least one of a hydrocarbon phase and water.

18. The method of claim 1, further having the step of recovering at least one hydrocarbon phase from the conditioned aqueous-based medium.

19. The method of claim 18, wherein the at least one hydrocarbon phase has a reduced volume of at least one of the solid phase and water.

* * * * *